(12) United States Patent
Dion et al.

(10) Patent No.: US 12,100,258 B2
(45) Date of Patent: Sep. 24, 2024

(54) DIGITAL DOWNLOADING JUKEBOX WITH ENHANCED COMMUNICATION FEATURES

(71) Applicant: TouchTunes Music Corporation, New York, NY (US)

(72) Inventors: Dominique Dion, Verdun Nun's Island (CA); Guy Nathan, Verdun Nun's Island (CA); Francois Brillon, Laval (CA); Loic Gratton, Westmount (CA)

(73) Assignee: TOUCHTUNES MUSIC COMPANY, LLC, New York, NY (US)

( * ) Notice: Subject to any disclaimer, the term of this patent is extended or adjusted under 35 U.S.C. 154(b) by 1386 days.

(21) Appl. No.: 16/452,088

(22) Filed: Jun. 25, 2019

(65) Prior Publication Data

US 2019/0318567 A1    Oct. 17, 2019

Related U.S. Application Data

(63) Continuation of application No. 11/902,658, filed on Sep. 24, 2007, now Pat. No. 10,373,420, which is a
(Continued)

(51) Int. Cl.
*G07F 17/30* (2006.01)
*G06F 3/04842* (2022.01)
(Continued)

(52) U.S. Cl.
CPC ........ *G07F 17/305* (2013.01); *G06F 3/04842* (2013.01); *G06F 16/60* (2019.01);
(Continued)

(58) Field of Classification Search
None
See application file for complete search history.

(56) References Cited

U.S. PATENT DOCUMENTS

| 3,710,137 A | 1/1973 | Stephens, Jr. |
| 3,807,541 A | 4/1974 | Kortenhaus |

(Continued)

FOREIGN PATENT DOCUMENTS

| AU | 199954012 | 4/2000 |
| CA | 2119184 | 9/1994 |

(Continued)

OTHER PUBLICATIONS

"About Ecast", date unknown, leaflet.
(Continued)

*Primary Examiner* — Jamie R Kucab
(74) *Attorney, Agent, or Firm* — Nixon & Vanderhye, PC

(57) ABSTRACT

Systems and/or methods for use in connection with digital downloading jukeboxes are provided. Such systems and/or methods may be used to provide enhanced communications capabilities, e.g., to registered users of jukeboxes. In certain exemplary embodiments, users may become registered users directly at a jukebox. Registered users also may, in certain exemplary embodiments, receive coupons for free plays, import playlists from hardware devices and/or software applications, receive special pricing when playing certain instances of media, play playlists in whole or in part, create and/or manage playlists directly at a jukebox, establish and manage connections with other registered users, etc. Still further, in certain exemplary embodiments, one or more channels may be predefined and/or set up for a jukebox.

15 Claims, 55 Drawing Sheets

Related U.S. Application Data continuation-in-part of application No. 11/727,391, filed on Mar. 26, 2007, now Pat. No. 7,822,687, which is a continuation-in-part of application No. 11/358,721, filed on Feb. 22, 2006, now Pat. No. 8,332,895, which is a continuation-in-part of application No. 11/222,036, filed on Sep. 9, 2005, now Pat. No. 8,151,304, which is a continuation-in-part of application No. 11/185,974, filed on Jul. 21, 2005, now Pat. No. 8,103,589, which is a continuation-in-part of application No. 10/661,811, filed on Sep. 15, 2003, now Pat. No. 9,646,339.

(60) Provisional application No. 60/410,832, filed on Sep. 16, 2002.

(51) Int. Cl.
  *G06F 16/60* (2019.01)
  *G06Q 30/02* (2023.01)
  *G06Q 30/0207* (2023.01)
  *G06Q 30/0235* (2023.01)
  *G06Q 30/06* (2023.01)
  *G11B 27/10* (2006.01)

(52) U.S. Cl.
  CPC ......... *G06Q 30/02* (2013.01); *G06Q 30/0207* (2013.01); *G06Q 30/0235* (2013.01); *G06Q 30/06* (2013.01); *G11B 27/105* (2013.01)

(56) References Cited

U.S. PATENT DOCUMENTS

| | | |
|---|---|---|
| 3,982,620 A | 9/1976 | Kotenhaus |
| 4,008,369 A | 2/1977 | Theurer et al. |
| 4,064,362 A | 12/1977 | Williams |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,696,527 A | 9/1987 | Ding et al. |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,815,868 A | 3/1989 | Speicher |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| D327,687 S | 7/1992 | Arbiter |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| D332,096 S | 12/1992 | Wolff et al. |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,339,413 A | 6/1994 | Koval |
| 5,327,230 A | 7/1994 | Dockery |
| 5,335,313 A | 8/1994 | Douglas |
| 5,339,095 A | 8/1994 | Redford |
| 5,341,350 A | 8/1994 | Frank |
| 5,355,302 A | 10/1994 | Martin et al. |

(56) References Cited

U.S. PATENT DOCUMENTS

| | | |
|---|---|---|
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whistler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,590,318 A | 12/1996 | Zbikowski et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,704,146 A | 1/1998 | Herring et al. |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |

(56) References Cited

U.S. PATENT DOCUMENTS

| | | |
|---|---|---|
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,005 A | 9/1999 | Liu |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,026,168 A | 2/2000 | Li et al. |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,067,564 A | 5/2000 | Urakoshi et al. |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,146,210 A | 11/2000 | Cha et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,167,358 A | 12/2000 | Othmer et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 * | 3/2002 | Katz ................ G11B 27/36 710/301 |
| 6,359,616 B1 | 3/2002 | Ogura et al. |
| 6,359,661 B1 | 3/2002 | Nickum |
| 6,370,580 B2 | 4/2002 | Kriegsman |
| 6,379,187 B2 | 4/2002 | Nishimatsu |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |

(56) References Cited

U.S. PATENT DOCUMENTS

| | | |
|---|---|---|
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| D495,755 S | 9/2004 | Wurz et al. |
| 6,789,215 B1 | 9/2004 | Rupp et al. |
| 6,816,578 B1 | 11/2004 | Kredo et al. |
| 6,850,252 B1 | 2/2005 | Hoffberg |
| 6,882,793 B1 | 4/2005 | Fu |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,160,132 B2 | 1/2007 | Phillips et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| D560,651 S | 1/2008 | Berkheimer et al. |
| 7,347,723 B1 | 3/2008 | Daily |
| D566,195 S | 4/2008 | Ichimura et al. |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,522,631 B1 | 4/2009 | Brown et al. |
| 7,533,182 B2 | 5/2009 | Wurtzel et al. |
| 7,548,851 B1 | 6/2009 | Lau |
| 7,549,919 B1 | 6/2009 | Nathan et al. |
| 7,574,727 B2 | 8/2009 | Nathan et al. |
| 7,634,228 B2 | 12/2009 | White et al. |
| 7,647,613 B2 | 1/2010 | Drakoulis et al. |
| 7,657,910 B1 | 2/2010 | McAulay et al. |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| 7,922,178 B2 | 4/2011 | Nathan et al. |
| 7,937,724 B2 | 5/2011 | Clark et al. |
| D642,553 S | 8/2011 | Nathan et al. |
| 7,992,178 B1 | 8/2011 | Nathan et al. |
| 7,996,873 B1 | 8/2011 | Nathan et al. |
| 8,015,200 B2 | 9/2011 | Seiflien et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,103,589 B2 | 1/2012 | Nathan et al. |
| 8,151,304 B2 | 4/2012 | Nathan et al. |
| 8,165,318 B2 | 4/2012 | Nathan et al. |
| 8,214,874 B2 | 7/2012 | Nathan |
| D665,375 S | 8/2012 | Garneau et al. |
| 8,292,712 B2 | 10/2012 | Nathan et al. |
| 8,325,571 B2 | 12/2012 | Cappello et al. |
| 8,332,895 B2 | 12/2012 | Nathan et al. |
| 8,429,530 B2 | 4/2013 | Neuman et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0018074 A1 | 2/2002 | Buil et al. |
| 2002/0032603 A1 | 3/2002 | Yeiser |
| 2002/0040371 A1 | 4/2002 | Burgess |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0123331 A1 | 9/2002 | Lehaff et al. |
| 2002/0126141 A1 | 9/2002 | Mastronardi |
| 2002/0129036 A1 | 9/2002 | Ho Yuen Lok et al. |
| 2002/0129371 A1 | 9/2002 | Emura et al. |

(56) References Cited

U.S. PATENT DOCUMENTS

| | | |
|---|---|---|
| 2002/0162104 A1 | 10/2002 | Raike et al. |
| 2003/0004833 A1 | 1/2003 | Pollak et al. |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0014272 A1 | 1/2003 | Goulet et al. |
| 2003/0018740 A1 | 1/2003 | Sonoda et al. |
| 2003/0027120 A1 | 2/2003 | Jean |
| 2003/0031096 A1 | 2/2003 | Nathan et al. |
| 2003/0037010 A1 | 2/2003 | Schmelzer |
| 2003/0041093 A1 | 2/2003 | Yamane et al. |
| 2003/0050058 A1 | 3/2003 | Walsh et al. |
| 2003/0064805 A1 | 4/2003 | Wells |
| 2003/0065639 A1 | 4/2003 | Fiennes et al. |
| 2003/0076380 A1 | 4/2003 | Yusef et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0144910 A1 | 7/2003 | Flaherty et al. |
| 2003/0163388 A1 | 8/2003 | Beane |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee et al. |
| 2003/0233469 A1 | 12/2003 | Knowlson |
| 2004/0010800 A1 | 1/2004 | Goci |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2004/0243482 A1 | 12/2004 | Laut |
| 2005/0034084 A1 | 2/2005 | Ohtsuki |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0240661 A1 | 10/2005 | Heller et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen et al. |
| 2006/0062094 A1 | 3/2006 | Nathan et al. |
| 2006/0143236 A1* | 6/2006 | Wu .................... G06F 16/4387 |
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0293773 A1 | 12/2006 | Nathan et al. |
| 2007/0025701 A1 | 2/2007 | Kawasaki et al. |
| 2007/0047198 A1 | 3/2007 | Crooijmans et al. |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0247979 A1 | 10/2007 | Brillon et al. |
| 2008/0003881 A1 | 1/2008 | Wu |
| 2008/0005179 A1* | 1/2008 | Friedman .................. G06F 16/68 |
| 2008/0005698 A1 | 1/2008 | Koskinen |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0222546 A1* | 9/2008 | Mudd .................. H04N 21/482 715/764 |
| 2008/0239887 A1 | 10/2008 | Tooker et al. |
| 2008/0275771 A1 | 11/2008 | Levine |
| 2008/0305738 A1 | 12/2008 | Khedouri et al. |
| 2009/0006993 A1 | 1/2009 | Tuli et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0100092 A1 | 4/2009 | Seiflein et al. |
| 2009/0109224 A1 | 4/2009 | Sakurai |
| 2009/0128631 A1 | 5/2009 | Ortiz |
| 2009/0138111 A1 | 5/2009 | Mastronardi |
| 2009/0158203 A1 | 6/2009 | Kerr et al. |
| 2009/0168901 A1 | 7/2009 | Yarmolich et al. |
| 2009/0172565 A1 | 7/2009 | Jackson et al. |
| 2009/0177301 A1 | 7/2009 | Hayes |
| 2009/0234914 A1 | 9/2009 | Mikkelsen et al. |
| 2009/0240355 A1* | 9/2009 | Buil ...................... G11B 27/34 700/94 |
| 2009/0240721 A1 | 9/2009 | Giacalone |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0298577 A1 | 12/2009 | Gagner et al. |
| 2009/0307314 A1 | 12/2009 | Smith et al. |
| 2009/0328095 A1 | 12/2009 | Vinokurov et al. |
| 2010/0042505 A1 | 2/2010 | Straus |
| 2010/0111489 A1 | 5/2010 | Presler |
| 2010/0131558 A1 | 5/2010 | Logan et al. |
| 2010/0211818 A1 | 8/2010 | Nathan et al. |
| 2010/0211872 A1 | 8/2010 | Rolston |
| 2010/0241259 A1 | 9/2010 | Nathan |
| 2010/0247081 A1 | 9/2010 | Victoria Pons |
| 2010/0269066 A1 | 10/2010 | Nathan |
| 2010/0299232 A1 | 11/2010 | Nathan et al. |
| 2010/0306179 A1 | 12/2010 | Lim |
| 2011/0055019 A1 | 3/2011 | Coleman |
| 2011/0066943 A1 | 3/2011 | Brillon et al. |
| 2011/0173521 A1 | 7/2011 | Horton et al. |
| 2011/0246517 A1 | 10/2011 | Nathan et al. |
| 2011/0270894 A1 | 11/2011 | Mastronardi et al. |
| 2011/0283236 A1 | 11/2011 | Beaumier et al. |
| 2011/0298938 A1 | 12/2011 | Nathan et al. |
| 2011/0304685 A1 | 12/2011 | Khedouri et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2012/0321098 A1* | 12/2012 | Myers .................. G06F 3/04842 381/77 |
| 2012/0323652 A1 | 12/2012 | Mastronardi et al. |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |

(56) References Cited

U.S. PATENT DOCUMENTS

| | | | |
|---|---|---|---|
| 2013/0091054 A1 | 4/2013 | Nathan et al. | |
| 2014/0026154 A1 | 1/2014 | Nathan | |

FOREIGN PATENT DOCUMENTS

| | | |
|---|---|---|
| CN | 1340939 | 3/2002 |
| DE | 3406058 | 8/1985 |
| DE | 3723737 A1 | 1/1988 |
| DE | 3820835 A1 | 1/1989 |
| DE | A 3820835 | 1/1989 |
| DE | 3815071 | 11/1989 |
| DE | 4244198 | 6/1994 |
| DE | 19539172 | 9/1996 |
| DE | 19610739 | 9/1997 |
| DE | 19904007 | 8/2000 |
| EP | EU A0082077 | 6/1983 |
| EP | 0140593 A2 | 5/1985 |
| EP | O 0256921 | 2/1988 |
| EP | EU A 0283350 | 9/1988 |
| EP | O 0283304 | 9/1988 |
| EP | 0309298 | 3/1989 |
| EP | EU 0309298 | 3/1989 |
| EP | 0313359 | 4/1989 |
| EP | EU A 0313359 | 4/1989 |
| EP | O 0340787 | 11/1989 |
| EP | O 0363186 | 4/1990 |
| EP | O 0 425 168 A | 5/1991 |
| EP | 0464562 A2 | 1/1992 |
| EP | O 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | EU A 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974896 A1 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | 2602352 | 2/1988 |
| FR | 2808906 | 11/2001 |
| GB | 2122799 | 1/1984 |
| GB | A 2122799 | 1/1984 |
| GB | 2166328 A | 4/1986 |
| GB | 2170943 | 8/1986 |
| GB | 2193420 | 2/1988 |
| GB | 2 238680 A | 6/1991 |
| GB | 2254469 | 10/1992 |
| GB | 2259398 | 3/1993 |
| GB | 2262170 A | 6/1993 |
| GB | 2380377 | 4/2003 |
| GB | 2505584 | 8/2014 |
| JP | 57-173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 06-127885 | 5/1994 |
| JP | 07281682 | 10/1995 |
| JP | 07-311587 | 11/1995 |
| JP | 08-037701 | 2/1996 |
| JP | 08-279235 | 10/1996 |
| JP | 8274812 | 10/1996 |
| JP | 3034555 | 11/1996 |
| JP | 08289976 | 11/1996 |
| JP | 928918 | 2/1997 |
| JP | 9114470 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-003088 | 1/1999 |
| JP | 11-024686 | 1/1999 |
| JP | 11-095768 | 4/1999 |
| JP | 2000-270314 | 9/2000 |
| JP | 2002-83640 | 3/2002 |
| JP | 2002-537584 | 11/2002 |
| JP | 2003-076380 | 3/2003 |
| JP | 2003-084903 | 3/2003 |
| JP | 2003-099072 | 4/2003 |
| JP | 2004-29459 | 1/2004 |
| JP | 2004-030469 | 1/2004 |
| JP | 2004-054435 | 2/2004 |
| JP | 2005-018438 | 1/2005 |
| JP | 2005-107267 | 4/2005 |
| JP | 2005-184237 | 7/2005 |
| JP | 2005-215209 | 8/2005 |
| JP | 2006-39704 | 2/2006 |
| JP | 2006-048076 | 2/2006 |
| JP | 2007-034253 | 2/2007 |
| JP | 2007-041722 | 2/2007 |
| JP | 2007/505410 | 3/2007 |
| JP | 07504517 | 3/2007 |
| JP | 2007-102982 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-199775 | 8/2007 |
| JP | 2007-241748 | 9/2007 |
| JP | 2008-058656 | 3/2008 |
| JP | 2009-017529 | 1/2009 |
| JP | 2009-075540 | 4/2009 |
| JP | 2009-288702 | 12/2009 |
| TW | 514511 | 12/2002 |
| TW | M274284 | 9/2005 |
| TW | M290206 | 5/2006 |
| WO | WO 86 01326 A | 2/1986 |
| WO | WO 90/00429 | 1/1990 |
| WO | WO A 90 07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO93/021732 | 10/1993 |
| WO | WO A 94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98 07940 A | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | WO 02/060546 | 8/2002 |
| WO | WO 02/095752 | 11/2002 |
| WO | WO 01/084353 | 1/2003 |
| WO | WO 2003/005743 | 1/2003 |

(56) References Cited

FOREIGN PATENT DOCUMENTS

| WO | WO 03/069613 | 8/2003 |
|---|---|---|
| WO | WO 2004/029775 | 4/2004 |
| WO | WO 2005/026916 | 3/2005 |
| WO | WO 2005/052751 A2 | 6/2005 |
| WO | WO 2006/014739 | 2/2006 |
| WO | WO 2006/056933 | 6/2006 |
| WO | WO 2006/106631 | 10/2006 |
| WO | WO 2006/138064 | 12/2006 |
| WO | WO 2007/069143 A2 | 6/2007 |
| WO | WO 2007/092542 | 8/2007 |
| WO | WO 2008-033853 | 3/2008 |
| WO | WO 2009/004531 A1 | 1/2009 |
| WO | WO 2011094330 | 8/2011 |
| WO | WO 2013/040603 | 3/2013 |

OTHER PUBLICATIONS

Ahanger et al.; A Digital On-Demand Video Service Supporting Content-Based Queries; 1993; 9 pages.
Austin Cyber Limits: Name That Tune [online], [retrieved Jul. 23, 2001]. Retrieved from the Internet: <http://www.pbs.ork/klru/austin/games/namethattune.html>.
Back to the Tunes [online], [retrieved Jul. 23, 2001]. Retrieved from the Internet: <http://citc5.hispeed.com/rules.html>.
Bonczek et al, "The DSS Development System", 1983 National Computer Conference, Anaheim, California, May 16-19, 1983, pp. 441-455.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10, 2002.
"Ecast Forges Landmark International Technology Partnership", Business Wire at www.findarticles.com/cf_0/m0EIN/2000_July_25/63663604/print.html, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Fachbuch, "Unterhaltungselektronic von A-Z" gfu 1, VDE-Verlag GmbH, pp. 12-13, 1983-1984.
"Foobar 2000 Evaluation Updated," MonkeyBiz, Aug. 3, 2008, 4 pages (with partial English translation). http://monkeybizinfo.blogspot.jp/2008/08/foobar2000.html.
Gallardo et al., "Tangible Jukebox: back to palpable music", ACM TEI, pp. 199-202, 2010.
Gralla, "How the Internet Works", Millennium Ed., Que Corporation, Aug. 1999.
Hewlett-Packard Development Co; HP Open View Storage Data Protector Admin's Guideline Manual Edition; May 2003; Copyright 2003, 60 pages http://h20000.www2.hp.com/bc/docs/support/SupportManual/c00663793 1/c00663793.pdf.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 41, No. 1, Jan. 1998, "Safe Mechanism for Installing Operating System Updates with Applications," pp. 557-559.
ITouch 8 Plus brochure, JVL Corporation, 2005, 2 pages.
ITouch 27 New Games brochure, JVL Corporation, 2005, 2 pages.
Johnny Rockets Name That Tune [online], [retrieved Mar. 7, 2002]. Retrieved from the Internet: <http://www.johnnyrockets.com/docs/funstuff.html>.
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Merriam Webster's Collegiate Dictionary, Tenth Edition, Merriam-Webster, Inc., p. 361 (definition of dynamically).
Merriam Webster's Collegiate Dictionary, Ninth Edition, Merriam Webster, Inc., p. 1148, 1986 (definition of "Stand").
Mickey B's Jukebox Revue—Name That Tune! [online], [retrieved Jul. 23, 2001]. Retrieved from the Internet: <http://mickeyb.com/tune/>.
Mod Box Internet brochure, Merit Entertainment, 2006, 2 pages.
Newsome et al., "Proxy compilation of dynamically loaded java classes with MoJo", ACM LCTES, pp. 204-212, Jun. 2002.
Patent Abstract of Japan vol. 95, No. 010 & JP 07 281682 A (Naguo Yuasa), Oct. 27 1 JP 07 281682, figure 1-6 abrége.
Peter Pawlowski, "Basic Player Whose Appearance and Functions can be Customized Freely 'Foobar 2000' v1.0 is Unveiled,"Windows Forest, Japan, Jan. 12, 2010, 3 pages (with partial English translation). http://forest.impress.co.jp/docs/news/20100112_ 341870.html.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
Stewart, "Ecast Deploys Marimba's Castanet to Power an Internet-Based, Entertainment Management System for the Out-of-Home Market", Marimba, Press Release, 3 pages, www.marimba.com/news/releases/ecast.dec13.html, Dec. 13, 1999.
Strauss et al., "Information Jukebox a semi public device for presenting multimedia information content", Pers. Ubiquit Comput, 7, pp. 217-220, 2003.
Tom & Liz's Name That Tune [online], [retrieved Jul. 23, 2001]. Retrieved from the Internet: <http://home.att.net/~tomnliz/Music.html>.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
"Robotic Wafer Handling System for Class 10 Environments" IBM Technical Disclosure Bulletin, vol. 32, No. 9A, Feb. 1990, pp. 141-143.
"High-speed Opens and Shorts Substrate Tester", IBM Technical Disclosure Bulletin, vol. 33, No. 12, May 1991, pp. 251-259.
"Darts Revolution Again", Replay Magazine, Mar. 1991, pp. 146-148.
Galen A. Grimes, "Chapter 18, Taking Advantage or Web-based Audio."

(56) References Cited

OTHER PUBLICATIONS

Petri Koskelainem "Report on Streamworks™".
W. Richard Stevens, "TCP/IP Illustrated: vol. 1, the Protocols".
Nowell Outlaw "Virtual Servers Offer Performance benefits for Networks Imaging".
Notification of Re-Examination in Chinese Appln. No. 200610005134.8 Nov. 6, 2015.
Examiner's Report in related Canadian Application No. 2,881,503 dated Mar. 17, 2016.
European Examination Report dated Aug. 17, 2016 in European Appln No. 12 075 107.8.
Japanese Office Action in JP Appln. No. 2015-165266 mailed Oct. 18, 2016.
Canadian Office Action Application No. 2, 881,533 mailed Aug. 30, 2016.
Yuki Murata, iTunes no 'Kankyo Settei' Catalog & Tips 10 Sen, Mac People, ASCII Corporation, Oct. 1, 2007.

* cited by examiner

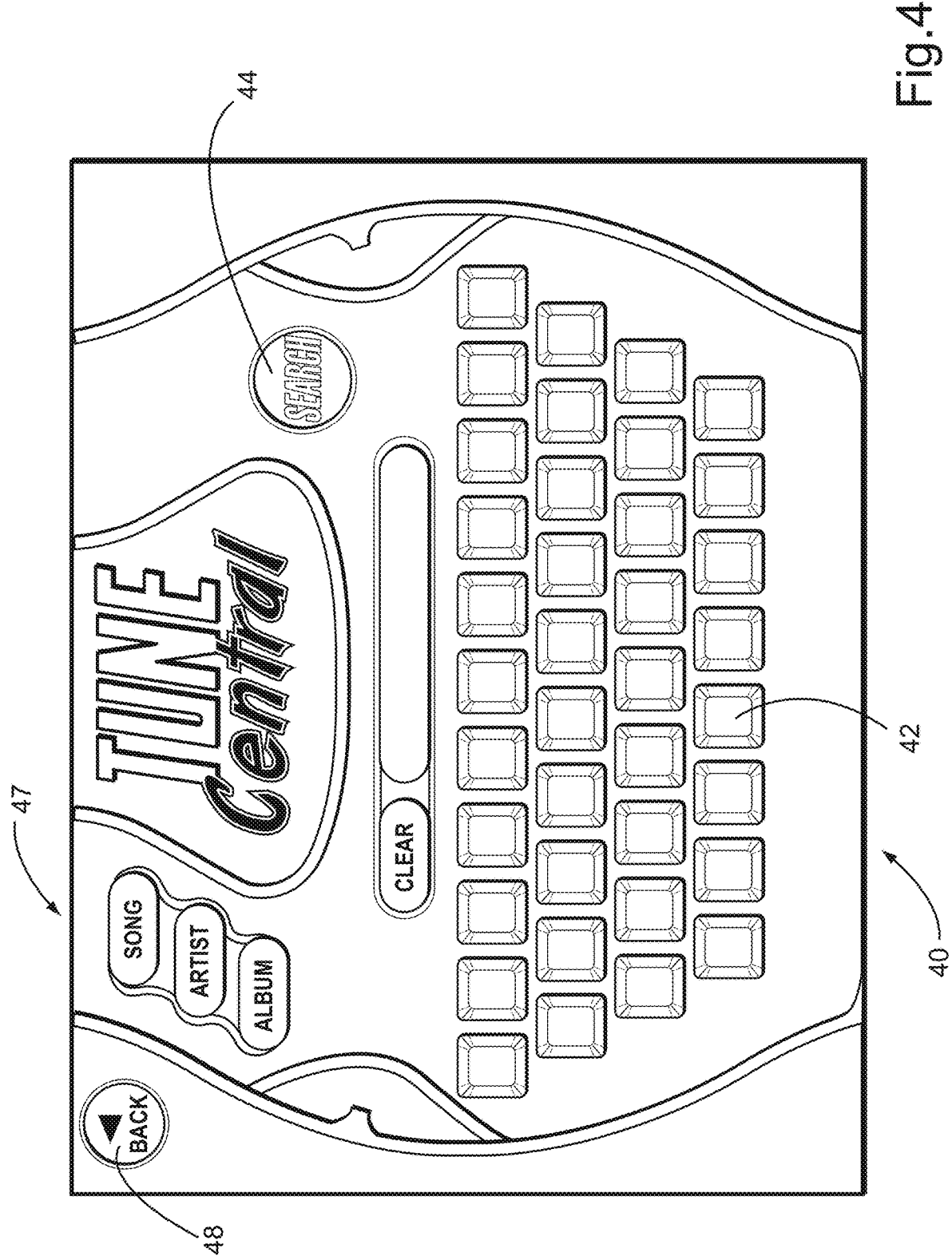

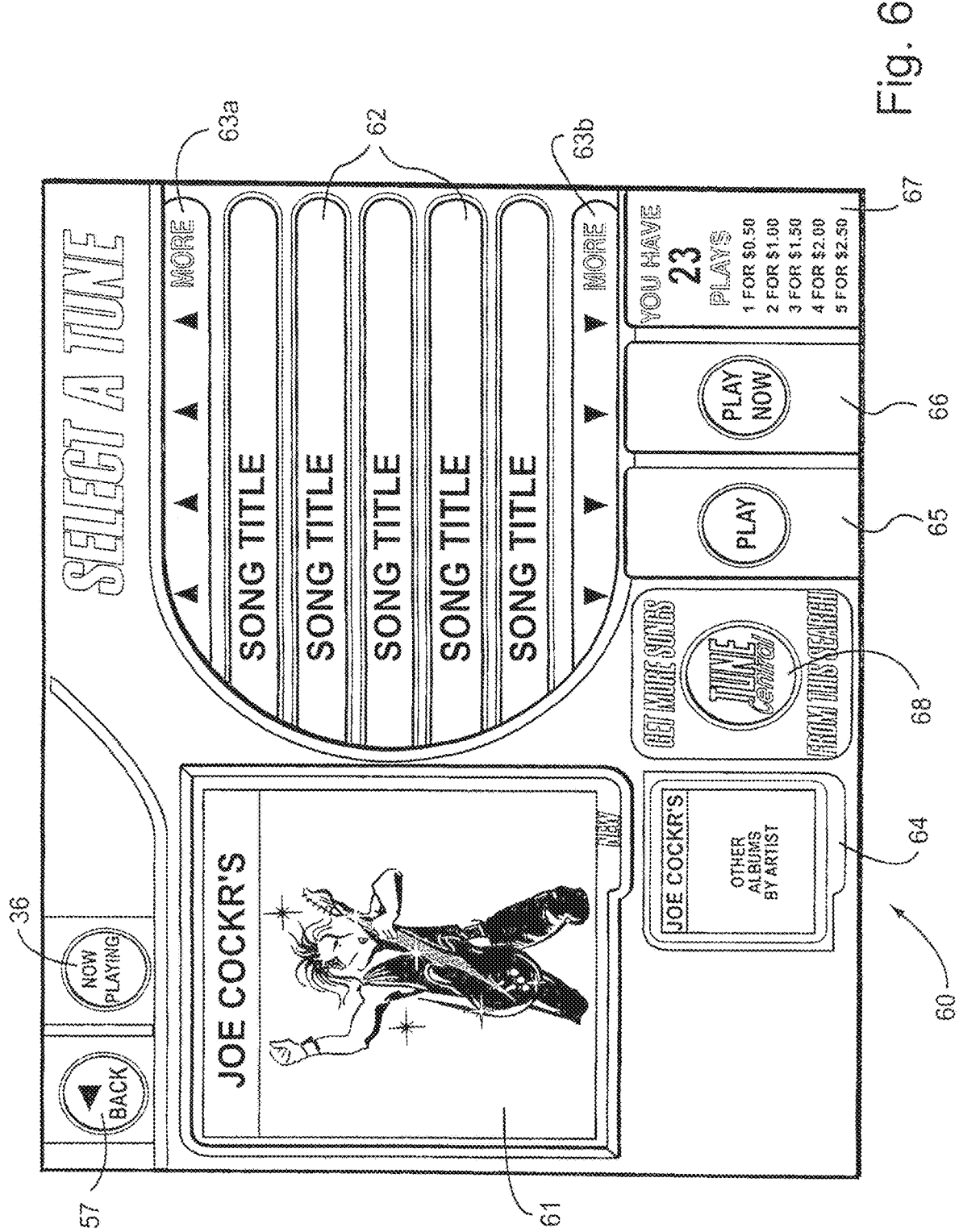

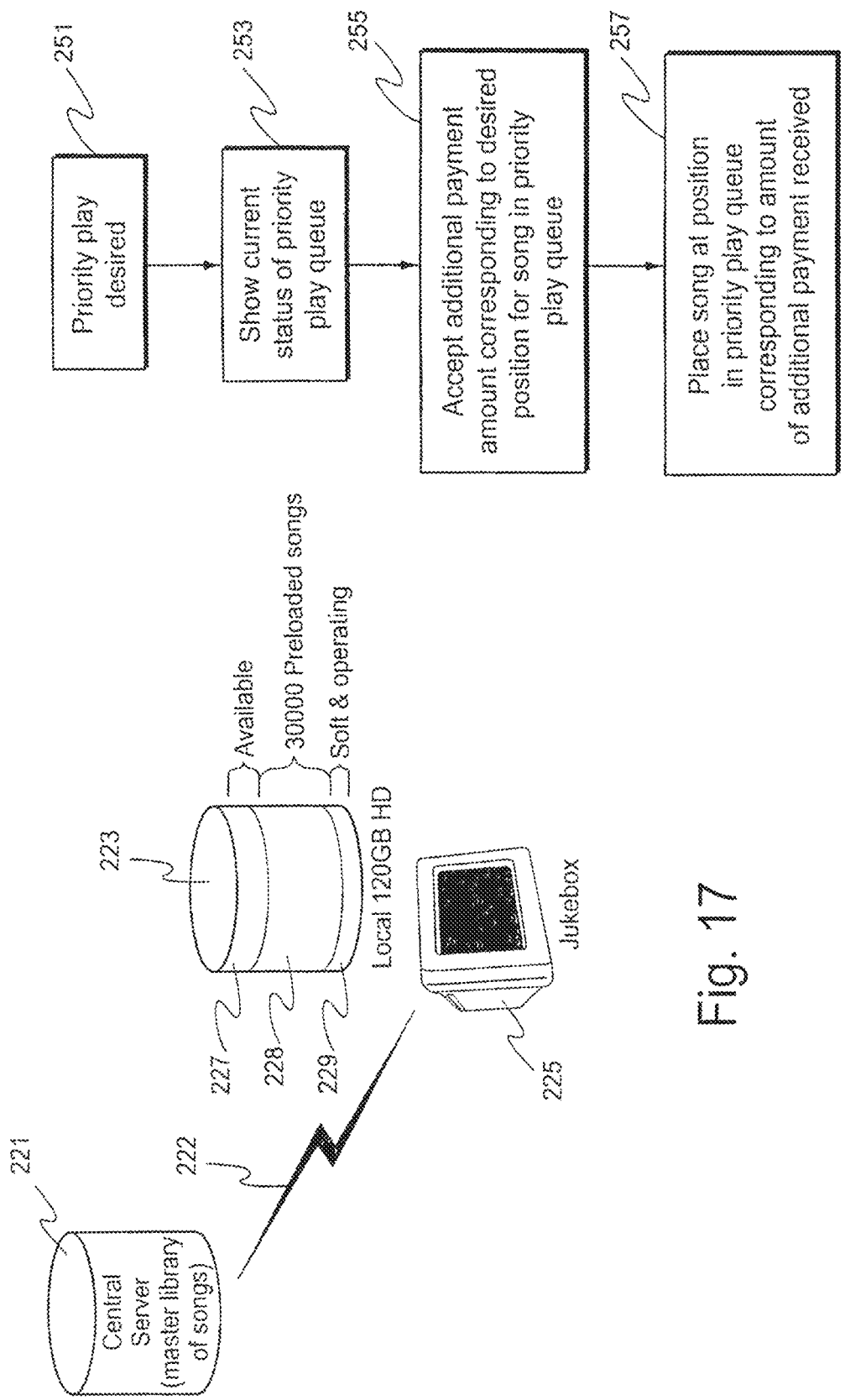

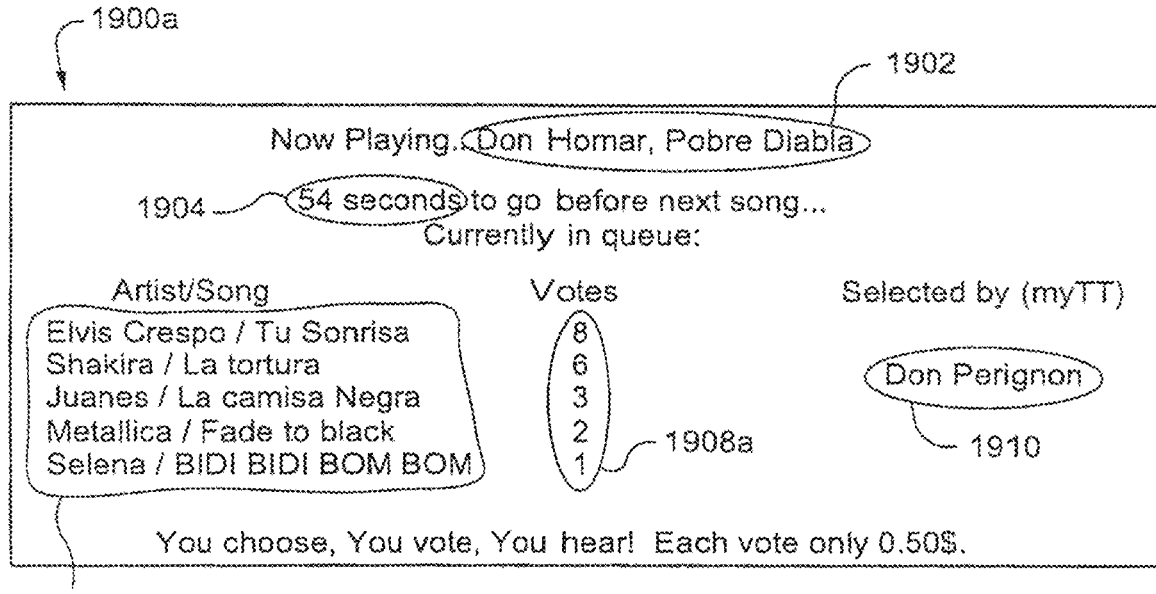
Fig. 19B(1)
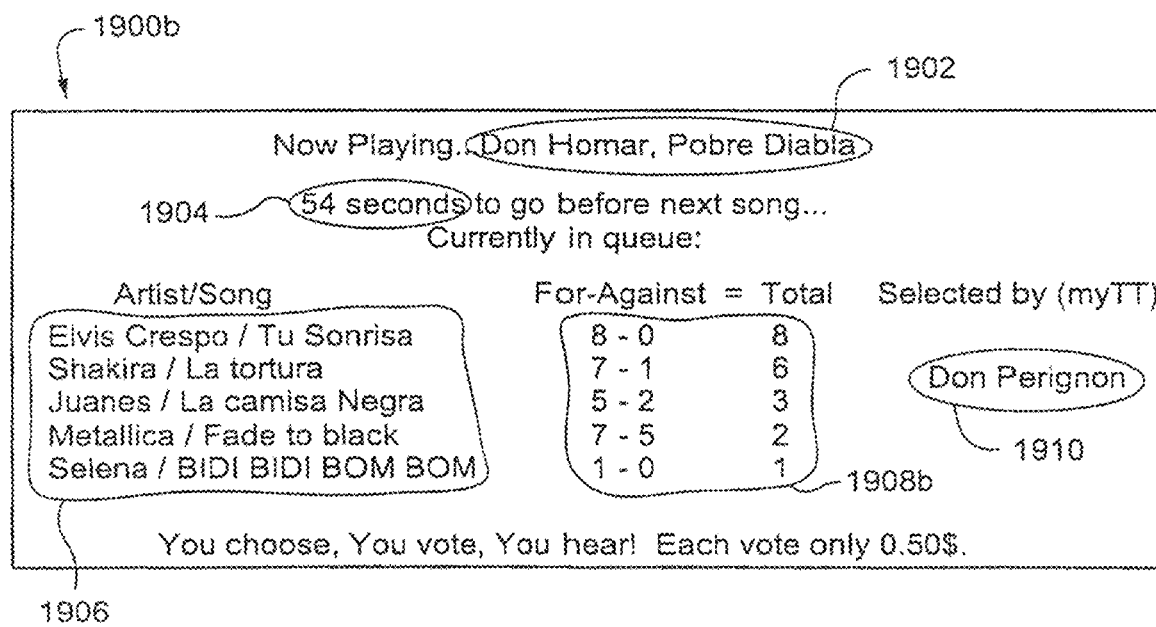
Fig. 19B(2)

Fig. 26D

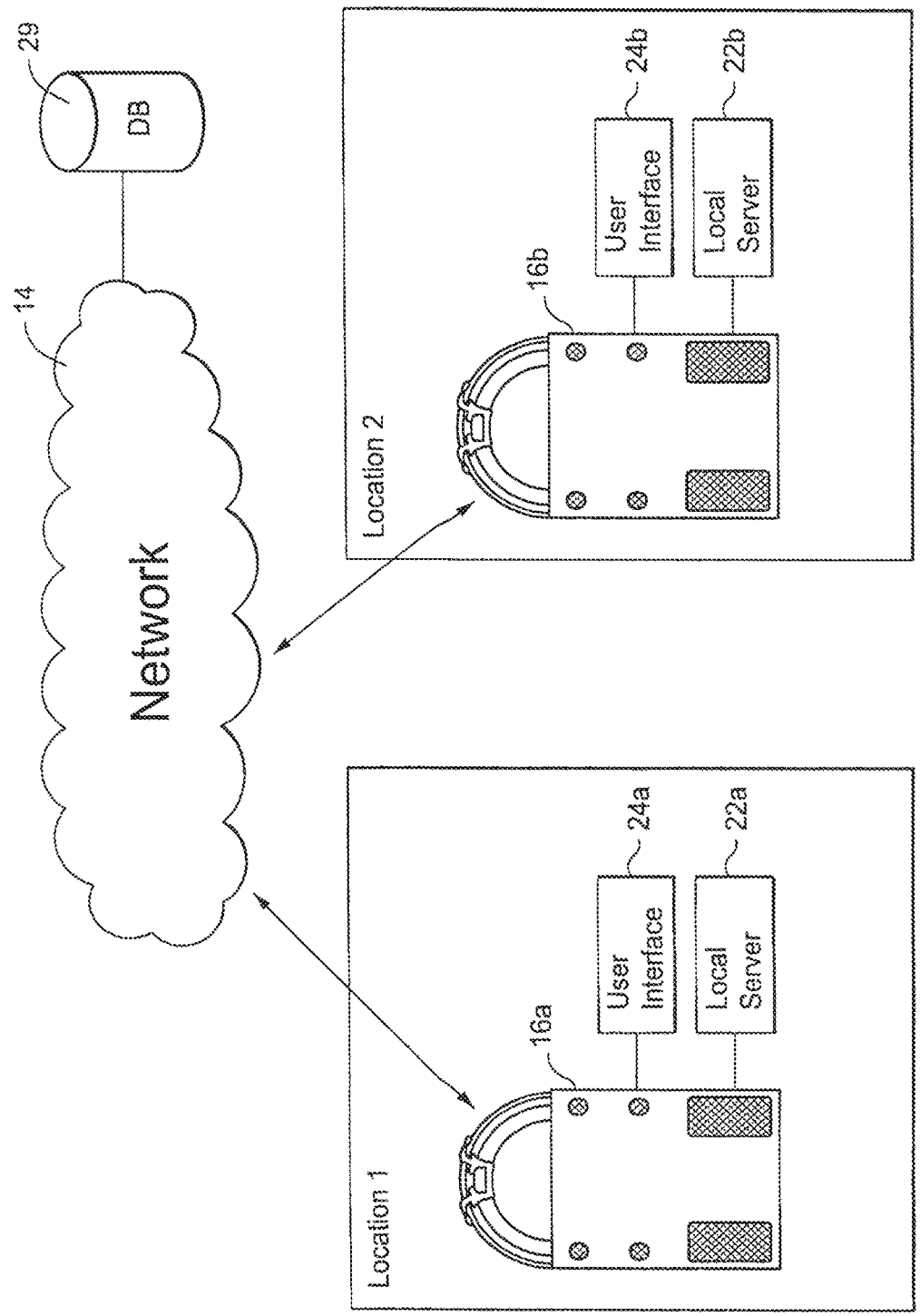

Fig. 39

DIGITAL DOWNLOADING JUKEBOX WITH ENHANCED COMMUNICATION FEATURES

CROSS-REFERENCES TO RELATED APPLICATIONS

This application is a continuation of application Ser. No. 11/902,658 filed Sep. 24, 2007, which is a continuation-in-part of application Ser. No. 11/727,391 filed Mar. 26, 2007, now U.S. Pat. No. 7,822,687 issued Oct. 26, 2010, which is a continuation-in-part of application Ser. No. 11/358,721 filed Feb. 22, 2006, now U.S. Pat. No. 8,332,895 issued Dec. 11, 2012, which is a continuation-in-part of application Ser. No. 11/222,036 filed Sep. 9, 2005, now U.S. Pat. No. 8,151,304 issued Apr. 3, 2012, which is a continuation-in-part of application Ser. No. 11/185,974 filed Jul. 21, 2005, now U.S. Pat. No. 8,103,589 issued Jan. 24, 2012, which is a continuation-in-part of application Ser. No. 10/661,811 filed Sep. 15, 2003, now U.S. Pat. No. 9,646,339 issued May 9, 2017, which claims priority on provisional patent Application No. 60/410,832, filed Sep. 16, 2002, entitled "Digital Downloading Jukebox System With Central And Local Music Servers," the entire disclosures of which are incorporated herein by reference.

FIELD

The instant invention relates to, for example, jukebox systems and, more particularly, to digital downloading jukebox systems of the type which typically include a central server and remote jukebox devices that communicate with the central server for royalty accounting and/or content updates and, still more particularly, to jukebox systems that provide user-tailored music management, communications, and other tools for recognized users using the jukebox system. Exemplary embodiments of the instant invention improve such systems by providing a local server for each jukebox device in the jukebox system network. The local server provides a second and more expansive source of content (e.g., audio and/or visual data) that can be selected by a user of the jukebox device for reproduction on the jukebox device. The local servers may provide a mirror of or subset of the central server, thereby enabling the entire library of audio and/or visual data, or at least the most requested content, to be conveniently available to each jukebox device without the need to download requested content, that is not available on the mass storage device of the jukebox device itself, from the central server. The collective group of local servers may also act as a network of distributed content servers that can be controlled by the central server through each jukebox device to provide services to other devices, such as, for example, other jukebox devices. In addition, the jukebox device and local server can, under control of the central server, operate as a "central hub" or management device for various downloadable fee-based devices present in a location with the jukebox device.

Exemplary embodiments additionally can provide other mechanisms to enhance individual recognized users' experiences, such as, for example, by allowing users to create and manage playlists that can be retrieved on one or more jukeboxes, create and manage buddy lists that can send messages to individuals or broadcast to large groups of individuals, etc. In other words, in one embodiment, the jukebox includes features which enable the jukebox to recognize specific jukebox users, through prior registration or the like, and to provide user-specific services to the user. For example, the jukebox may allow the recognized user to create, edit and/or store custom playlists on the jukebox that can be selected by the user or other registered users designated by the creator of the playlist for play on the jukebox. The jukebox may also allow registered users to communicate with other registered users through the jukebox. Registered users may also be provided with credit on the jukebox so that cash is not necessary for using the jukebox services. The jukebox may also be used to provide background music services in addition to conventional jukebox services in a unique and advantageous manner as described herein. The jukebox may additionally increase a sense of ownership by interacting with a interactive application accessible at a location remote from the jukebox, such as, for example, via the Internet. The remote application may connect individuals to an online community through which users can, for example, communicate with other users, build playlists, share playlists, suggest music to others, participate in promotions, link to targeted advertisements, etc. Additionally, the jukebox and/or remote application may allow users to download information to a portable device, such as, for example, a cell phone, a personal digital assistant, an MP3 player, etc. In certain exemplary embodiments, users' actions on jukeboxes and/or via remote interfaces may be represented by avatars specific to and/or customizable by the user.

BACKGROUND AND SUMMARY

Jukeboxes have been around for decades and provide users with the ability to select desired music for reproduction in a convenient and advantageous manner. Jukeboxes have conventionally been provided in commercial establishments, such as restaurants and bars, in order to provide desired music on demand for patrons thereof for a fee. Over the last several years, a new generation of jukebox devices have become available that provide significant improvements in the operation thereof for all parties involved. More specifically, the conventional standalone phonorecord and CD jukeboxes are being replaced by digital downloading jukeboxes that are controlled by and communicate with a central server. An example of this new generation jukebox system is shown in U.S. Pat. No. 6,308,204, the entire disclosure of which is incorporated herein by reference. A leading provider of this new generation of jukebox systems is TouchTunes Music Corporation.

FIG. 1 shows an overview of an exemplary embodiment of a digital downloading jukebox system 10 (hereinafter referred to simply as a "jukebox system"). As shown in FIG. 1, the jukebox system 10 includes a central server 12 that contains a master library of audio content (typically music), as well as or alternatively audiovisual content (typically music and associated video or graphics), that can be downloaded therefrom. The jukebox system also includes a series of remote jukebox devices 16, 16a-16f. Each of these jukebox devices are generally located in a bar, restaurant, club or other desired location, and are operable to play music in response to receiving a payment from a user, such as coins, bills, credit/debit card, etc., and having one or more songs selected by the user for play. In an alternative embodiment, a music service is paid for on a subscription basis by the location, and the selected music is free for the end-user. The jukebox device 16 typically includes a screen 18 that presents information to the user and allows the user to select songs therefrom, as well as an audio system 20 that plays the selected songs. The screen 18 may also be used for displaying song-related video or graphics. The screen 18 may also be used to display advertisements for the jukebox itself in order to attract customers thereto, to display other types of advertisements, and/or to display any other desired information.

The jukebox devices 16 (sometimes referred to as simply "jukeboxes" herein) are operable to communicate with the central server 12 through a communications network 14, such as, for example, the Internet. The jukeboxes 16 periodically communicate with the server 12 in order to provide information to the server 12 regarding the specific songs that have been played on the jukebox. The central server then uses this information in order to determine the appropriate royalties and/or other payments that are owed for songs played on each jukebox. Thus, one significant advantage of this new generation of jukeboxes is that the sound reproduction and/or other applicable music rights can be adhered to in a more accurate and reliable manner, thereby assuring the proper royalties are paid to the artists or music owners. The central server 12 can also provide new songs to the jukebox 16 in order to assure that the appropriate or most popular songs are maintained on the jukebox based on the specific customers at that location. Thus, the songs available on each jukebox can be customized through communication with the central server in order to provide the songs and/or types of music that customers generally request at each jukebox location. As described in the above-referenced U.S. Pat. No. 6,308,204, the central server can also advantageously be used to update the operating software on the jukeboxes in order to, for example, change the operation of the jukebox, such as to provide new or improved features. Thus, another significant advantage of this new generation of jukeboxes is that the songs (or other audio and/or visual content), and the operation of the jukebox itself can be remotely changed as desired without the need to have someone (such as a routeman) personally service the jukebox. Instead, such updates can be done using the central server 12.

As indicated above, the jukebox devices 16 each include a mass storage device, such as a hard drive, which stores the songs and associated video/graphics data (if any), as well as any other desired graphical information for reproduction on the jukebox. The mass storage device of the jukebox typically has limited storage capacity relative to the storage device of the central server 12. As a result, only a fraction of the songs stored on the central server are typically stored on the mass storage device of the jukebox at any one time. There may be other reasons as well, such as for security of the data or limited room in the jukebox itself, for having limited storage capacity on the jukebox and/or limiting the number of songs stored thereon. For example, physical space may be limited on wall-mount jukeboxes or the like, which are designed to be small in size as compared to free-standing models. As explained above, the songs on the jukebox can be changed through communication with the central server, but typically any one jukebox only stores a relatively small subset of the complete library of songs maintained by the central server at any one time.

In order to maximize the revenue that a jukebox generates, it is important to make the most desired songs available on the jukebox over time. If customers cannot find songs they like on the jukebox, usage of the jukebox (and the revenue generated thereby) will dramatically decrease. On the other hand, it is impossible to predict in advance exactly what a customer at any particular location will desire to play on the jukebox. In fact, there are likely many instances where a customer would have selected a song that exists on the central server but is not currently present on the jukebox. As a result, the jukebox may not be enjoyed and used to its fullest extent. In order to address this problem and increase revenue, jukebox systems have in the past provided a feature which enables the user to search for songs on the central server from the jukebox and request an immediate download of a desired song from the central server to the jukebox for an additional fee. This feature enables the user to play any song in the master library of songs maintained by the central server using the jukebox, regardless of whether or not the specific song is presently stored in the mass storage of the jukebox itself. Thus, the user can first look for desired songs on the local storage of the jukebox and then, if desired, search further on the central server for desired songs. The jukebox device typically charges an additional fee (such as five credits instead on one credit) for an immediate download and play of a song from the central server as opposed to a standard play directly from the jukebox's local storage.

One problem, however, with the immediate downloading feature is that it is desirable to have an immediate and high speed connection with the central server to implement. In addition, the central server and network must be prepared for and capable of handling such requests in a reliable and efficient manner for the feature to properly operate. These requirements cannot always be met and, as a result, implementation of this feature has been limited. For example, many locations that have jukeboxes do not have high speed connections (such as DSL) and instead use dial-up modem connections. Jukeboxes which rely on dial-up connections generally are only designed to communicate with the server periodically and do not allow the user to immediately download a song. They have, however, enabled a user to vote for a song to be downloaded at a later time when the dial-up connection is made. This, of course, is not as satisfying to the user as being able to immediately download a song. Other problems can arise in connection with this download feature if the network or server is not currently available for the download, due to traffic, malfunctions or the like.

For most users, a relationship with a jukebox extends only as far as a choice of songs to play. Casual users may find it difficult to make selections rapidly and/or to locate specific songs. Regular users, however, frequently choose the same songs, and they may become frustrated with always having to make the same selections. Both problems may result in a loss of revenue from intimidation, frustration, etc.

Thus, it is a feature of the exemplary embodiments to create a relationship between the jukebox and the patrons, in view of the further feature of creating a relationship with a whole community of jukebox users. Such a system can establish a trust relationship between the jukebox and the patrons, while also creating a sense of ownership for the patrons by allowing them to customize their services and communicate with their friends. Such a relationship and feeling of ownership can greatly increase the convenience of using a jukebox and its related services while also decreasing intimidation, frustration, etc.

In certain exemplary embodiments described herein, the jukebox can be made the centerpiece for music services as well as other services that enhance the experience of users as well as the revenues of location managers. For example, a jukebox can become a contact point at a given location through which users can reach out to their friends. For instance, users may call a get together using the jukebox, share music through the jukebox system, or meet up at a jukebox if they become separated at a crowded club. Similarly, a jukebox can become, for example, a contact point at a given location through which the manager of the location can reach out to customers. For instance, a manager can advertise specials, notify regulars of special events, etc. Such communications can be initiated by users, by location managers, or by the jukebox itself.

When jukebox users leave a location, their connection to the music, and, more particularly, the jukebox itself, typically ends. Users provide massive amounts of data to the jukeboxes, such as, for example, which users like certain types of music or certain songs, when they listen to music, how frequently they listen to it, etc. With conventional jukeboxes, this information is not leveraged to provide additional features and/or services to interested users. Thus, collected information typically is wasted, and users experience only a fleeting sense of ownership. Users cannot, for example, recreate the experience of a particular night out.

Proprietors also lose out, because their connection to jukebox users disappears when users leave their establishments. Thus, proprietors lose customers until they return and are forced to rely on traditional, often ignored, methods of bulk advertisement. This form of advertising typically lacks specificity and does not reflect a personalized sense of belonging for users. Additionally, proprietors also cannot recreate specific events at which, for example, they had a particularly profitable nights.

Online communities typically, for example, on the Internet, have sprung-up to try to connect disparate users in a virtual space. These communities provide potentially continuous access to a broad range of features and users alike. However, conventional online communities are virtual only—when a user steps away from a computer, the connection, quite literally, is broken. Thus, while users may access this broad host of features and customize their experiences and even build an online persona complete with, for example, buying and viewing habits, the experience is fleeting.

By connecting jukebox users through an online community, however, the information provided to the jukebox can be used to provide a variety of features and services to the users. And, because jukeboxes are present at thousands of meeting points, connections exist at thousands of physical locations apart from the online virtual community. Thus, by leveraging the data collected by jukeboxes and tying users to an online community, a mixed real-and-virtual community may be established, for example, creating a lasting sense of ownership, personalizing services for potentially all users, drawing users together, establishing a vibrant socially active community of users connected by music, etc. Proprietors may similarly benefit by, for example, achieving a pipeline to additional business by connecting with customers while they are away from their locations, thus drawing them to their locations, etc.

In essence, a jukebox with an associated remote application can, for example, change users' perceptions of jukeboxes. Jukeboxes need not be stand-alone devices accessible only at bars. Rather, the instant invention allows users to consider jukeboxes as, for example, media centers, meeting points, portals to online communities, etc.

Moreover, with the advent of web-enabled portable devices (such as, for example, cell phones, personal digital assistants, etc.), users even can take the virtual community with them wherever they go. Users potentially may use portable devices to directly download music at any time, such as, for example, when they hear a song at home, in the car, at a bar, etc.

In certain exemplary embodiments, users' actions on jukeboxes and/or via remote interfaces may be represented by avatars specific to and/or customizable by the user. Jukeboxes may include avatar action programmed logic circuitry (e.g., any appropriate combination of hardware, software, or the like) to take actions on behalf of and/or represent the actions of the user. Such actions may include introducing songs with audio and/or video, singing and/or dancing along with music, marking online transactions (e.g., messages, postings, file transfers, etc.), etc. As such, user avatars may yet further increase senses of ownership and/or belonging, drawing users to jukeboxes. Moreover, avatars may further increase the enjoyment of the individual user, regular patrons, and/or newcomers to an area There is a need for an improved jukebox system that addresses various needs of users, location owners, and operators. The instant invention is designed to address these and other issues and to provide enhanced functionality for such jukebox systems.

BRIEF DESCRIPTION OF THE DRAWINGS

These and other features, objects and advantages of the instant invention will be further understood by review of the following detailed description of the exemplary embodiments when read in conjunction with the appended drawings, in which:

FIG. 4 is another screen shot showing an exemplary search screen for use in searching for songs on the local server in accordance with a preferred embodiment;

FIG. 6 is another exemplary screen shot showing an alternative method of allowing access to the downloading feature;

FIG. 17 shows the relationship between a jukebox with expanded media storage and a central server;

FIG. 19 is a flowchart showing an exemplary process for a priority play queue with prioritization-based-on-bidding capability;

FIG. 19B(1) is an exemplary screenshot showing a voting queue display;

FIG. 19B(2) is another exemplary screenshot showing a voting queue display;

FIG. 29E is another block diagram of an improved downloading digital jukebox system with another downloading digital jukebox system outside of a particular location accessing the first digital jukebox system;

DETAILED DESCRIPTION OF EXEMPLARY EMBODIMENTS

Figure 1:
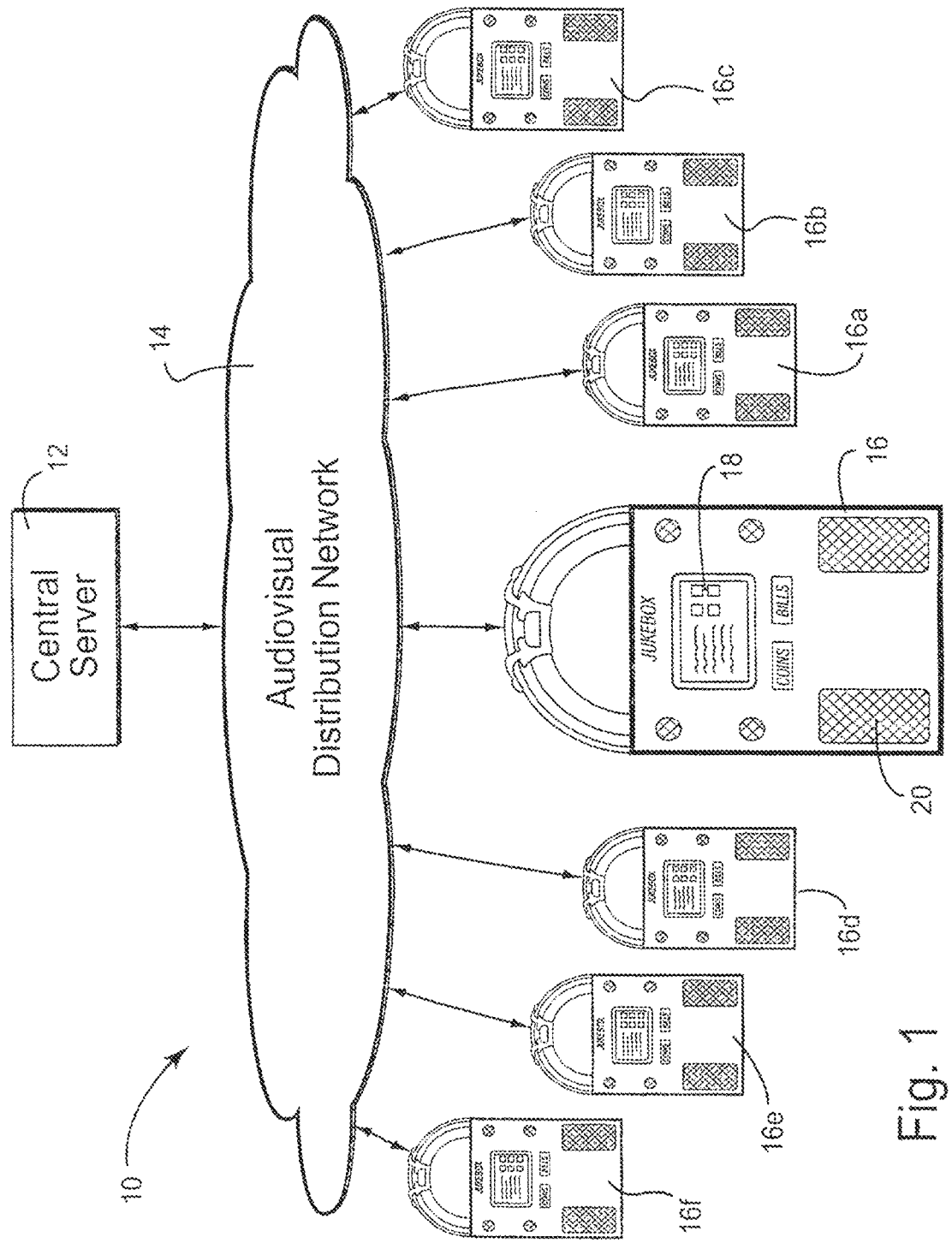
FIG. 1 is a block diagram of a conventional downloading digital jukebox system.
Figure 2:
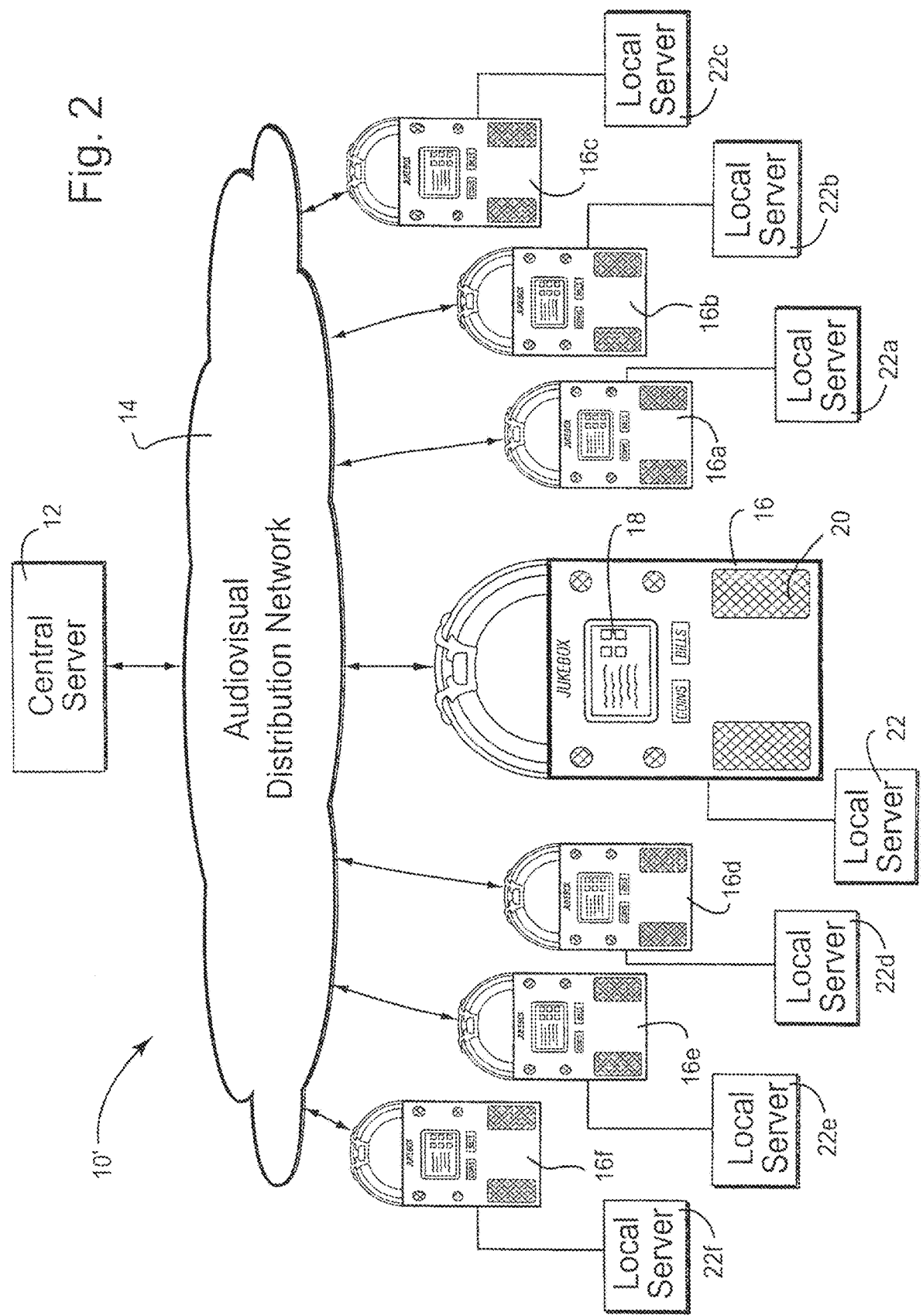
FIG. 2 is a block diagram of the improved downloading digital jukebox system in accordance with a preferred embodiment.

Referring now to the drawings, FIG. 2 shows a block diagram of an exemplary preferred embodiment of an improved jukebox system 10'. The jukebox system 10' includes similar elements as shown in FIG. 1 and described above, including a central server 12, communications network 14, and remote jukebox devices 16, 16a-16f. However, the jukebox system 10' further includes local servers 22, 22a-22f respectively connected to each of the jukebox devices 16, 16a-16f. The central server 12 includes a master library of songs (and/or other content). Each of the jukebox devices includes a subset of the master library on a local storage device of the jukebox. The central server may be used to individually manage the contents of the jukebox device, by monitoring usage of and updating the subset of songs on each of the jukebox devices with the intent of maximizing the usage thereof. The central server 12 periodically receives data from each of the jukeboxes for the purpose of royalty accounting and payment for songs played. The jukebox devices may connect to the network in any suitable manner, such as dial-up modem or broadband modem (e.g., DSL, cable, wireless broadband, or satellite). The communications network 14 may be any suitable network capable of distributing data (e.g., audiovisual data) from the central server 12 to the jukeboxes 16 and enabling data to be uploaded from the jukeboxes 16 to the central server 12.

The songs (and/or other data) are preferably digitized, compressed and encrypted by the central server 12 prior to sending songs to the jukeboxes for security and bandwidth purposes using known techniques. The songs are then decompressed and decrypted by the jukeboxes for storage and reproduction thereon. Thus, each of the jukeboxes maintains in a database a library of digitized songs for play on the jukebox, wherein the library can be changed or updated through communication by the central server. The jukeboxes preferably also receive and store data constituting images (e.g., still and/or moving video and/or graphical images) that can be displayed on the display 18 of the jukebox device 16. In one exemplary embodiment of the invention, the jukebox devices have similar structure and operation described in U.S. Pat. No. 6,308,204 referenced above. Thus, the jukebox devices 16 each preferably include one or more microprocessors, such as a main CPU and an audio DSP, a memory, such as a hard drive, for storing songs and/or other content, a display of displaying visual items, an audio arrangement 20 for providing audio, a communication system for enabling the jukebox to communicate with the central server 12 through the communications network 14, and operating software, preferably including a multitasking operating system, that controls the operation of the jukebox. The operating software is also preferably updateable through communication with the central server 12 as described, for example, in U.S. Pat. No. 6,308,204 referenced above. The jukeboxes 16 further include one or more payment devices, such as coin, bill and/or credit card input devices, for enabling a customer to pay for usage of the jukebox device in a convenient manner. The screen 18 is preferably a touch screen that enables the user to input selections by touching the screen.

Each jukebox device has, in one embodiment, a local server 22 that can be accessed by the jukebox device. The local servers are respectively connected to the jukebox devices using Ethernet or other type of local connection. In another embodiment, the local server may simply be a logical extension (e.g. partition, directory, or area) of the jukebox's hard drive, rather than a separate hardware device. The local servers 22 each preferably include a mirror copy of the master library of musical recordings maintained by the central server 12. The local server 22 can be loaded with the master library by the entity that owns and/or controls the jukebox network prior to shipping the local server and jukebox device to the jukebox distributor or operator. Of course, over time, the local sever will no longer correspond identically to the central server, due to the fact that the central server is preferably continually updated with additional or new songs. Thus, the local servers 22 are also preferably updated periodically to maintain a correspondence with the library on the central server 12. This updating can be done, for example, by the central server 12 through communication with the jukebox devices connected with the local servers 22 using, for example, either dial-up or broadband modems. Alternatively, the updating can be done personally with an update tool that can be connected by a routeman or other person directly to the jukebox or local server for the purpose of updating the contents of the local server. The portable tool could include a removable storage medium, such as a hard drive, that could be returned to and reused by the owner of the jukebox system for future updates. The tool itself could be kept by the operator or other person in charge of maintaining specific jukeboxes for use upon receipt of the updated removable storage medium from the owner of the jukebox system.

For security reasons, the local server 22 preferably does not include all of the digital data that constitutes any one song that is stored on the local server 22. In addition, the part of the song that is on the local server is encrypted. The jukebox device 16 contains the missing part of each of the songs on the local server, thereby enabling the jukebox to assemble the complete song based on the contents of the local server and the memory on the jukebox device. The missing data located on the jukebox is needed in order to decrypt the songs. For example, a single block (or other small fraction) of data for each song may be missing on the local server but present on the jukebox device, and the encryption may be based on the missing block and may proceed on a block by block basis. Thus, none of the blocks can be decrypted without obtaining and/or decrypting a preceding block. This feature provides significant security and prevents or deters theft or other type of unauthorized use or copying of the songs on the local server. Thus, in this embodiment, each local server must be specifically assigned to a specific jukebox device so that the decryption described above can be properly performed.

In accordance with a preferred exemplary embodiment, the local servers may also each be individually registered with and identified to the central server 12, so that the central server can individually manage and monitor each local server. The same is true for the jukebox device itself, i.e., it may also preferably be registered with the central server so that it too can be individually monitored and managed by the central server. As will be understood from the foregoing description, the local servers become an important and advantageous part of the jukebox system by allowing the contents thereof to be accessed by the jukebox device to provide additional services (such as providing additional songs) not available on the jukebox device itself. As will be explained below, the song library of the central server and/or the storage capacity itself can be advantageously used to provide services to other jukeboxes, such as fee-based residential and commercial jukeboxes and/or other fee-based equipment. One preferred use of the local servers may be to provide an immediate song downloading feature for the jukebox device will now be described below in detail with reference to the exemplary screen shots of FIGS. 3-6.

Figure 3:
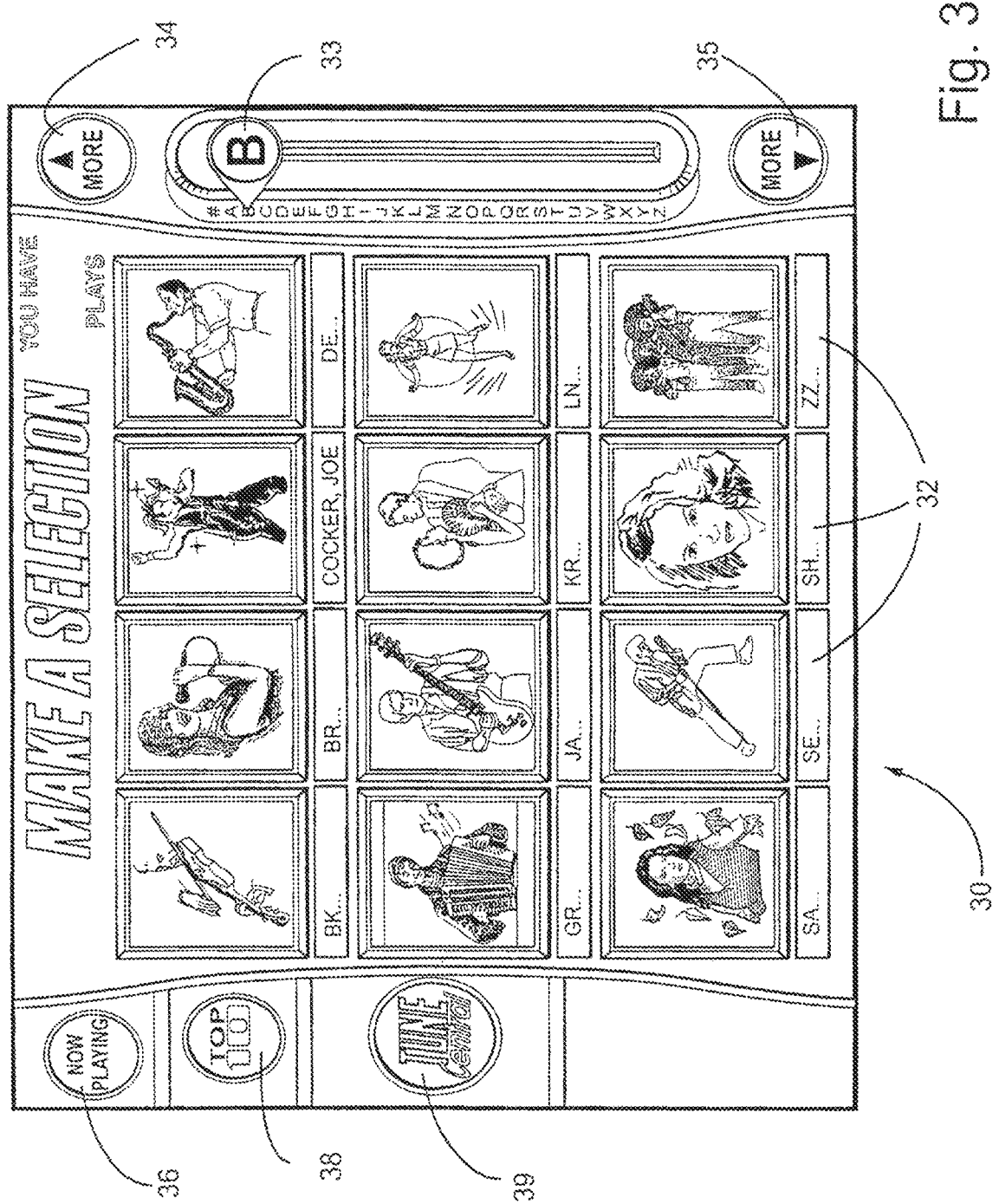
FIG. 3 is an exemplary screen shot showing an initial selection screen in accordance with a preferred embodiment of the jukebox system.

FIG. 3 shows an exemplary screen shot for a music selection screen 30 as displayed on the touch display of the jukebox device. As can be seen in FIG. 3, this selection screen, which is preferably the initial selection screen displayed to a customer, includes graphical representations 32 of the various album covers for songs that are stored in the memory of the jukebox device. The albums covers are shown in alphabetical order and the virtual slide bar 33 can be used to scroll through the available albums. Up and down arrows (34 and 35) are also provided for stepping through the available albums. A "Now Playing" button 36 is also provided for showing information on the song currently playing on the jukebox (if any). A "Top Ten" button 38 is also provided for showing a list of the ten most popular songs on the jukebox. A "Tune Central" (TM of TouchTunes Music Corporation) button 39 is also provided, the function of which will now be described in detail with reference to FIG. 4.

If the user does not see an album of interest in the display of album covers or desires for any reason to search for available songs that are not present on the jukebox device, the user may select the "Tune Central" button 39. When the "Tune Central" button is pressed, the display on the jukebox is changed from that of FIG. 3 to that of FIG. 4. The exemplary screen shot of FIG. 4 shows a search screen 40 which enables a search to be performed on the local server 22 connected to the jukebox device. This screen 40 provides a virtual keyboard 42 for use in entering a search request. The search can be done by album, artist, song, or genres or themes (i.e. categorized lists of songs, preferably based on popularity, that help a user find a particular song), based on the associated buttons 47. Once a search is typed, the user touches the "Search" button 44 and a search of the contents of the local server is initiated. Input from the virtual keyboard can be cleared using the "Clear" button 46.

Genres may comprise, for example, "pop," "rock," "country," "rap," "R&B," "Blues," etc. Themes may comprise, for example, "Christmas," "Irish," "Birthday," etc. In some exemplary embodiments, these lists can be retrieved from the server, while in other exemplary embodiments the lists may be built dynamically, based on, for example, certain parameters. In still other embodiments, the server may select which lists to enable or send to the jukebox based on criteria, such as, for example, location, music type, etc. A system might only display genres and/or themes for which music is downloaded. However, a system might display all genres and/or themes and enable download of other songs not available to the local jukebox. It also will be appreciated that although FIG. 4C, discussed in detail below, shows the genres and themes on the same screen, other embodiments may present them separately.

Figures 4A, 4B:
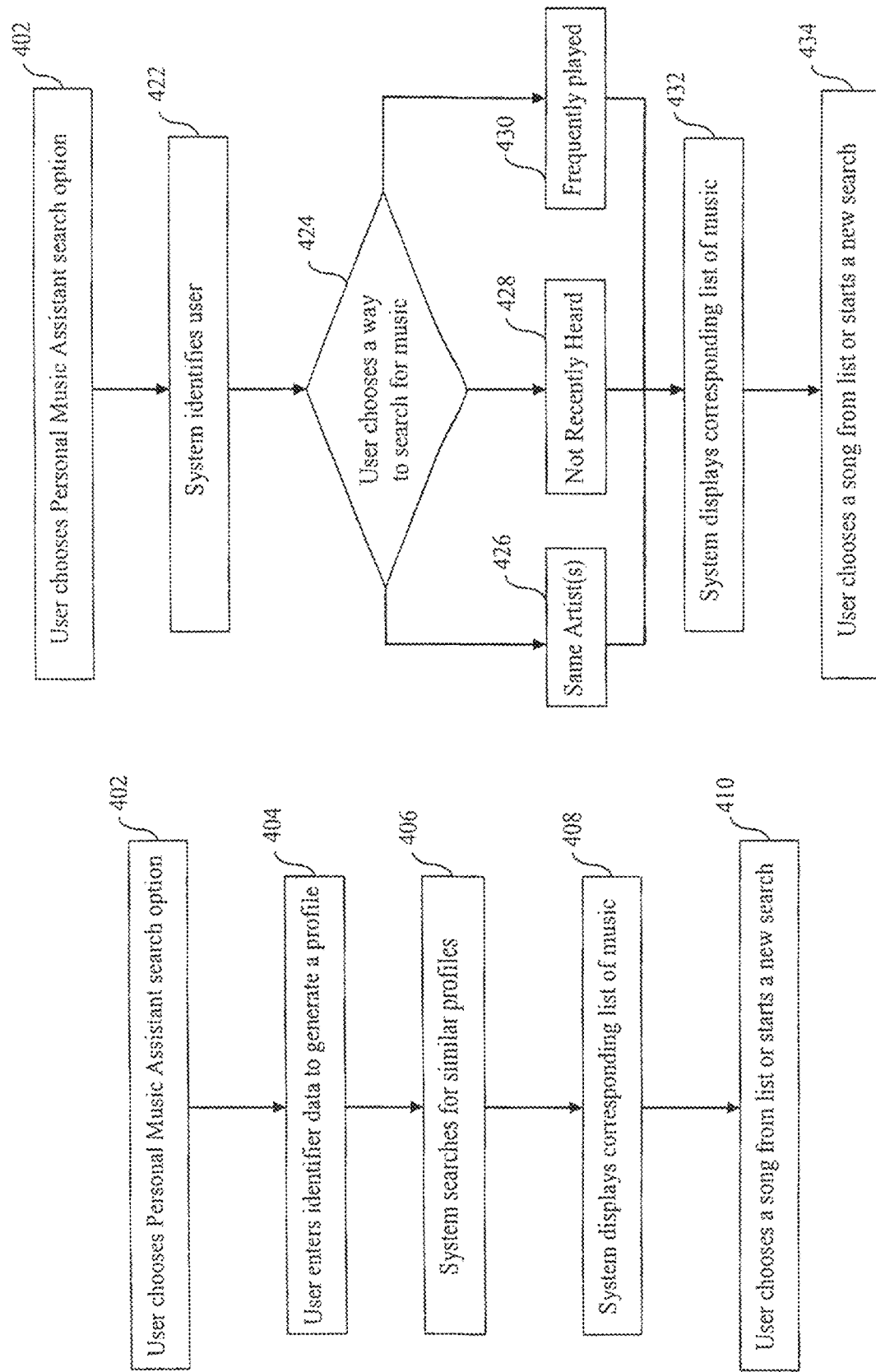
FIG. 4A shows an exemplary process for using a Personal Music Assistant to search for songs that might be appropriate for a user-specified profile.
FIG. 4B shows an exemplary process for using a Personal Music Assistant to search for songs that might be appropriate for a recognized user's profile.
Figure 4C:
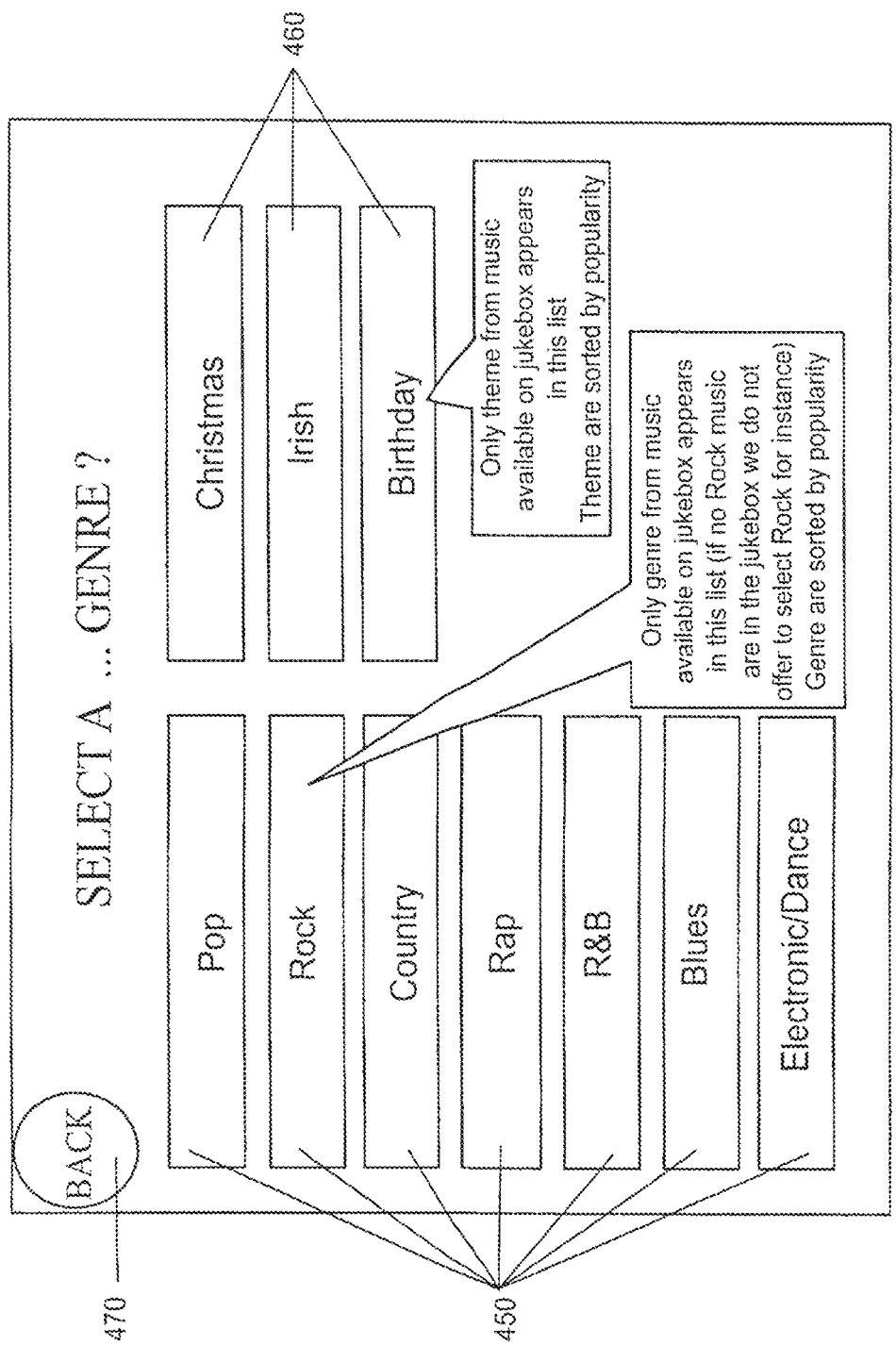
FIG. 4C is an exemplary screen shot showing a non-limiting list of genres and themes available to a user in accordance with one illustrative embodiment.

FIG. 4C is an exemplary screen shot showing a non-limiting list of genres and themes available to a user in accordance with one illustrative embodiment. Buttons 450 arranged on the left side of the screen correspond to themes available to a user, while buttons 460 arranged on the right side of the screen correspond to genres available to a user. Button 470 exits this selection mechanism. It will be appreciated that other arrangements of the buttons are available, and that the list of themes and genres provided is for non-limiting, illustrative purposes only.

Similar to the genres and themes search, a user may, for example, search for a song using a Personal Music Assistant, an exemplary process for which is shown in FIG. 4A. Preferably, after pressing a Personal Assistant button (step 402), the jukebox would ask certain information to identify the user if the user is not already identified (step 404). Such information could include, for example, age (or date of birth), preferred style, background, place of birth, or other information that could be used to generate a profile of the user. The jukebox then preferably could compare the profile information to selections made by other users with similar profiles (step 406) from, for example, the specific jukebox, the particular establishment, or a national database and recommend songs (step 408). For example, the jukebox might suggest a song by "The Doors" to a male user from California who was born in 1960. The user could then choose a song from that list or initiate a new search (step 410).

Furthermore, instead of entering identifiers, as shown in FIG. 4B, the Personal Music Assistant could recognize a user in other ways (step 422), such as, for example, after a credit card or a pre-programmed site-specific identification card is swiped by the jukebox. Preferably, the Personal Music Assistant would maintain a list of selections made by the user. The user's list of selections could be maintained, for example, on a local jukebox terminal, on a site's central jukebox server, on a remote server, or on an identification card, etc. After the Personal Music Assistant recognizes the user, it could then recommend songs based on, for example, songs by the artists the particular user enjoys (step 426), songs played frequently by the user (428), songs not heard recently by the user (430), etc.

Additionally, a Personal Music Assistant recognizing, for example, a preferred customer or a customer with a large number of credits might morph the jukebox into a jukebox more enjoyable to that specific user. In a related feature, certain patrons may "rent" a jukebox for, for example, a special occasion. Accordingly, a patron could pay a certain amount of money to morph the jukebox into a particular type of jukebox. For example, a patron having a party (e.g. a birthday party) at a particular location could rent a jukebox and morph it into a jukebox that allows only that patron's favorite songs. In another related feature, a patron could exclusively rent a jukebox and prevent others from selecting songs by, for example, programming a playlist through another device (e.g. the web or other communications network operably connected to the jukebox system) or by restricting access to the jukebox through a password or the like. Credits could be, for example, purchased by the user; or given to the user as a reward, for example, for purchasing drinks or souvenirs at an establishment, or for being a regular repeat customer. Thus, a Personal Music Assistant could be implemented in a manner that makes selecting songs a more enjoyable, dynamic, and responsive process while removing the immediate pressure placed on the user to know which song to choose.

Figure 5:
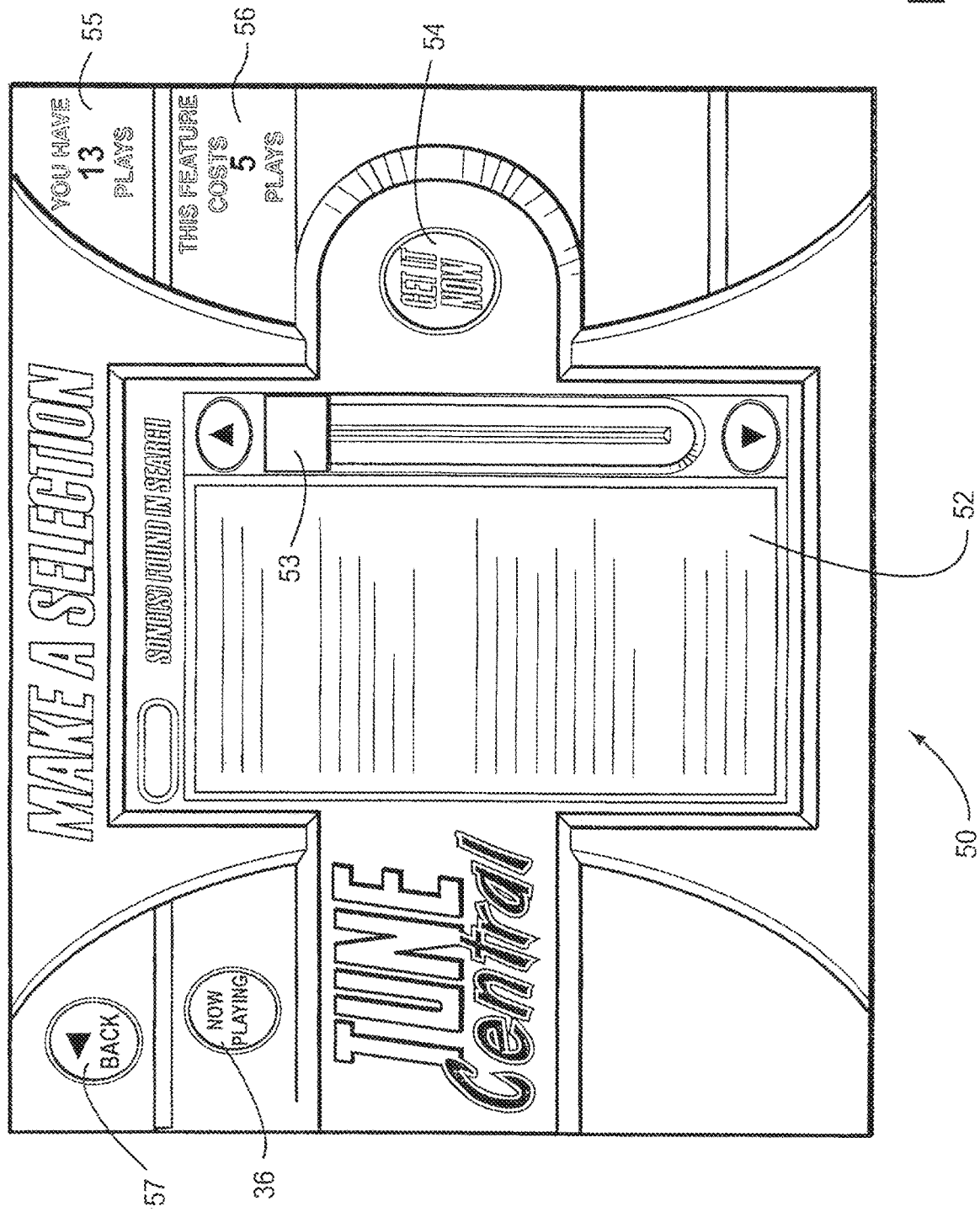
FIG. 5 is another exemplary screen shot showing the results of a search on the local server and providing the user an option of downloading a desired song to the jukebox device for a fee, in accordance with a preferred embodiment.

When a search is initiated from screen 40, the screen changes to that shown in FIG. 5 to display the results of the search. As shown in FIG. 5, the results of the search are listed. More particularly, in this example, a list of songs that satisfy the search request are listed. The list could also be by album if the search was album based. The user can scroll through the search results using slide bar 53. The user is also shown a display 55 of the number of current credits and a display 56 of the number of credits that are required to download a song from the local server to the jukebox device. The user can go back to the previous screen by touching the "Back" button 57. If the user selects a song from the search list and then touches the "Get It Now" button 54, the jukebox is operable to immediately download the selected song from the local server to the jukebox for play on the jukebox. The downloaded song can be queued up with any other selected but unplayed songs (if any) for play on the Jukebox. In this example, the download costs five credits instead of one credit like a normal selection from the storage of the jukebox itself. Once the downloaded song is played, it may be deleted from the jukebox device (together with any graphical data, such as the album cover graphic) that was also downloaded from the local server in connection with the song download). Preferably, however, the song will be kept in a "smart cache" to determine if and/or when the song should be deleted. For example, the song may be cached for a predefined period (e.g. a day, a week, two weeks, etc.) while the jukebox monitors plays of the song. If the number of plays are above a certain threshold for the predefined period, for example, the song may be kept; if the number of plays is below the threshold, the song may be deleted. The song may or may not be added to the master list of readily available songs, depending on the specific embodiment of the invention—e.g. the song in "smart cache" may appear as if it is not readily available to the user while in fact it is stored on the jukebox in, for example, a protected area. In this way, the user has the option, through use of the "Tune Central" button, to temporarily obtain on the jukebox any song from the master library of recordings without the need to contact the central server 12. As a result, the jukebox provides a more enjoyable experience for the user, while also increasing revenue generated thereby.

Also providing an enjoyable experience for the user is the central servers' capability to identify "hot hits," preferably in real-time. Preferably, new songs could be made available in a master catalog—that is, they need not reside on local servers or expanded media storage. Then, songs played frequently in a given area (ranging from, for example, a single site or group of sites, to a state or country, to a global connection) could be identified as popular. These songs, or "hot hits," preferably could be downloaded by, or sent to, individual jukeboxes. Individual jukeboxes preferably would maintain lists of "hot hits" in real-time, allowing users to search through the most popular songs at any given time. Alternatively, a jukebox might maintain a list of "hot hits" without downloading the popular songs, thereby potentially saving download time and resources. As a result, the jukebox could provide an enjoyable experience for the user by providing easy access to the most popular songs. Thus, a jukebox may have access to a "hot list" of "hot hits" generated by a jukebox, jukeboxes, designated by an operator, created automatically and/or especially for enabled jukeboxes, etc. This "hot list" may work as an alternative to themes and/or genres, and/or it may function with themes and/or genres to provide the most popular ("hot") songs within a given theme and/or genre. Similarly, a user also may select a song from a list of recently played songs. Such a list may be maintained (e.g., stored and updated) on an individual jukebox, or it may be maintained at a central location so as to be accessible and/or updatable by any suitably configured jukebox device.

Figure 5A:
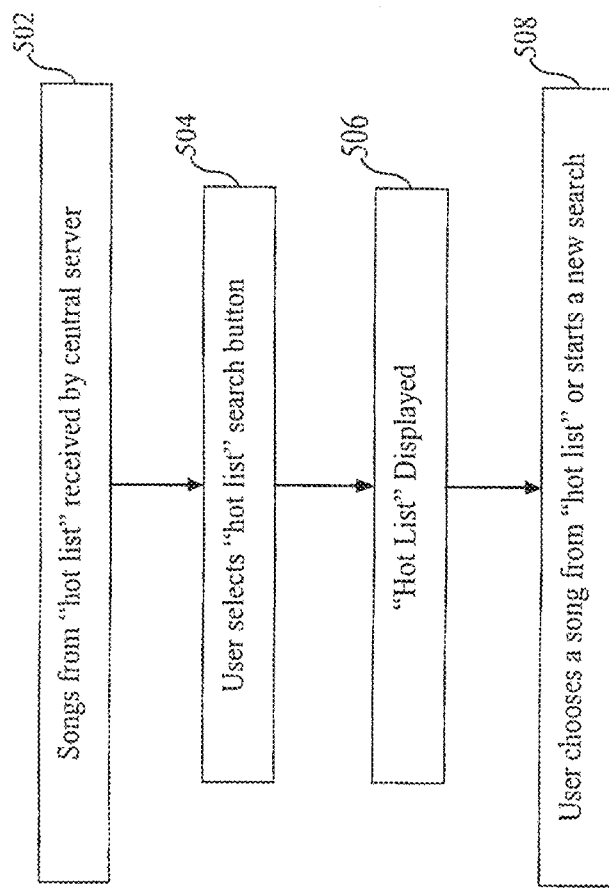
FIG. 5A shows an exemplary process for searching through a list of popular songs.

FIG. 5A shows an exemplary process for maintaining a "hot list" on a jukebox with a broadband connection. It should be noted that the same process could apply for a system with a different type of connection, though more time and resources may be used to download a song over a slower connection. In step 502, songs from a master catalog are received by a site's central server. Of course, it should be noted that songs could be stored to a local jukebox's storage media. In step 504, a user using a jukebox terminal would select a "Hot List" button. After the "Hot List" is displayed (step 506), the user could select a particular song or initiate a new search (508).

FIG. 6 shows another exemplary screen shot of a song selection screen 60 that is displayed when a user touches an album cover graphic from the screen 30 of FIG. 3. Thus, this screen shows an alternative (or typical) method of selecting a song, wherein the song is selected directly from the subset of songs that are directly available from the storage device of the jukebox itself (rather than the local server). In this example, Joe Cocker's Greatest Hits was selected from the screen of FIG. 3. As shown in FIG. 6, the resulting screen display 60 shows the selected album graphic 61 and a list of the songs 62 that are available on the jukebox for that album. The jukebox may or may not include all of the songs for a particular album. The available songs can be scrolled through if necessary using scroll bars 63a and 63b. The user has the option, through the "Play" button 65, to select a song from the list for play on the jukebox. A "Play Now" button 66 is also provided for enabling the user to select a priority play of the song, thereby giving the song a higher priority than songs selected using the "Play" button 65. This priority feature preferably requires more play credits than the normal play. A display 67 shows the number of credits available for the user. Button 64 shows other albums for the same artist being shown at 61, thereby enabling a user to easily search through the albums for a particular artist for a desired song.

As also shown in FIG. 6, a "Tune Central" button 68 is displayed that enables the user to search for songs by this same artist on the local server as explained in connection with FIG. 4. In other words, button 68 takes the user to the search screen 40 of FIG. 4 for searching the local server. The user can then proceed to search the local server and select songs therefrom, if desired, as described above in connection with FIGS. 4 and 5. Thus, as explained above, the user can access the local server at various screens in a convenience and efficient manner, depending on the desires of the user when interacting with the jukebox screen.

As can be seen from FIGS. 3-6, the user is provided with the option of playing songs that are resident on the jukebox device itself or, alternatively, selecting songs from the local server for download and play in an efficient and reliable manner, thereby significantly improving the operation of jukebox systems, particularly those that cannot quickly, easily or reliably receive downloads of music on demand from a central server. It is noted that the screen shots of FIGS. 3-6 are only exemplary and any suitable screen configurations can be used to provide the functionality described herein. In addition, the jukebox operator is provided with the ability through operator screens (not shown) to set filters per genre or style of music in order to limit access to the end user and avoid undesirable music being played at a specific location. For example, these features preferably are available through schedules defined by a jukebox operator and/or location manager, enabling, for example, a location manager to prevent hard rock or heavy metal music to be played before 11 am. The same features can be used, for example, by operators or location managers to configure playlists and/or set the available music selections for particular dates and/or times. For example, operators or location managers may wish to restrict musical selections to Irish music on Saint Patrick's Day, love songs on Valentine's Day, Frank Sinatra music during dinner hours, etc.

In still other exemplary embodiments, a location might provide a "Virtual DJ." According to one such system, a prepared playlist would be provided to the jukeboxes of a location. Preferably, the playlist can be tailored to the details of the location and/or the event to take place, such as, for example, locale, theme, target audience, etc. Furthermore, some illustrative playlists could be created by famous DJs to attract patrons. DJs could attach their names to playlists and associate themselves with various locations, even though they are not present. A playlist might extend for several songs or for several hours, depending on the needs of the location. It is to be appreciated that coinage need not be collected during such a Virtual DJ event, as a special fee can be associated with the service of using a special playlist. It also is to be appreciated that DJs may prepare special playlists for one-time use, or they may make available repeatable special playlists. These repeatable playlists may, for example, be downloaded by jukeboxes or provided to the jukebox in any suitable manner. Thus, making third part playlists available for use on the jukebox for a fee provides a whole new revenue source for the jukebox operators, location owners and playlist generators, such as well-known DJs or the like. When a playlist is made active, the normal functions of the jukebox are preferably stopped during play of the songs on the playlist.

Figure 7:
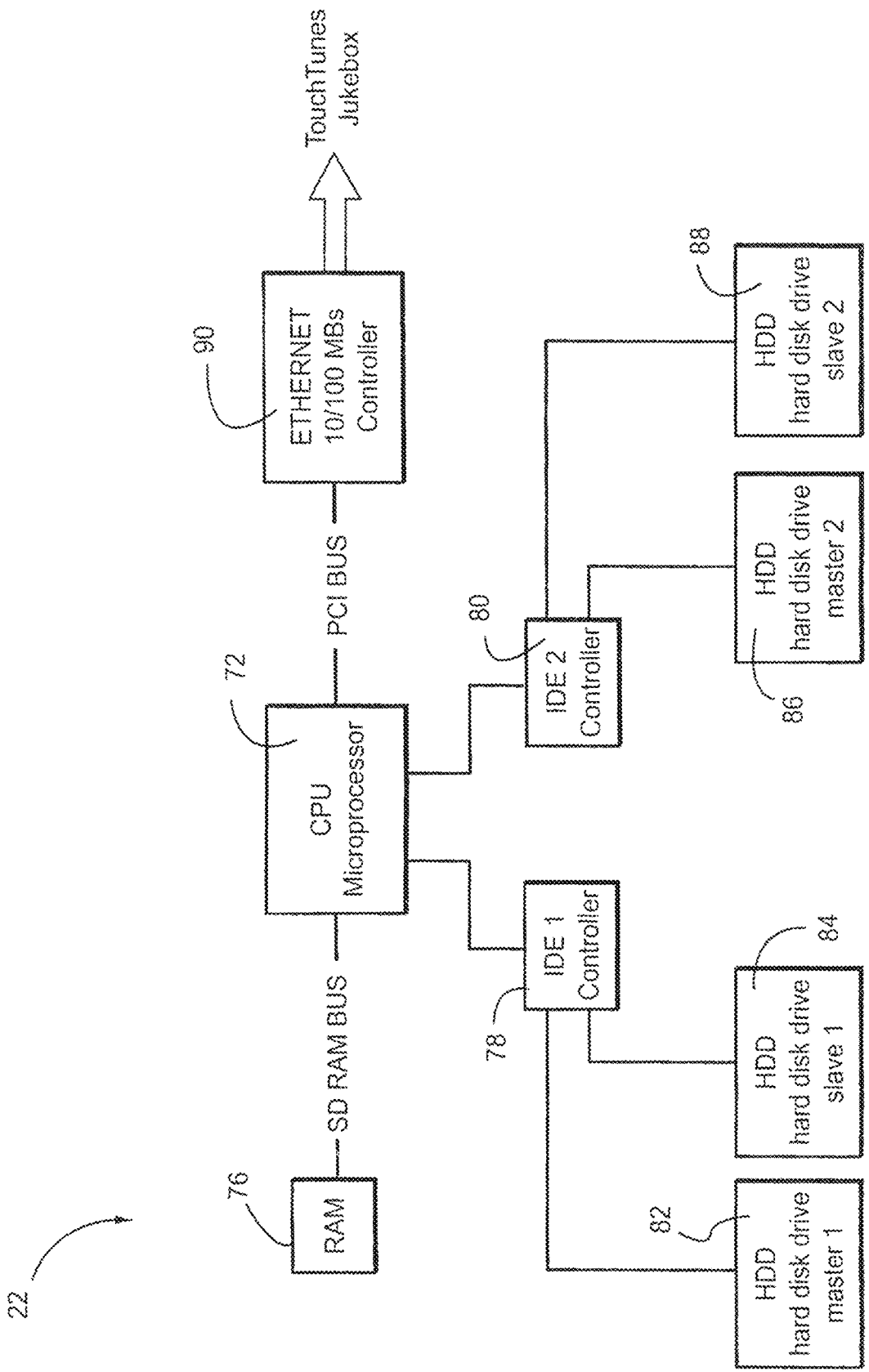
FIG. 7 shows a block diagram of a preferred embodiment of the local sever.

FIG. 7 shows a block diagram of the electronic elements that define the local server 22 in accordance with an exemplary embodiment. As shown in FIG. 7, the local server 22 includes a CPU 72 (e.g., AMD Elan 800 MHz), a flash memory (e.g., 8 MB) containing the BIOS and OS, a pair of master/slave hard drives (82, 84 and 86, 88, respectively), a pair of IDE controllers 78 and 80 for the hard drive pairs respectively, a RAM 76 (e.g., 32 MB), an Ethernet controller for controlling communication with the jukebox device 16, and the appropriate buses interconnecting the various elements. Of course, other configurations or arrangements for the local server 22 may be used. A unique identifier may be provided in the local server for enabling the local server to be uniquely identified and registered by the jukebox and/or central server. The identifier may, for example, be located in the flash memory 74.

As will be appreciated from the description of the invention above, the addition of the local server significantly enhances the operation of the jukebox devices that are part of a jukebox system. However, the local servers also provide other benefits and features that will now be described.

A collection of local servers 22 may be used as a network of distributed servers that can be controlled by the central server 12 through its associated jukebox device 16 to provide music services to other devices. For example, the local servers and associated jukebox can be used to deliver requested songs to a dedicated residential or commercial jukebox device (or other suitable jukebox device) in addition to providing song services to the specific jukebox to which it is connected and assigned. Thus, the network of distributed servers can provide a support network for implementing residential and commercial jukeboxes of the type which allow a user to download songs for reproduction and/or storage at a residential or commercial location for an appropriate fee. As a result, the jukebox system operator can provide and control commercial jukeboxes and well as residential jukeboxes through the jukebox system. In this embodiment, the jukebox device and/or local server are connected to the Internet (or other suitable network) using a broadband modem and is provided with software that can selectively deliver song files to any dedicated residential jukebox device (also connectable to the Internet) under control of the central server. The central server receives requests from a residential jukebox and, by analyzing traffic on the network, provides instructions to a selected jukebox device to download the requested song file (either from its memory or from the local server) to the residential jukebox for a fee or under a subscription plan for the residential jukebox. In certain exemplary embodiments, requested songs may be streamed to a jukebox. It will be appreciated that streamed media may originate at a dedicated server, a network of streaming servers, from a jukebox or jukeboxes (such as peer-to-peer or multipeer downloading), etc.

In accordance with another exemplary aspect of the invention, the local server and jukebox device are used, under control of the central server, to provide management services for other types of coin operated or payment triggered equipment, such as gaming devices, installed in the same location as (or in close proximity to) the jukebox. In other words, the jukebox system is preferably used to update the functionality of and/or manage other downloading devices present in the same location. As a result, the jukebox becomes a "central hub" for all downloading equipment in a location. This feature is achieved, in one embodiment, by networking all of the downloading devices in a single location together with the jukebox and local file server. The central server can then download information to the local server together with instructions to the jukebox as to which devices should updated with what data and/or software. The jukebox device and central server can also be used to collect information from the other downloading devices to which it is managing and upload that information to the central server for reporting/accounting purposes. Thus, the owner/operator of the jukebox system can act as a third party service provider to other coin-op companies for the purpose of managing and/or updating their equipment.

The large amounts of memory provided by the local servers and the fact that they are provided and accessible at thousands of locations over a well controlled network, turns the jukebox system into a powerful tool that can be used to perform a variety of functions in the coin-op industry. More and more coin-op manufacturers are going towards games that are software upgradeable through their internal hard drives. These updates are done periodically, but as these devices increase there will be an ever increasing need for a system that can reliably and efficiently perform the updates from a remote location. The jukebox system described herein satisfies this need by enabling all suitable electronic coin-op devices at a jukebox location to be managed by the central server using the jukebox and local server at the location. The central server can download software or data updates, store them on the local server and then dispatch the updates to the intended units of equipment in the establishment. Thus, the jukebox system can act as a third party service provider to other companies in the coin-op business, thereby significantly enhancing the functionality of the jukebox system.

As an example, there are currently about 140,000 Merit coin-operated countertop devices in the USA, each of which enables users to play games and the like for a fee. Many of these devices operate with a hard drive that can be upgraded with new software. Merit does this by shipping CD-ROMs to operators who then need to drive to each location and manually update each machine. In accordance with the instant invention, however, all suitable coin-op equipment at a location are connected (directly or indirectly) with the local jukebox and local server assigned thereto. This enables the central server to receive the intended software update for any device, together with information that identifies what devices are to be upgraded with what software. The upgrade services are preferably fee based and provide an additional revenue stream for the jukebox system. The central server then downloads the software to the local servers with the upgrade instructions to further download the upgrades to the appropriate device(s).

As explained above, the local server enables songs to be downloaded to a commercial jukebox to which it is assigned or to residential jukeboxes under control of the central server. In addition, the local servers can be used for an on-premise networked application which manages other coin-op devices. These various features of the instant invention are illustrated in FIG. 8.

Figure 8:
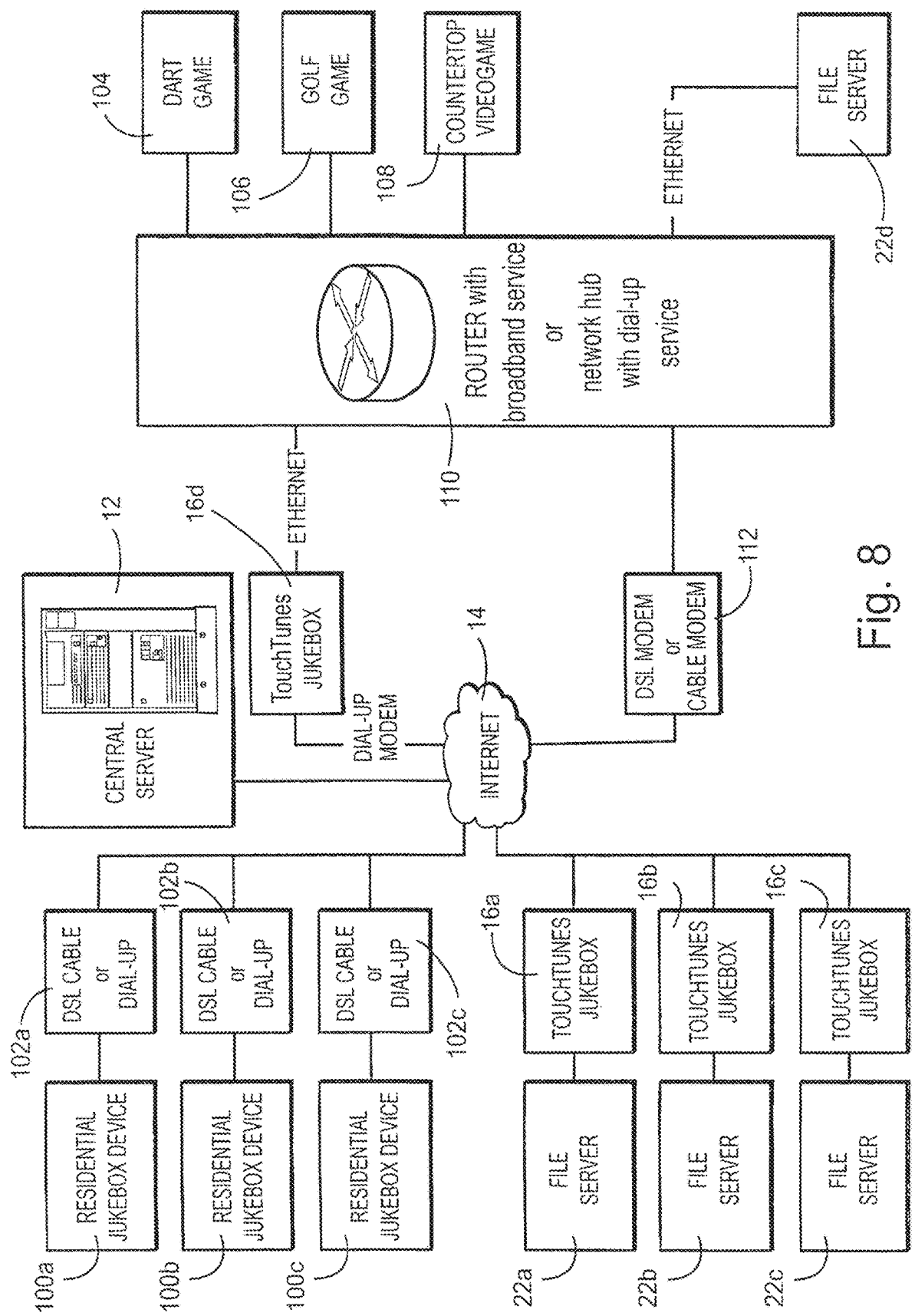
FIG. 8 shows a block diagram of an exemplary overall network including commercial jukeboxes and residential jukeboxes, as well as other downloading devices and associated connections that are managed by the jukebox system.

FIG. 8 shows a block diagram of a complete jukebox system network as contemplated by an exemplary embodiment. As explained above, the system includes a central server 12 connected to a communications network 14, a series of commercial jukeboxes 16a, 16b and 16c with associated local music file servers 22a, 22b and 22c, a series of residential jukeboxes 100a, 100b and 100c connected to the network via broadband devices 102a, 102b and 102c, and an on-premise network shown on the right hand side of FIG. 8. This on-premise network includes a jukebox device 16d connected via a router or network hub 110 to a local file server 22d, a number of additional coin-op equipment, such as a dart game 104, a golf game 106 and a countertop videogame 108, and a broadband modem 112 connecting this local network to the communications network 14. With this exemplary configuration as shown in FIG. 8 all of the functionality described herein can be implemented through the jukebox system of the instant invention.

Figure 9:
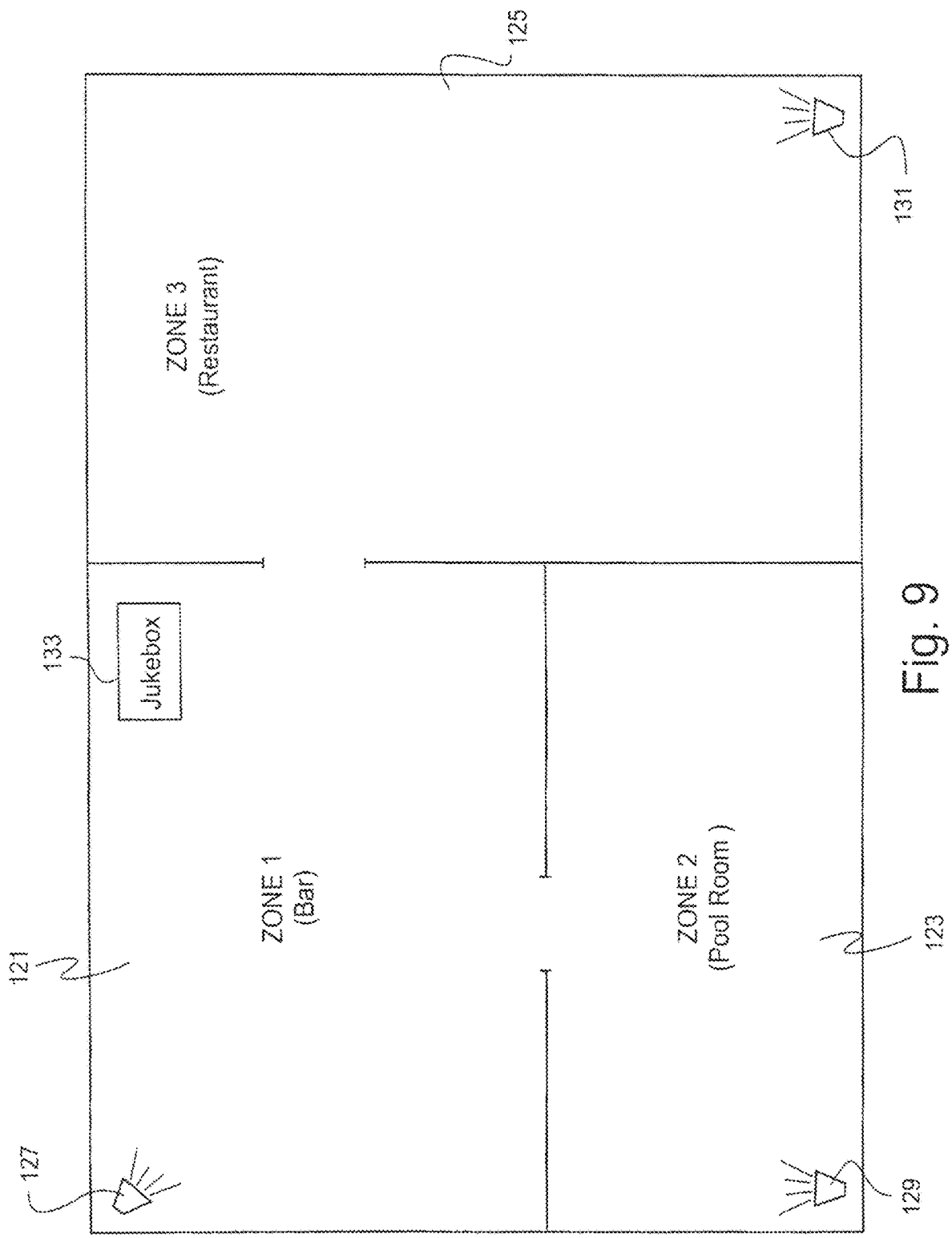
FIG. 9 shows an overhead view of an exemplary establishment layout for a multi-zone jukebox system.

FIG. 9 shows an overhead view of an exemplary establishment layout for a multi-zone jukebox system, in accordance with one embodiment of the invention. In accordance with an exemplary embodiment, the establishment has three zones 121, 123, 125. Each zone is equipped with its own set of speakers 127, 129, 131, which are operably connected to the jukebox 133. Different music may be played simultaneously in all three zones 121, 123, 125 and all the music may be played from a single jukebox 133. The jukebox 133 may be provided with additional hardware, as needed, to allow this implementation.

Alternatively, the user may elect to have a song played in more than one of the zones 121, 123, 125 simultaneously, or in more than one of the zones at different times. The user may have to pay additional credits to implement either of these features. A preferred embodiment of a multi-zone system could play music at a high quality in the different zones using the system described in application Ser. No. 11/023,390, filed Dec. 29, 2004, entitled "Wireless Digital Transmission System for Loudspeakers," which is a continuation in part of Ser. No. 09/161,584, filed on Sep. 28, 1998. The entire contents of both applications is incorporated herein by reference. Using this system, for example, a jukebox could compress and transmit audio data through AC power lines to an addressable location, where it could be received, decompressed, converted, and played. In fact, any of the jukebox components herein could be implemented in a manner that uses AC power lines as a communication network for operation.

It is to be appreciated that Wireless Digital Transmission System can be used for other purposes in other embodiments where data needs to be sent between two or more devices. For example, this system could be used to configure dummy terminals. In such an embodiment, the Wireless Digital Transmission System could be used to send information such as, for example, whether to morph, what songs are appropriate given a particular morphing of the jukebox, the zones in which selected music should be played, maximum volume levels, etc, in addition to sending music to the speaker systems.

The operator may also restrict what kind of music is available in a given zone, based on the type of activity in the zone, the time of day, or any other suitable selection criteria. For example, in FIG. 9, zone three 125 is a restaurant. Restaurant patrons may not wish to listen to the same type of music as someone in zone one 121, which is a bar room in FIG. 9, or in zone two 123, which is a pool room. The operator may recognize this and restrict the type of music that can be played in zone three 125. Alternatively, the operator may restrict the volume of the music in any given zone. For example, patrons of a pool room 123 or a restaurant section 125 may not want the music as loud as it is desired to be in the bar room 121. And maybe the restaurant section 121 is to be kept quieter even than the pool room 123. The owner can adjust and control all suitable settings to provide the most versatile, patron friendly environment in each of the zones, based on any suitable criteria.

Figure 10:
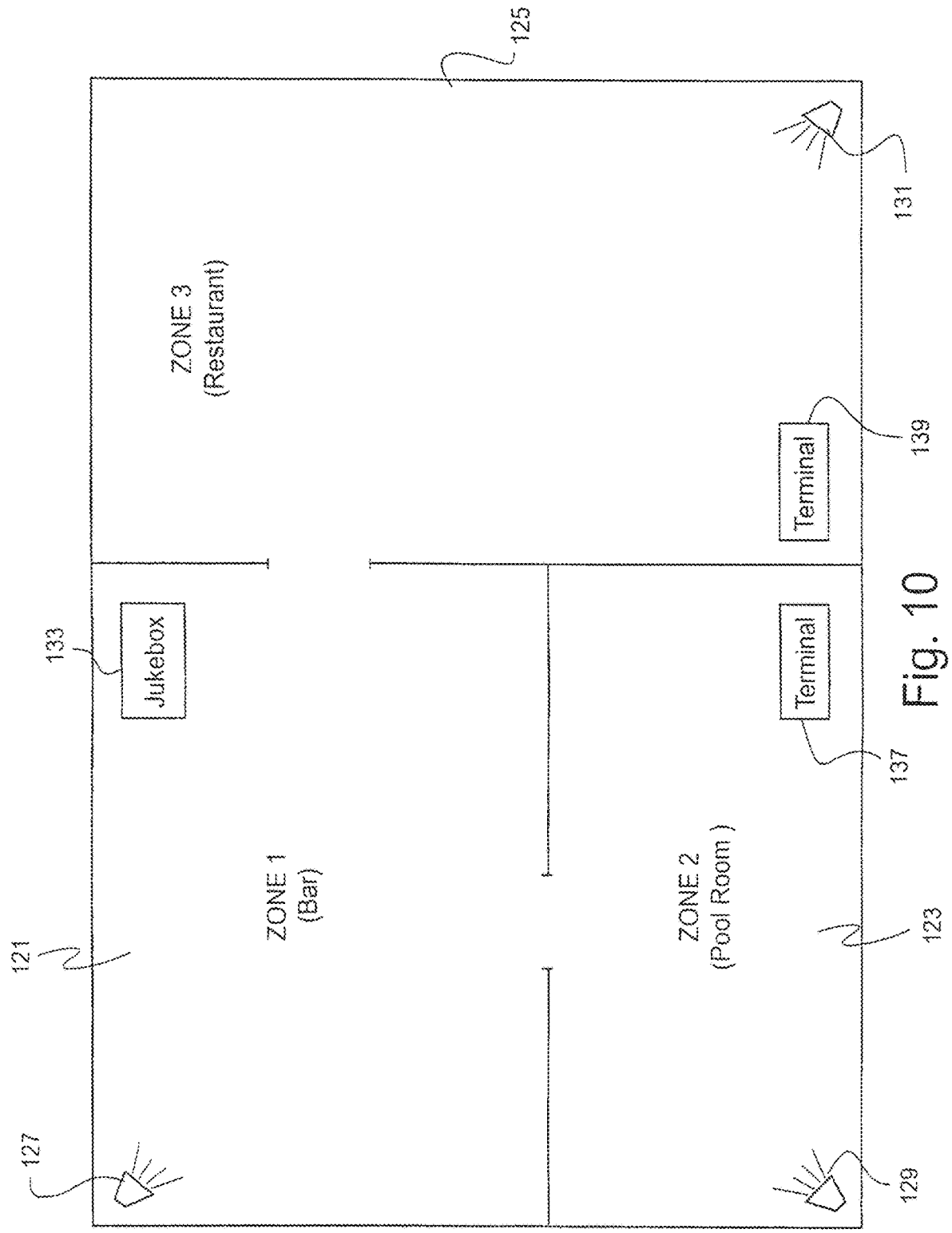
FIG. 10 shows an overhead view of an exemplary establishment layout for a multi-zone jukebox system with selection terminals in each zone.

FIG. 10 shows an overhead view of an exemplary establishment layout for a multi-zone jukebox system with selection terminals in each zone. In accordance with an exemplary embodiment, the bar has three zones 121, 123, 125. Each zone is equipped with its own set of speakers 127, 129, 131, which are operably connected to the jukebox 133. Different music may be played simultaneously in all three zones 121, 123, 125 and all the music may be played from a single jukebox 133. The jukebox 133 may be provided with additional hardware to allow this implementation.

In the embodiment of FIG. 10 there are also one or more "dummy" terminals 137, 139 located throughout the establishment. An exemplary illustrative dummy terminal could use X-server technology. These terminals 137, 139, which may be stand alone devices or may be provided as part of the interface on a gaming machine or other suitable device with a digital display, allow selection of songs from the jukebox 133 for the zone in which they are located (or possibly other zones). These terminals 137, 139 duplicate the zone restrictions imposed on the main jukebox interface and selection criteria. The terminals 137, 139 may be restricted to only allowing selection of music for play in the zone where each respective terminal is located, or they may allow selection for play in one or more different zones.

Additionally, the graphical interface of the terminals 137, 139 may change in accordance with available selections, themes of the bar, themes of the room in which each terminal is located, or any other suitable criteria.

Figure 11:
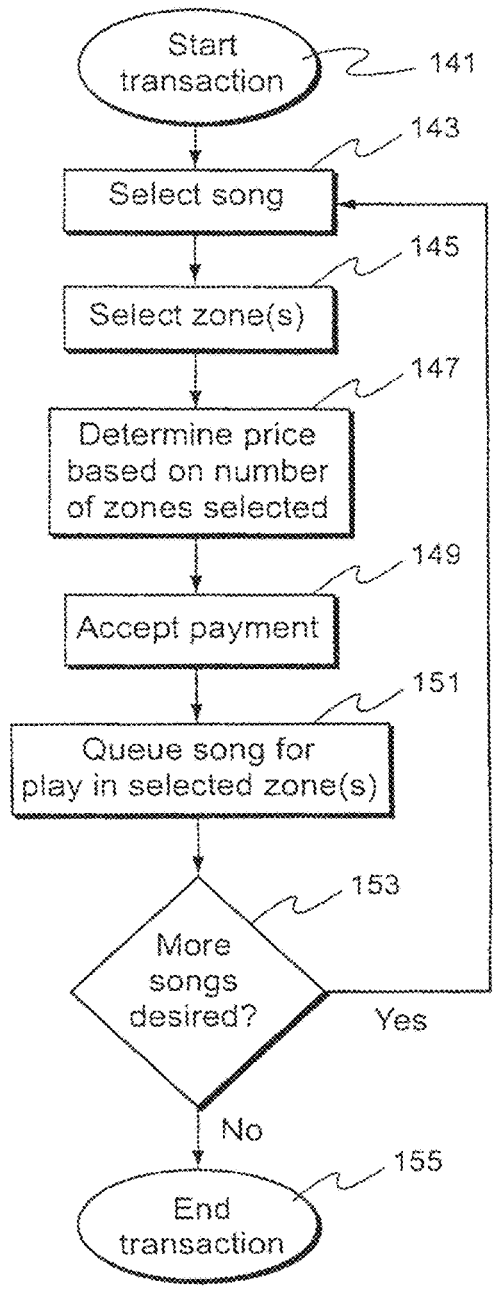
FIG. 11 is a flowchart showing an exemplary implementation of a zone selection process for a multi-zone jukebox system.

FIG. 11 is a flowchart showing an exemplary implementation of a zone selection process for a multi-zone jukebox system. In accordance with an exemplary embodiment, the jukebox first begins the transaction 141 with the user. The user is instructed to select a song 143, and select one or more zones 145 in which the song is to be played. The jukebox then determines the price based on the number of zones selected 147. The jukebox accepts payment from the user 149 and queues the song for play in the selected zone or zones 151. Next, the jukebox checks to see if the user would like to select another song 153. If the user wants another song, the process returns to the select song step 143 and repeats from there. If the user is finished making selections, the process ends 155.

Figure 12:
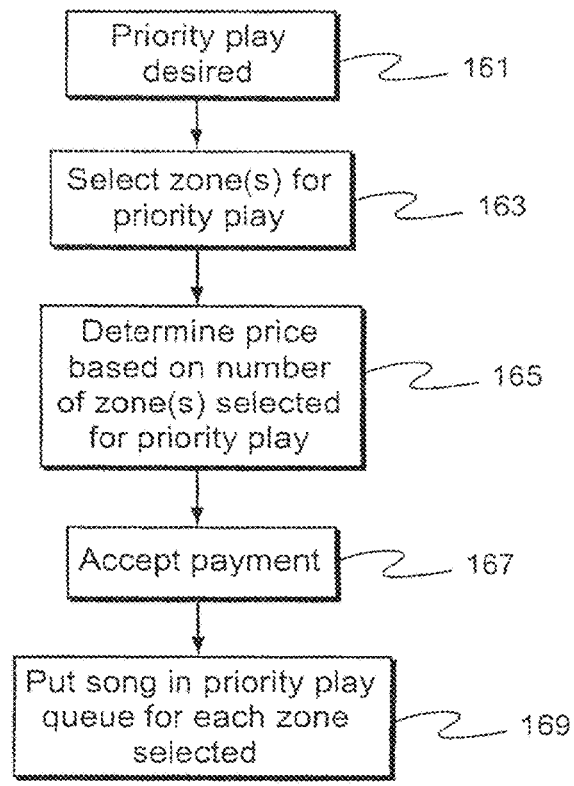
FIG. 12 is a flowchart showing an exemplary implementation of a priority play by zone selection process for a multi-zone jukebox system.

FIG. 12 is a flowchart showing an exemplary implementation of a priority play by zone selection process for a multi-zone jukebox system. In accordance with an exemplary embodiment, certain jukebox systems may be provided with one or more priority queues corresponding to one or more zones. If priority play is provided for a zone or zones, the jukebox first checks to see if the user would like to select priority play for the selected song 161. If priority play is selected, the jukebox then provides an option for the user to choose a zone or zones in which priority play should occur 163. Based on the number of zones selected for priority play, the jukebox determines a price 165, and accepts payment of that price 167 from the user. The jukebox then places the song in a priority play queue for each selected zone 169.

Figure 13:
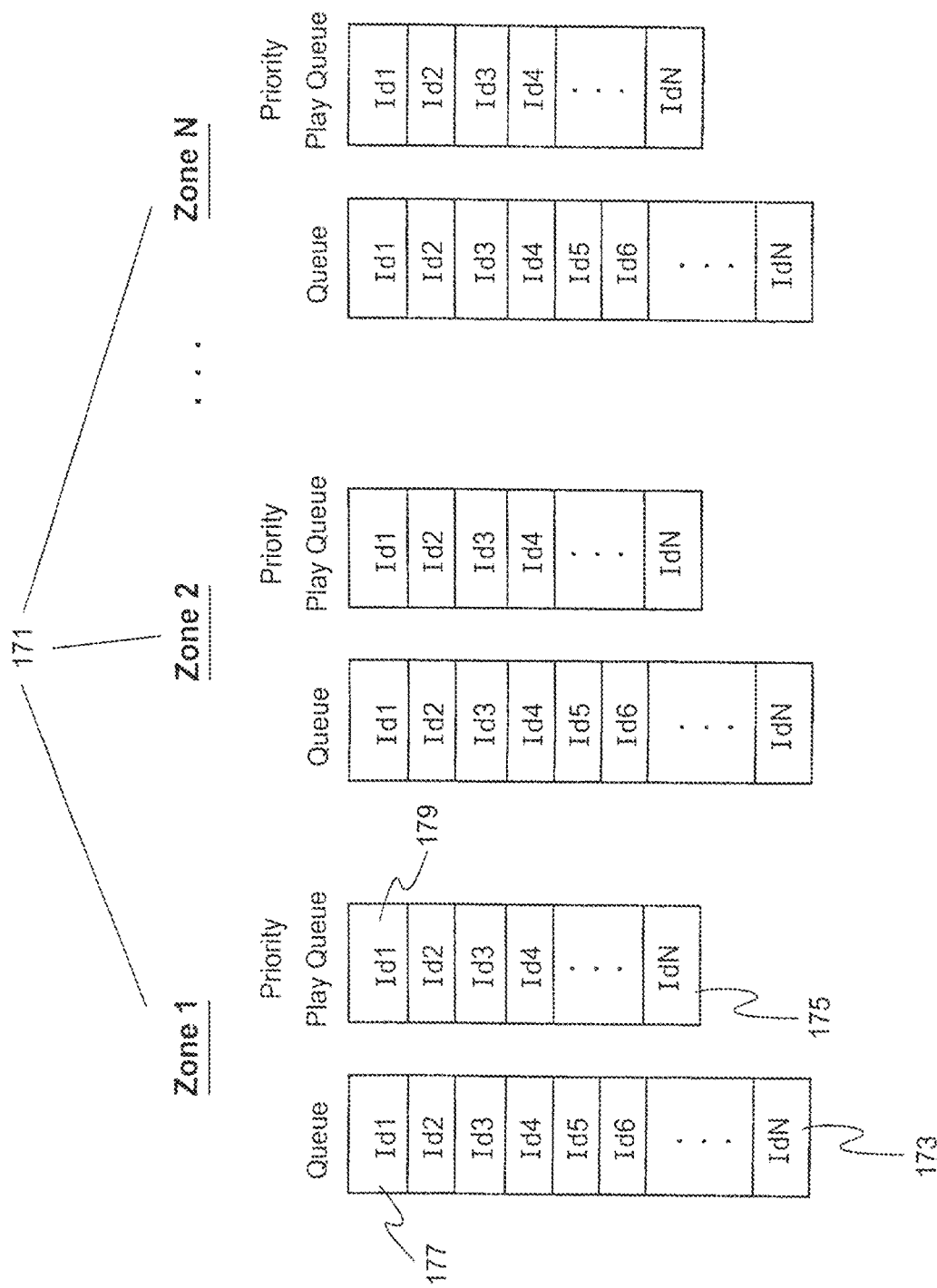
FIG. 13 shows an exemplary implementation of a multi-zone set of priority and non-priority queues, with a subset of queues for each zone.

FIG. 13 shows an exemplary implementation of a multi-zone set of priority and non-priority queues, with a subset of queues for each zone. In accordance with an exemplary embodiment, each of N zones 171 may be provided with its own set of queues, comprising a priority queue 175 and a non-priority queue 173. A list of songs selected for play is maintained within each queue 173, 175. Each song in each queue may be provided with an identifier 177, 179, which identifies the song, and/or the position of the song in the queue, and/or any other suitable factors.

In certain exemplary embodiments, the songs in a queue also may be reordered for other reasons. For example, the songs may be reordered to smooth transitions between songs, thus providing better (e.g., more aurally pleasing, less abrupt, more smooth, etc.) end-to-beginning playback of the songs. Thus, in certain exemplary embodiments, a method for altering the order of playback songs is provided. In such a process, the "color" of the song may be determined for two or more songs in the playlist. The color of a song relates to characteristics of the song, such as, for example, the volume, rhythm, beat, tempo, etc. of the song. After the color determination, the colors may be compared, and the songs may be reordered to group like (or dislike) songs. Optionally, the color of the song(s) may be determined and also may be used to control lighting, displays, etc. to provide a more interactive experience.

Figure 14:
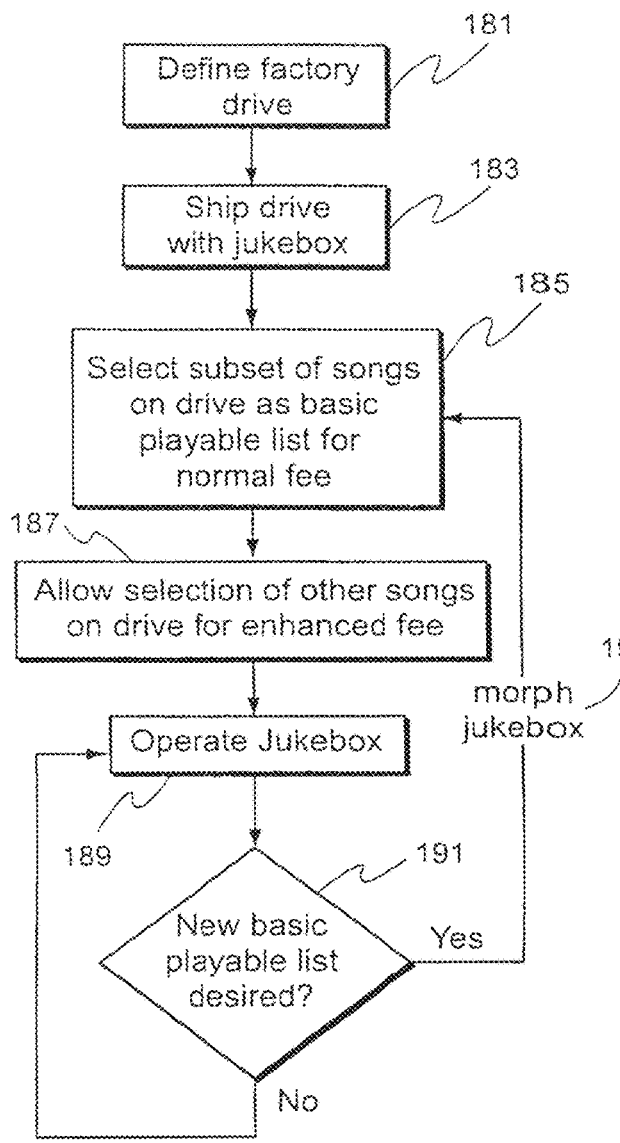
FIG. 14 is a flowchart showing an exemplary distribution and initialization scheme for a jukebox with morph capability.

FIG. 14 is a flowchart showing an exemplary distribution and initialization scheme for a jukebox with morph capability. In accordance with an exemplary embodiment, the contents of a factory drive are defined at the point of manufacture 181. This same drive (or expanded media storage) may be shipped out with all jukeboxes 183, and may, for example, only contain a subset of the total number of songs available on the central server. This features simplifies the manufacturing process by enabling the identical drive to be shipped with all jukeboxes. Once the jukebox containing the drive has reached its destination, the operator may select a subset of songs on the drive as the basic playable list 185. This selection can be made based on the type of establishment, the type of music the establishment's patrons typically prefer, or any other suitable criteria. The operator may also allow the central server to recommend a basic playable list. The drive may also allow selection of songs not on the basic list, but present on the factory drive, for an additional fee 187. This list of "alternate" songs might not include all songs however, as the operator might desire to restrict access to songs that don't meet the theme of the establishment. For example, a country bar owner might not ever want to allow selection of rap or hip-hop songs on the jukebox. In certain exemplary embodiments, a jukebox will ship with a large number of songs (e.g. 25,000 songs) on a very large storage medium, such as, for example, a hard drive, flash media, etc. The jukebox according to this embodiment would be without a "personality" until an operator and/or owner selected a subset of all songs to make available to patrons. In this way, operators and/or owners can define "personalities" for their jukeboxes through definition of the basic playable list.

Once the songs on the drive have been appropriately categorized (i.e. the basic playable list has been defined), the jukebox begins operation 189. As long as a new basic playable list is not desired 191, the jukebox continues to operate 189 with the currently selected basic playable list. If a new basic playable list is desired 191, the jukebox morphs 193 into a "new" jukebox, selecting a different playable subset of songs for basic selection 185, and preferably changing additional characteristics (e.g., graphics, ads, look and feel, etc.) of the jukebox as dictated by the morph. The ability to morph jukeboxes thus enables owners and/or operators to maintain a single jukebox with a plurality of triggerable personalities which can be switched between automatically, at pre-defined events/times, manually, etc.

Figure 15:
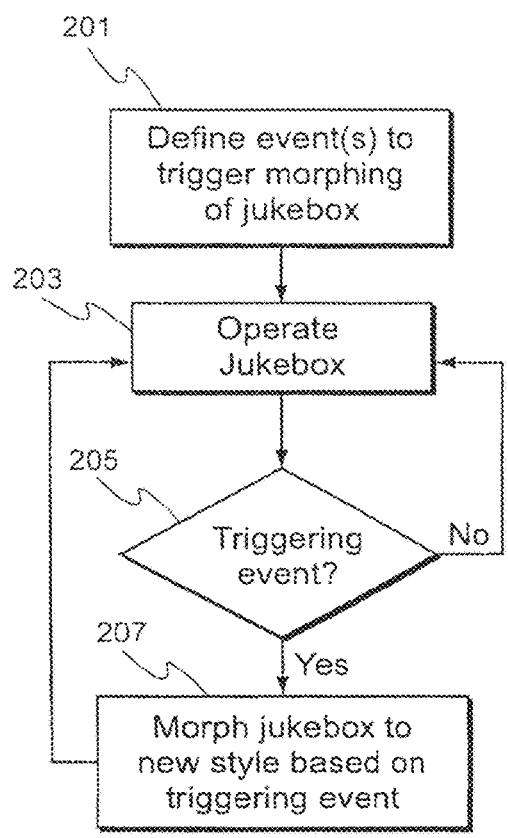
FIG. 15 is a flowchart showing an exemplary implementation of an automatic jukebox morph initiation process based on a triggering event.

FIG. 15 is a flowchart showing an exemplary implementation of an automatic jukebox morph initiation process based on a triggering event. In accordance with an exemplary embodiment, the user may define an event 201, for example a themed night or a time of day, as a triggering event which triggers a jukebox morph. The jukebox then operates as normal 203, checking periodically to see if the triggering event occurs 205. If the triggering event has not occurred, the jukebox simply continues to operate 203, but if the triggering event occurs, the jukebox is morphed into a "new" jukebox. The triggering events may be one time events, or they may be scheduled to occur weekly, daily, monthly or scheduled based on any other suitable criteria. It should be noted that in a multi-zone configuration, different zones may be morphed while others do not change. This feature of the illustrative embodiments allows, for example, a given zone or zones to be dedicated to a certain kind of music while the other(s) may vary based on any variety of factors, such as the time of day, an owner's desire to change the music, or a user's request.

Figure 16:
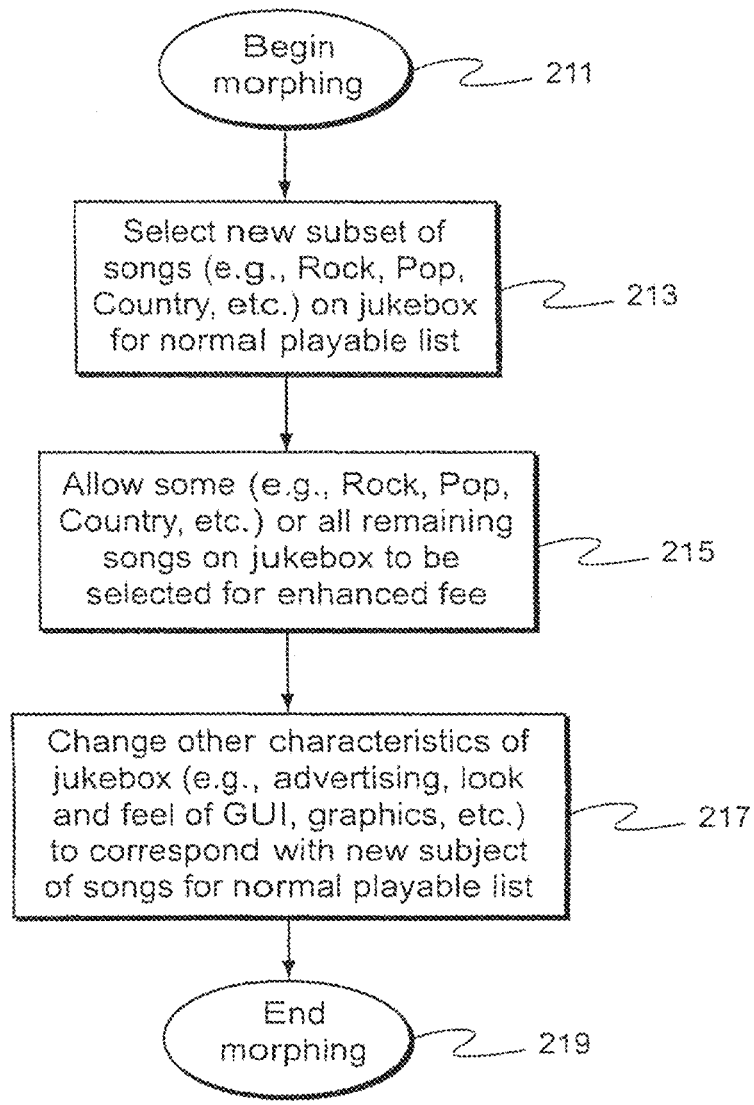
FIG. 16 is a flowchart showing an exemplary implementation of a jukebox morphing process.

FIG. 16 is a flowchart showing an exemplary implementation of a jukebox morphing process. In accordance with an exemplary embodiment, when the jukebox begins morphing 211, it selects a new subset of songs to be the basic playable list 213. The jukebox then allows some or all of the remaining songs on the jukebox to be selected for an enhanced fee 215. Some of the remaining songs may be restricted based on what triggered the morph. Other characteristics of the jukebox may also change 217, for example, the user interface may be changed, and different advertising may be displayed which corresponds with the predicted tastes of the crowd for which the jukebox has been morphed. Other suitable changes may also be made. In one example of a preferred embodiment, a club owner has a hip-hop night on Wednesdays, beginning at 9:00 pm and ending at 4:00 am. At 9:00 pm on Wednesdays, the jukebox morphs into a hip-hop jukebox, with a basic selection of appropriate music. In accordance with the morph, the jukebox blocks all access to genres of music such as country music, classic rock, jazz, blues and oldies, and the jukebox limits the available selection of hard rock additional songs to "hip-hop-esque" hard rock songs. The graphics on the jukebox convert to edgy, urban graphics, and the advertising changes accordingly, displaying products such as apparel, drinks, and goods which should appeal to the hip-hop crowd. At 4:00 am, the jukebox morphs back into the "standard" jukebox for that club, or into any other suitable jukebox. Alternatively, the jukebox may remain set in hip-hop mode until the next triggering event occurs. Again, it should be noted that in a multi-zone configuration, different zones may be morphed while others do not change. In the above exemplary non-limiting embodiments, the system might morph into hip-hop in one zone for the night, while the "standard" music for the club remains playing in another area.

Figure 16A:
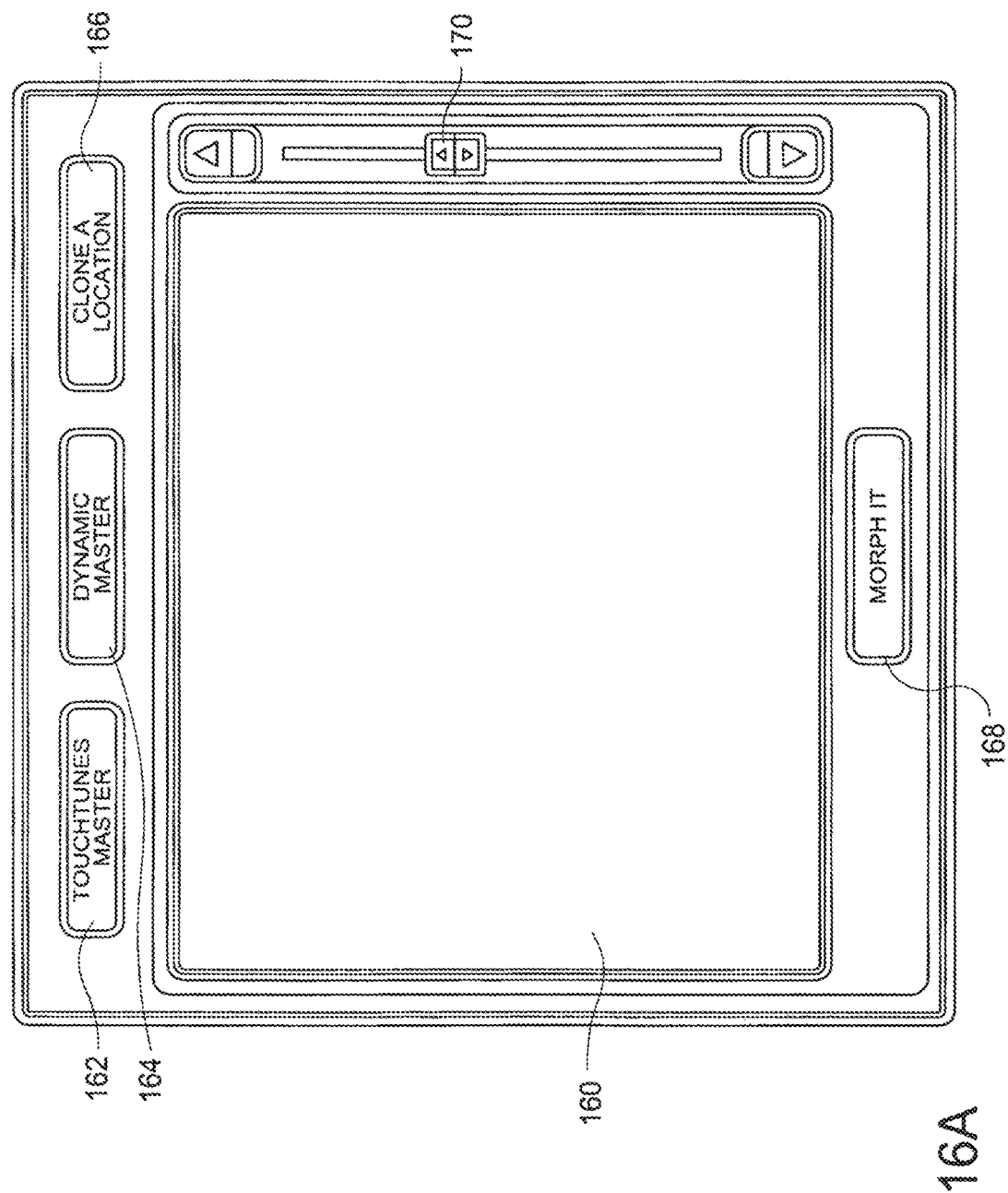
FIG. 16A is an exemplary screen shot showing how a morph of a jukebox can be initiated in one preferred embodiment.

FIG. 16A is an exemplary screen shot showing how a morph of a jukebox can be initiated in one preferred embodiment. Area 160 is blank to indicate that no selections have been made. A user will select a morphing option by choosing, in this exemplary embodiment, for example, either TouchTunes Master button 162, Dynamic Master button 164, or Clone a Location button 166. It is to be appreciated that other embodiments may provide further morphing options in place of or in addition to the aforementioned buttons. In this embodiment, pressing the TouchTunes Master button 162 will populate area 160 with a list of master selections pre-selected by the TouchTunes music department. These master selections may include, for example, collections of specific songs (e.g., all songs by British bands, all songs by a particular artist, etc.), ratios of particular themes or genres (e.g., a mix of 75 percent Hip-Hop and 10 percent Pop, 10 percent Rock, and 5 percent techno for a particular dance club feel, etc.), etc. A user may peruse the list using slider bar 170. Once the user is satisfied, pressing Morph It button 168 will morph the jukebox. It is to be appreciated that pressing the Morph It button 168 may trigger an immediate morph, or it may save the morph and instead initiate it at a predefined trigger time. It also is to be appreciated that morphing data may be stored for morphing the jukebox on which the selection was made or any number of connected jukebox terminals.

Figure 16B:
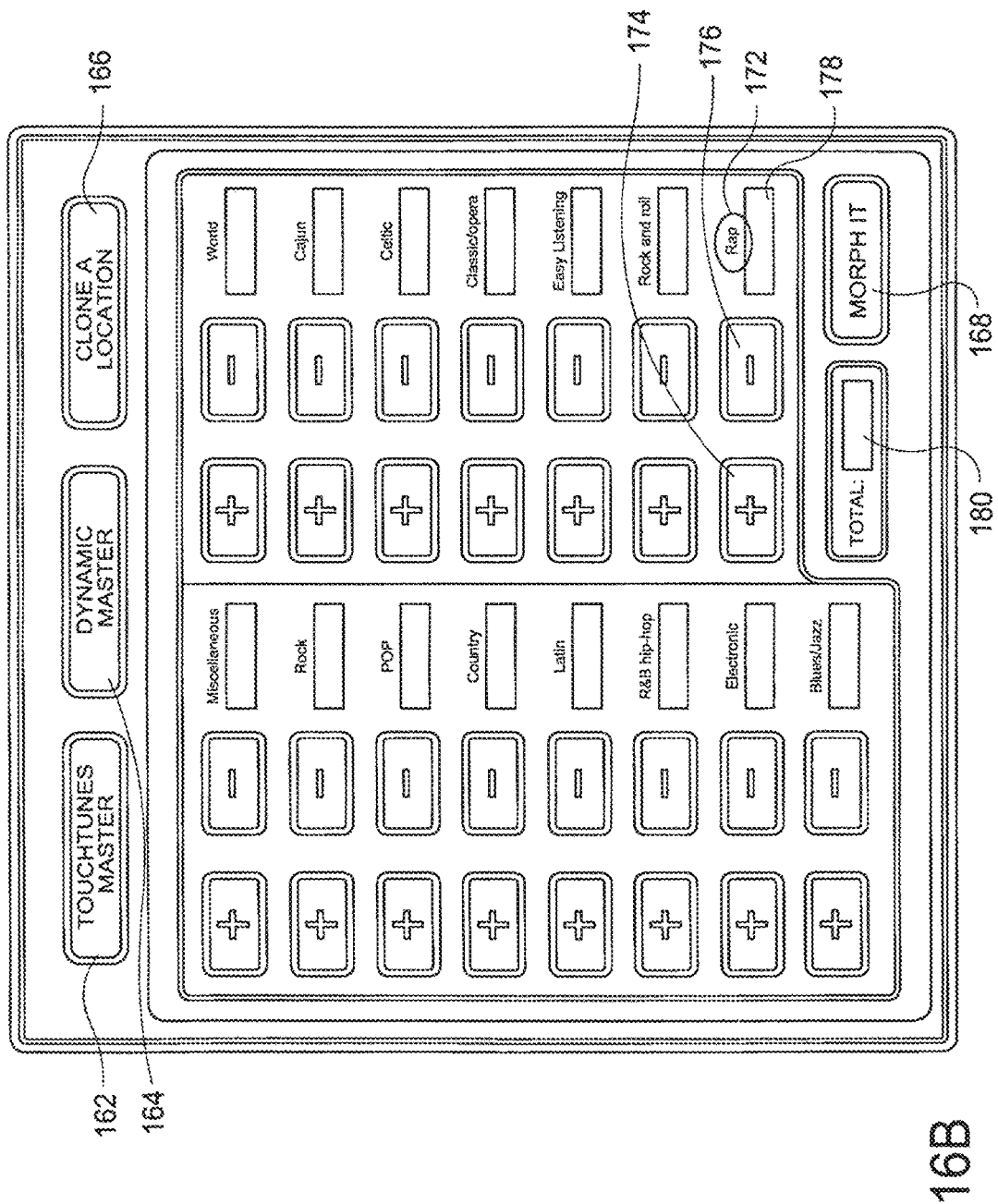
FIG. 16B is another exemplary screen shot showing how a user can specify various criteria before a morph of a jukebox in one preferred embodiment.

Pressing Dynamic Master button 164 is one exemplary, non-limiting way of providing increased user control over the morph. FIG. 16B is another exemplary screen shot showing how a user can specify various criteria before a morph of a jukebox in one preferred embodiment. A discussion of the buttons with identical numbers in FIG. 16A and FIG. 16B is omitted. Designations for the genres and/or themes of music are provided, such as, for example, Rap label 172. To specify a given percentage of music to be played, a user may press increase button 174 or decrease button 176. The amount of music selected for that particular genre or theme will appear in a theme music amount area 178, while details about the total amount of music selected will appear in total music amount area 180. In a preferred embodiment, a user may specify percentages of a genre and/or theme to play. For example, a user may select only 100 percent Country music for a country night. Alternatively, as another non-limiting example, a user may select a mix of World and Latin music for an international feel. It is to be appreciated that although a preferred embodiment uses percentages, other embodiments may use different measures for specifying how many of which type of music should play, such as, for example, the number of songs in a given category, the amount of playtime in a given theme and/or genre, etc. It also is to be appreciated that in other embodiments, a user need not use the buttons to increase or decrease the amount of music; that is, in other embodiments, a user may directly input the amount of music via an input mechanism. Thus, it is to be appreciated that morphing may be defined and/or triggered by a remote device operably connected to a jukebox.

When a user presses Clone a Location button 166 (e.g., from FIG. 16A or FIG. 16B), the jukebox displays a list of the jukebox devices, preferably including a unique identifier for each jukebox device. In other embodiments, however, the list may include, for example, other locations owned by the same owner of the present location, etc. After selecting the jukebox terminal, the present jukebox could morph into that jukebox. Alternatively, the jukebox selected could morph into the present jukebox, thus providing, for example, remote morphing. Still alternatively, the list might include information about non-digital jukeboxes that exist in addition to the digital jukeboxes preferred by the exemplary embodiments. This morphing feature can allow users to replace existing jukeboxes quickly and easily by allowing the new jukebox to morph into an older jukebox that is being replaced, such as a conventional record, CD or digital jukebox. Additionally, operators who maintain multiple jukeboxes may, for example, apply a route-based cloning and/or morphing process to provide, for example, a custom or particularized set of songs.

Still further, a user can morph a location based on a location's data, specific to, for example, a given date or the latest data known. This allows users to morph a jukebox based on, for example, the popularity of a given morph— e.g., users may choose to revert to a successful morph to try to recreate the entertainment of that evening. This feature also enables users to recover from hard drive crashes and/or other jukebox failures. For example, if a hard drive has been replaced after an old one crashes, a user may morph (or clone) an existing location at a given date and/or time before the crash to restore the songs that were available before the crash because, preferably, the server maintains information sufficient for this functionality. Thus, using the morphing function gives users increased control while also providing backup and restoration features.

FIG. 17 shows the relationship between a jukebox with expanded media storage and a central server. In accordance with an exemplary embodiment, the central server 221 contains a master library of songs, such library comprising all songs that are currently available to be downloaded and all songs currently installed on jukebox hard drives. The central server may communicate 222 with the remote jukebox 225 containing a local hard drive 223. The hard drive 223 on the jukebox may have several sections, including available space for downloads 227, space occupied by preloaded songs 228, and space for software and an operating system 229. Additional suitable sections may be added, for example, a section containing different pictures for altering the GUI. The jukebox 225 may communicate with the central server 221 to download songs, upload usage information, update software, and perform any other suitable functions.

Figure 18:
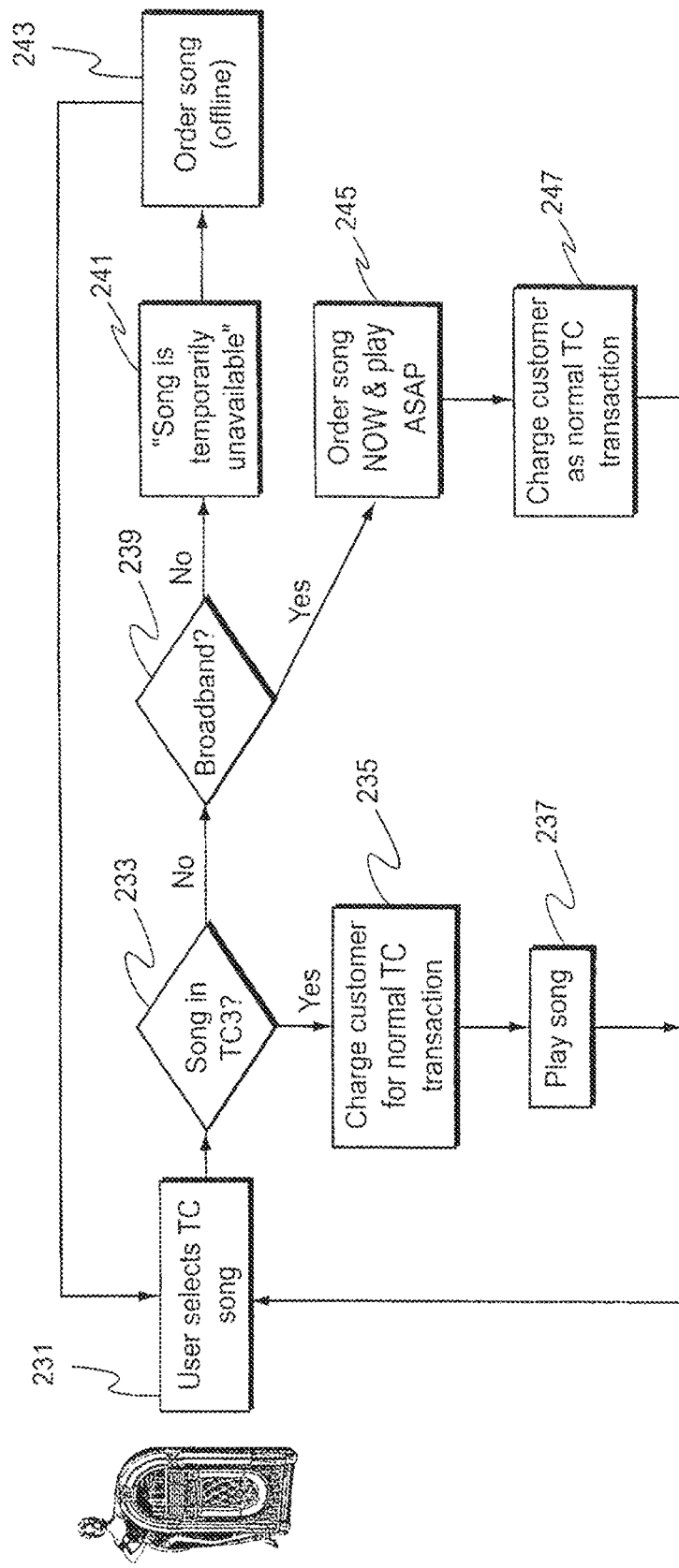
FIG. 18 is a flowchart showing an exemplary process for a song selection process when a song is not in the "standard" available playable song list.

FIG. 18 is a flowchart showing an exemplary process for a song selection process when a song is not in the "standard" available playable song list. In accordance with an exemplary embodiment, the user first selects a song 231. The jukebox checks to see if the song is available on the local hard drive as a "non-standard" selection 233. If the song is available on the local hard drive, the jukebox charges the customer the price set for obtaining and playing a non-standard song 235 and plays the song 237 (or adds it to a playlist, when appropriate).

If the song is not available on the local hard drive, the jukebox checks to see if a high-speed connection to the central server is available 239. If there is no high-speed connection, the jukebox informs the user that the song is temporarily unavailable 241 and orders the song for download 243. The jukebox may or may not charge an additional amount for ordering the song. If, however, there is an available high-speed connection to the central server, the jukebox orders the song immediately and uses the high-speed connection to download the song right away, queuing it up for playing 245. The jukebox then charges the customer the price of a non-standard selection 247. In certain exemplary embodiments, a jukebox may retrieve songs offline, either after a location closes or before it opens. In certain exemplary embodiments, a jukebox may immediately download a song over a dedicated line with a dial-up connection. In certain other exemplary embodiments, a song may be downloaded from another jukebox (or other jukeboxes) rather than from a central or limited database to reduce network strain. In certain exemplary embodiments, the jukebox may download songs via a distributed media service in which portions of a given song may be downloaded from a plurality of sources and reassembled for the target jukebox. It is to be appreciated that such a peer-to-peer (or jukebox-to-jukebox) or multipeer (several jukeboxes to jukebox) digital downloading network will need to track song licensing information. In certain exemplary embodiments, if a song is not available on a jukebox but other versions or covers are available, the jukebox may recommend to these other songs to the searching user. For example, a user searching for an unavailable Trisha Yearwood version of "How Do I Live" may be recommended available versions by Dolly Parton and/or LeAnn Rimes. Preferably, recommendations will be smart enough to ignore similarly named songs that are completely different, such as, for example, the Everly Brothers' "Oh, Pretty Woman" and the Motley Crue's "Pretty Woman."

The factory drive explained above, combined with the morphing capabilities, eliminates the need for the local server explained above, as the factory drive can prove the same services as the local server, without the need for a separate hardware device. In other words, the factory drive embodiment herein enables a jukebox to be shipped with a single mass storage device of any technology (or multiple technologies and/or multiple devices acting as a single mass storage device), while still enabling a basic playable list to be defined, an expanded playable list to be defined, morphing capabilities, local server services to be provided, as well as all other features described herein. The content of the factory drive, as shipped, is preferably defined using historical, statistical information on customer preferences.

FIG. 19 is a flowchart showing an exemplary process for a priority play queue with prioritization-based-on-bidding capability. According to an exemplary embodiment, the user first indicates that he would like priority play 251. The jukebox then displays the current status of the priority play queue 253. This display may include information such as how many songs are in the queue, what the top bid is, how much has been bid on each song, which songs are "locked in," and any other suitable information about the priority queue. The jukebox then allows the user to select how much additional money the user would like to pay to place his song in a particular spot on the priority list and accepts payment in the selected amount 255. After accepting the payment 255, the jukebox places the song in a position on the priority list corresponding to the additional amount received from the user 257.

Alternatively, in another exemplary aspect of the illustrative embodiments, a user can bid on the right to have a song played before other songs previously selected for priority play are played. In a preferred embodiment, the user is shown the top price paid for a priority play, and can pay more than that price to obtain the highest priority available.

Another exemplary aspect of the illustrative embodiments does not allow a user to be shown how much anyone else has paid for priority. The user can pay however much the user desires to spend to obtain a priority ranking, and then receive a ranking of priority based on the amount paid.

In accordance with a further exemplary aspect of the illustrative embodiments, a user can pay however much the user desires to spend to obtain a priority ranking in accordance with the previous exemplary aspect, and then be shown the priority spot which has been obtained based on the paid amount. If this spot is not satisfactory to the user, the user can pay additional money to move the song up in priority ranking, and be shown the new priority ranking obtained based on the additional money paid. The user can repeat this process until the desired priority ranking has been obtained. The user can also pay additional money to make it harder for other users to pre-empt the selected priority spot on the list in a bidding-type situation. Any other suitable method of increased-pay-for-increased-priority may also be implemented.

In accordance with an additional exemplary aspect of the illustrative embodiments which may provide a "lock in" feature, a user can "lock in" a priority ranking with a payment of a pre-selected amount. For example, if a user pays 15 credits to obtain a ranking of $3^{rd}$ in priority, and wishes to guarantee the third ranking, the user may pay, for example, 4 more credits to "lock in" the ranking. Since locking in the ranking may require the "lock in" of all the rankings above the user as well, the user may be required to pay a certain amount to "lock in" all songs above the user's selection. In one such situation, the user can either choose to pay the price quoted for the "lock in" or pay the same or a varying amount of credits in an attempt to prevent future over-bidding or to move the user's song up further in the priority list.

In accordance with another exemplary aspect of the illustrative embodiments, any of the aforementioned bidding strategies may be implemented, and the user may be shown how much everyone has paid for their particular rankings. This allows the user to know exactly how much he will have to pay to obtain a certain priority position. If the "lock in" feature is implemented, this will also let a user know if it is cheaper to pay the price to "lock in" the song or to pay to move up on the priority list. All of these options result in increased revenue for the operator.

It should be noted that although the embodiments above describe a system for distributing media to non-movable jukeboxes, alternative embodiments using similar systems could distribute media to portable jukebox devices and are contemplated by, and within the scope and spirit of, this invention. A portable jukebox may be, for example, a PDA, a cell phone, or any other movable device capable of receiving and playing music. Furthermore, media may be distributed to portable jukeboxes using the above described methods (e.g. through a broadband connection, wireless connection, etc.), or any other appropriate method, more suited to the particular portable device, such as, for example, using Bluetooth technology. Additionally, the jukeboxes described above typically are for commercial purposes. However, jukeboxes for other purposes such as, for example, playing residential media, also are contemplated by, and within the scope and spirit of, this invention.

In other exemplary embodiments, an employee of a location with a jukebox can be rewarded based on the number of plays customers pay for on the jukebox. In one such exemplary embodiment, the system keeps count of how many plays have been paid for by customers. Every time a certain number of plays have been paid for, the bar employee receives one free play. In some embodiments, a separate counter will be maintained, while in others embodiments only one counter may be necessary to calculate the number of free plays available. Thus, certain exemplary embodiments encourage employees to promote the jukeboxes by compensating the employee with free plays. This also can help reduce the similarity of song-selection throughout the day, preserve free plays for employees of different shifts, etc.

Figure 19A:
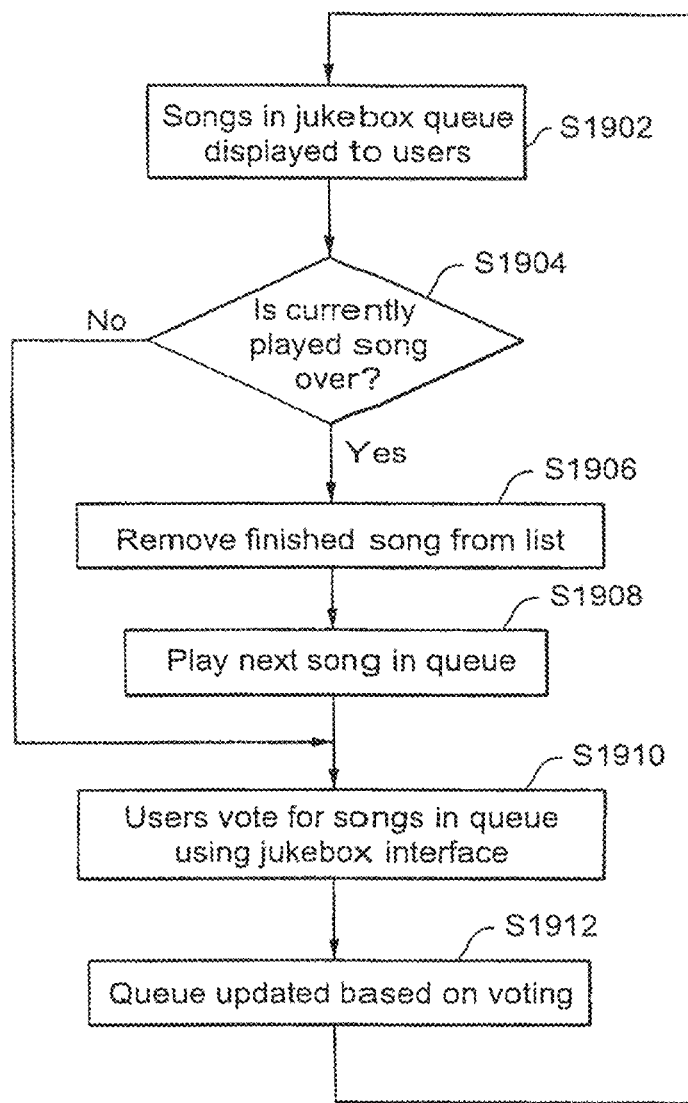
FIG. 19A is a flowchart showing an exemplary implementation of a jukebox voting process.

Similarly, jukebox users may vote for particular instances of media to alter their priority in playlists. In this way, jukebox users can, for example, "battle" for control over the music to be played in a particular zone or particular zones within or among locations. It will be appreciated that this voting/battle mode may be implemented by using, for example, a dynamic queue, a priority queue, multiple queues, etc. It also will be appreciated that a jukebox could put into a voting mode automatically (e.g. at a particular time of day and/or on a particular day of the week), or it could be triggered manually. FIG. 19A is a flowchart showing an exemplary implementation of a jukebox voting process. Unlike conventional jukebox operations, or even jukebox bidding modes, a list of songs in a jukebox queue is displayed to users in step S1902. This list may be generated automatically, by operators, bar managers, patrons at a bar, etc. The list could be displayed, for example, on a jukebox, or, more preferably, on one or more stand-alone monitors. Additionally, in certain example embodiments, the list could be viewed by a plurality of mobile devices and/or terminals. Preferably, the information displayed contains at least the artists and names of coming songs, and a number associated with the priority of those songs. The list should be sorted by this number, so that the song with the most "votes" is displayed as the "next" song to be played, followed by the next highest song, etc. Step S1904 determines whether the currently playing song is over. If it is over, step S1906 removes it from the queue, and the next song is played in step S1908. In another embodiment, users could vote to stop/skip the currently playing song (or instance of media) by, for example, exceeding the number of votes the song had before the jukebox started playing.

As users see the coming songs, they will be tempted to push up the songs they like so the songs and/or push down the songs they do not like. In general, the more users who vote, the greater the ambiance of good songs. Thus, after step S1908, or in the case that the song is not over, the jukebox receives users' votes for particular songs in step S1910. Voting can be based on credits (as users buy credits), or tied to a user's account. In certain example embodiments, users must login to place a vote, and in certain example embodiments, users can vote a limited number of times. Preferably, users may vote from at least two distinct places within a location. The queue is updated based on this voting in step S1912, and the process returns to step S1902, where the displayed list is refreshed.

In certain example embodiments, the queue may be based on the total number of votes for particular songs. In certain other example embodiments, users may vote for and/or against certain songs and the "net" information may be displayed, indicating the number for and against, or merely the net result. If there are more votes against a song than for, the system can perform one or more of the following functions. For example, the jukebox simply may keep the song in the queue with a negative number of votes. Alternatively, the jukebox may keep the song in the queue with a zero or negative number of votes, but, for example, always wait until the net vote reaches at least 1 before playing the song. Still alternatively, the jukebox may drop any song that reaches zero or a negative number of votes.

FIG. 19B(1) is an exemplary screenshot showing a voting queue display. Display 1900a shows the currently playing song 1902 and its progress 1904. It will be appreciated that progress 1904 of currently play song 1902 may be displayed in any number of ways, such as, for example, as a number indicating the time remaining, a sliding bar, etc. Artist and song list 1906 preferably is displayed based on the corresponding number of votes in votes area 1908a. Optionally, user area 1910 may indicate information about the users voting for the songs, such as, for example, the user placing the song on the list, the last user to vote for the song, the name of the group "battling" to have the song played, etc.

FIG. 19B(2) is another exemplary screenshot showing a voting queue display. FIG. 19B(2) is similar to FIG. 19B(1), but votes area 1908b reflects the "net" voting of users. That is, for example, in FIG. 19B(1), the display indicates the number of votes for and against a particular song, as well as the net voting result.

Figure 19C:
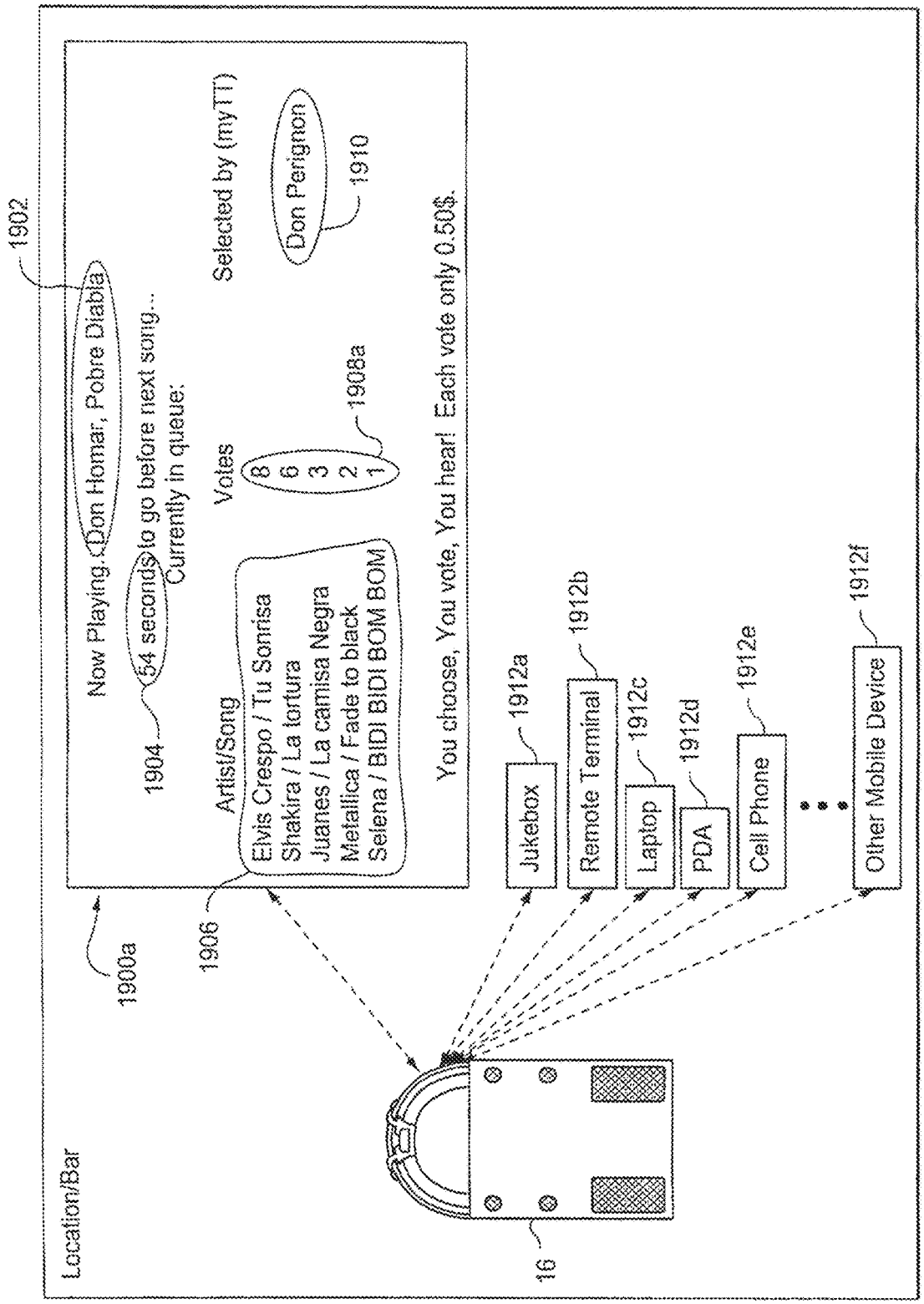
FIG. 19C is an exemplary block diagram showing a voting mechanism within a given location.

FIG. 19C is an exemplary block diagram showing a voting mechanism within a given location. Display 1900a corresponds to FIG. 19B(1), though it will be appreciated that a display corresponding to FIG. 19B(2) could be substituted, as well as any other display indicating the same or similar information. The list preferably is updated by jukebox 16. Users may vote to update the list (e.g. vote for/against a song) via jukebox 16, or by any device optionally connected to jukebox 16, such as, for example, another jukebox 1912a. a remote terminal 1912b, a laptop 1912c, a PDA 1912d, a cell phone 1912e, another mobile device 1912f, etc.

Figure 19D:
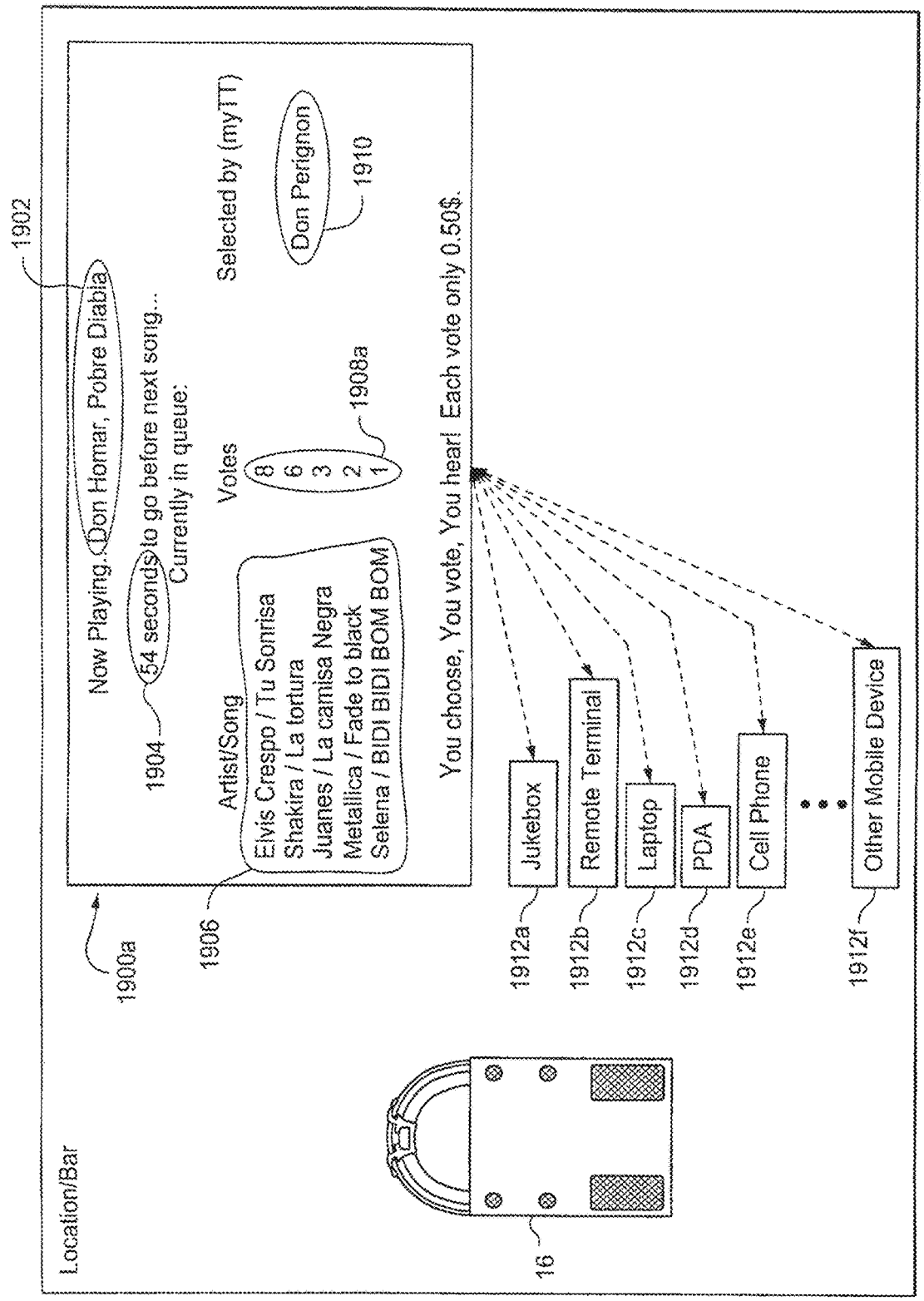
FIG. 19D is another exemplary block diagram showing a voting mechanism within a given location.

FIG. 19D is another exemplary block diagram showing a voting mechanism within a given location. FIG. 19D differs from FIG. 19C in that users voting from optionally connected devices 1912a-f may affect the voting list directly, without interfacing with jukebox 16.

Figure 19E:
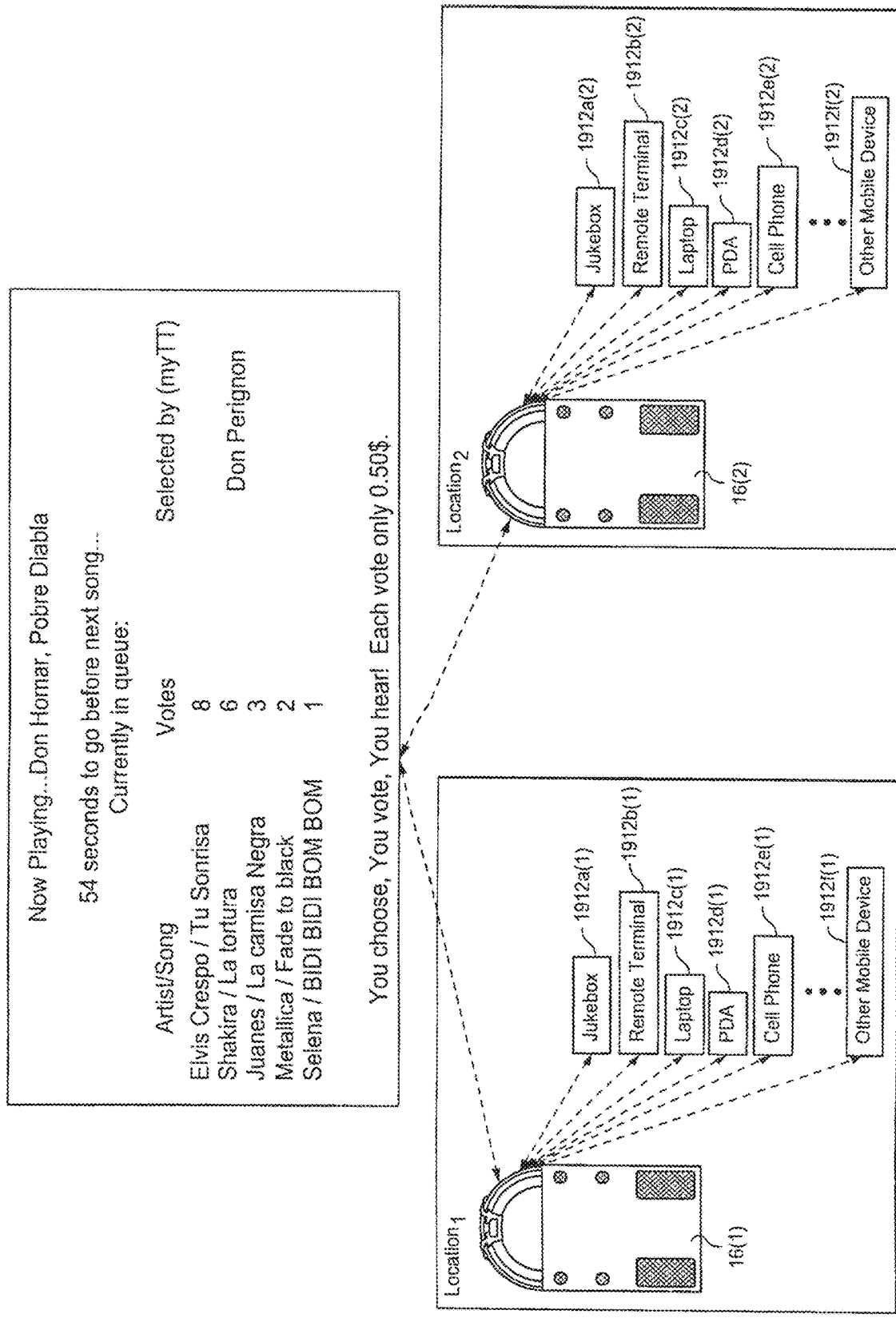
FIG. 19E is an exemplary block diagram showing a voting mechanism for use with multiple locations.

An alternate application includes a voting-mechanism where multiple locations (e.g. bars, restaurants, venues, etc.) are networked together through, for example, the Internet. Those linked locations allow more patrons to "battle" against each other. In this embodiment, the networked jukeboxes would be playing the same song and collectively all users from all locations would decide on the playing order through the voting mechanism or the like. Thus, FIG. 19E is an exemplary block diagram showing a voting mechanism for use with multiple locations. A first jukebox 16(1) with a first plurality of mobile devices 1912a(1)-f(1) within a first location communicating therewith, as well as a second jukebox 16(2) with a second plurality of mobile devices 1912a(2)-f(2) within a second location communicating therewith with a may affect a playlist accessible by jukeboxes 16(1) and 16(2).

Figure 19F:
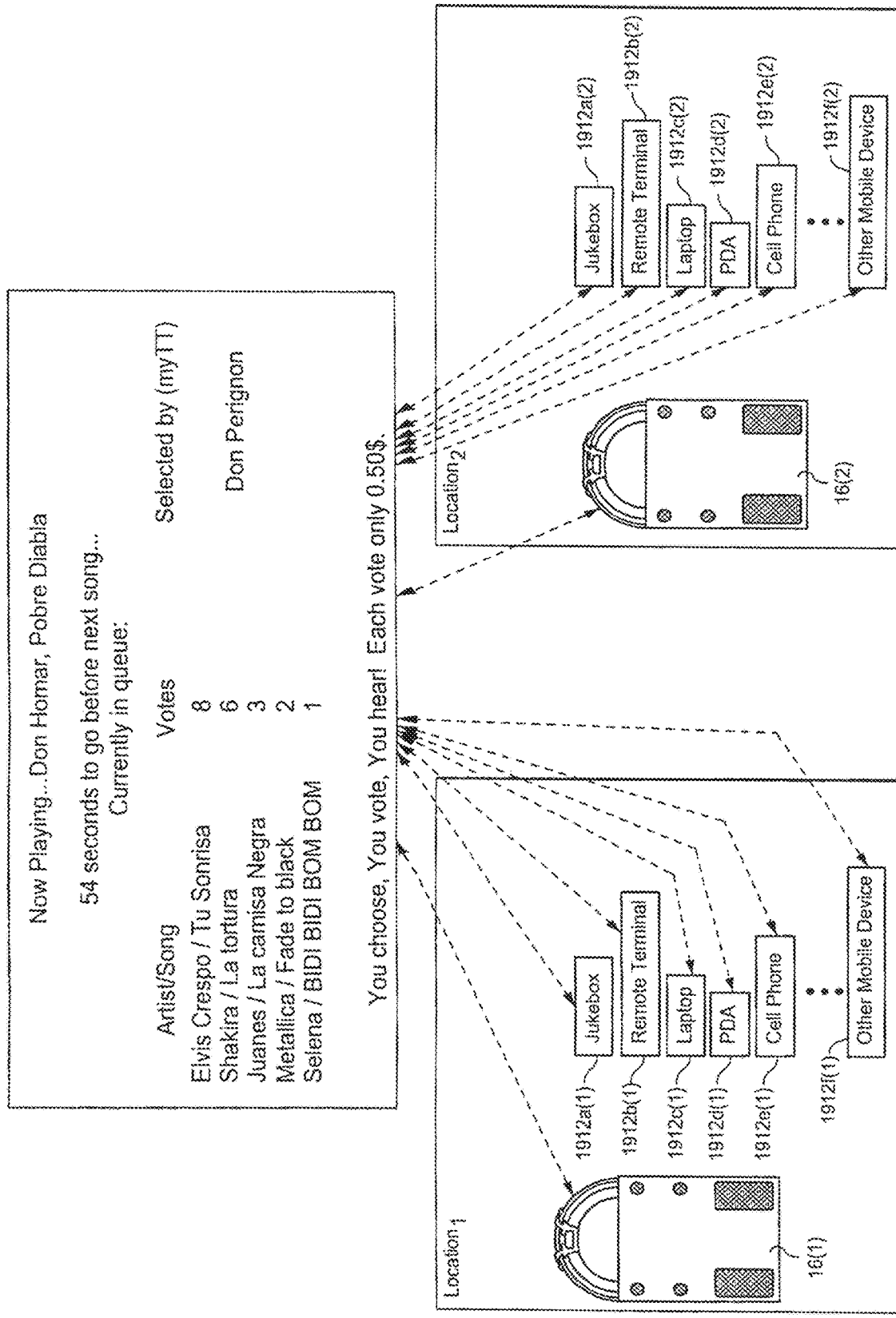
FIG. 19F is another exemplary block diagram showing a voting mechanism for use with multiple locations.

FIG. 19F is another exemplary block diagram showing a voting mechanism for use with multiple locations. It is like FIG. 19E, except first plurality of mobile devices 1912a(1)-f(1) and second plurality of mobile devices 1912a(2)-f(2) may directly affect the voting list.

An alternate application of this voting features relates to enhancing the "pause" mode of a jukebox. A jukebox, while in pause mode, typically prevents users from selecting music from the jukebox. For example, bartenders may use a pause mode when a special event (e.g. a football game) is presented at the location and when the audio system of the location is playing the match or event. The voting feature can be used to select which songs will be played after the special event is over. It has been widely observed that patrons watching a game very often leave the location once a match is over. This alternate method of selecting songs to be played is likely to motivate patrons to stay in a location and/or continue using the jukebox, etc.

Figure 20:
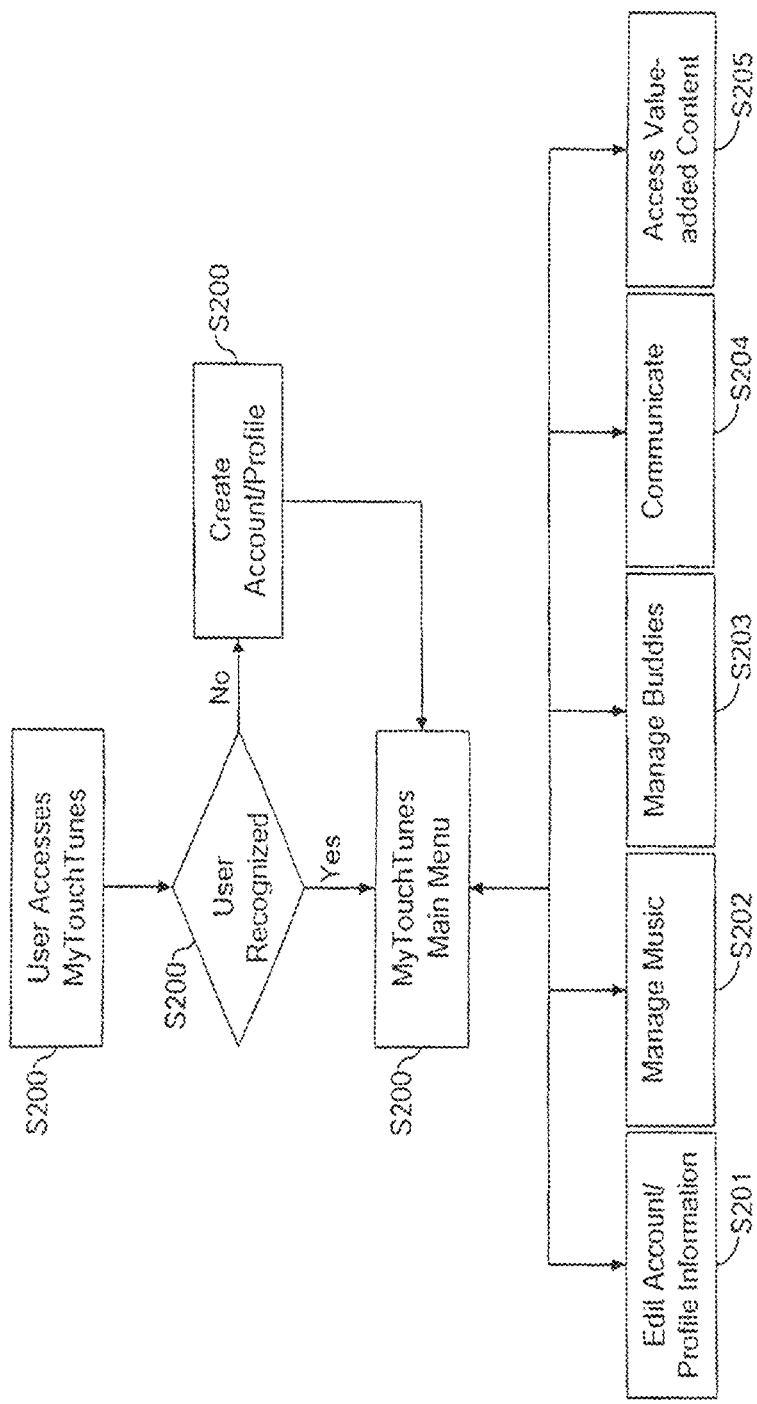
FIG. 20 is a flowchart showing an illustrative process for using a user-tailored system for managing music, communications, etc. in accordance with one exemplary embodiment.

FIG. 20 is a flowchart showing an illustrative process for using a user-tailored system for managing music, communications, etc. in accordance with one exemplary embodiment. It is to be appreciated that the Personal Music Assistant may work as a complement to, component of, etc. to systems according to this exemplary embodiment. In step S2000, a user accesses the user-tailored system, dubbed MyTouchTunes in this case. It is to be appreciated that a user may access the system at a number of locations, such as, for example, via an Internet front-end, at a jukebox terminal, etc. It further is to be appreciated that the user may access the system in any number of ways, such as, for example, by inputting a username and password combination into the Internet front-end or jukebox terminal, by swiping a credit card at a jukebox terminal, by scanning a site-specific "smart-card" or flash card, etc. In certain example embodiments, a user may be recognized through biometric data, such as, for example, finger prints, retinal scans, etc. It will be appreciated that biometric authentication may work independently, or together with, more conventional forms of identifying users, such as, for example, username/password combinations, smart-cards, and the like. The system determines whether it recognizes the user in step S2002. If the user is not recognized, the user can be prompted to create account/profile information, as in step S2004. The account/profile information will be described in more detail below with reference to FIG. 21A.

If the user is recognized in step S2002, the MyTouchTunes main menu is displayed for the user in step S2006. From the MyTouchTunes main menu, users using a system according to this exemplary embodiment may, for example, edit account/profile information in step S2010, manage music in step S2020, manage buddies in step S2030, communicate with others in step S2040, and/or access various value-added content that may be provided by the system in step S2050. These and other features will be described in more detail below with reference to FIGS. 21A through 21B.

Figure 21A:
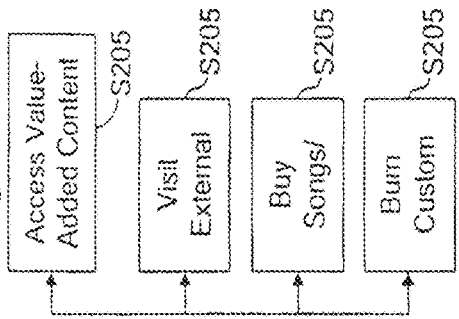
FIG. 21A shows non-limiting, illustrative options available for editing account/profile information in one exemplary embodiment.

FIG. 21A shows illustrative options available for editing account/profile information in one exemplary embodiment. As noted above, it is to be appreciated that the exemplary steps illustrated in FIG. 21A may correspond to the steps required for initial account/profile setup. In such an initial setup case, however, an exemplary system might require the user to complete all of the required information at one time before allowing the user to access the main menu (step S2006 in FIG. 20). It also is to be appreciated that such account/profile information could be stored in various locations as necessary to a given implementation, such as, for example, in a central location or database, on a particular establishment's server, on specific jukebox terminals, and/or on a removable card that would identify the user and the user's information when inserted into a jukebox.

A user would first input personal data in step 2012. Such personal data may include, for example, an e-mail address for the user, a telephone (preferably mobile phone) number, and/or a name. The system also may prompt the user to create a unique username and password so that the system can identify the user at later times and from other locations. Alternatively, the system may use the user's e-mail address as a username and only require a corresponding password. Still alternatively, in the case of residential jukeboxes, for example, an exemplary system may not require a password at all. Based on the personal data, the exemplary system may gather enough information to recognize the user at logins (e.g., online access, preferred location, other locations within a given area, etc.) as well as send e-mail and text messages to the user. These exemplary features will be discussed in greater detail below.

In step S2014, users may specify various locations they frequent. This feature may enable user-tracking by various establishments, advertisers, etc. Establishments may, for example, provide special offers to regulars or others in a particular area to entice them to come visit. Advertisers may monitor the personal information, location information, and playlists to provide, for example, concert tickets, special offers on CDs, t-shirts, and/or other merchandise that may seem to be appealing based on the user's preferences. Still further, if such account/profile information is stored locally on various terminals, the system may communicate with those other terminals to provide the playlists in preparation for a user's visit. In step S2016, a user may add credits and/or specify payment information. Users may, for example, use their credit cards to increase the number of credits they have before entering an establishment, or while at an establishment. Alternatively, users may become "certified" by, for example, providing credit card information and allowing jukeboxes to automatically bill their credit cards for future credits purchased, etc. It is to be appreciated that step S2016 can be used to purchase credits for oneself or for someone else, such as, for example, one's buddies, an employee of the establishment, etc. It also is to be appreciated that a user may transfer money from an account, such as, for example, a Pay-Pal account, to a jukebox-specific account, or a user might use such an account to purchase music and/or services directly.

In certain exemplary embodiments, a user may register by creating an account at a jukebox and providing a verifying contact mechanism, such as, for example, a mobile phone number and/or email address. After a user creates an account and inputs verifying contact mechanism, a message may be sent to that location. For example, a user may receive a text message. Once that message is received, the user may be prompted to input a code to the jukebox, send a return email or text message, etc., to become fully registered and/or to take advantage of certain other advanced features, such as, for example, one or more of the features disclosed herein.

Figure 21C:
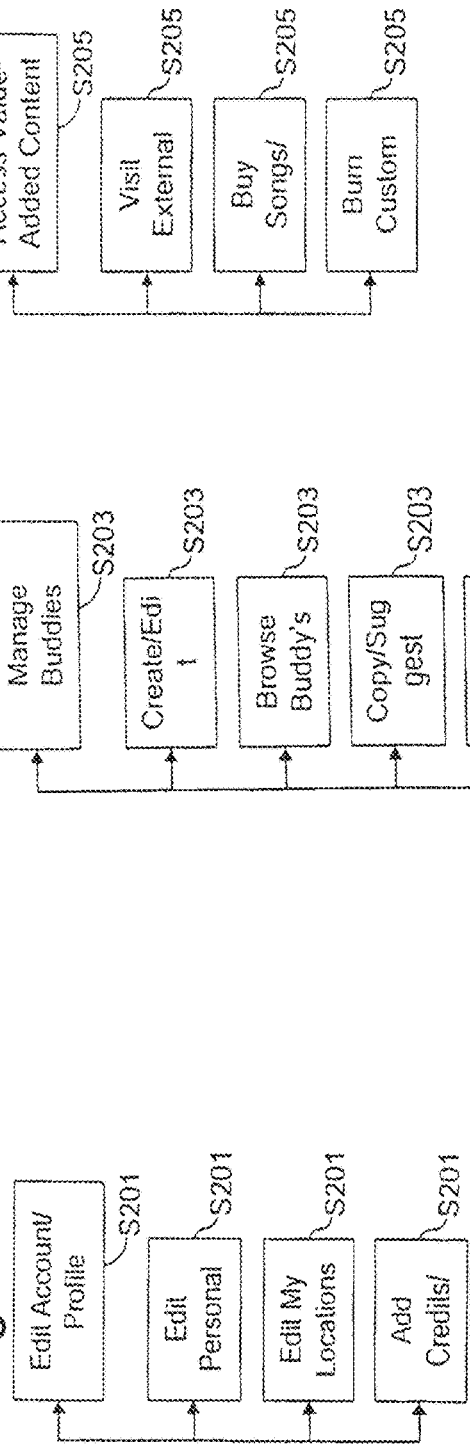
FIG. 21C shows non-limiting, illustrative options available for managing buddy lists in one exemplary embodiment.
Figure 21E:
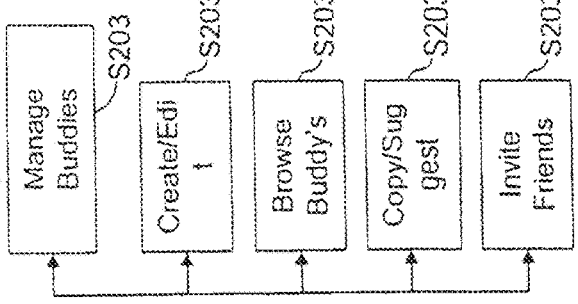
FIG. 21E shows non-limiting, illustrative options available for accessing value-added content in one exemplary embodiment.
Figure 21B:
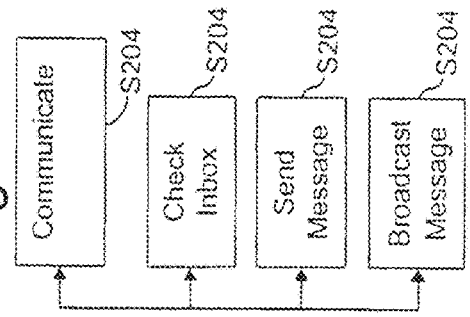
FIG. 21B shows non-limiting, illustrative options available for managing music in one exemplary embodiment.

FIG. 21B shows illustrative options available for managing music in one exemplary embodiment. In step S2022, a user may create or edit already existing playlists. Users preferably can search through songs using the above-described methods and/or use system-generated suggestions to build their playlists. Preferably, users also may give their playlists descriptive titles, such as, for example, "Favorite Jams," "80s Night," "Smooth Love Songs," etc. Users may further designate their playlists as "public" or "private" to allow or restrict other users from browsing their playlists. Users may, in step S2024, rate their songs and/or playlists through the PickList feature. The PickList also may generate a custom playlist comprising the songs the user has rated the highest at a given time. Alternatively, a PickList may comprise a list based on the HotHits list described above. In step S2026, a user may play music on a jukebox using, for example, any of the above described methods with or without using these playlists. Normally, selecting a playlist for play on a jukebox will add those songs to the regular queue. However, as described above, users may pay an additional fee and/or use the bidding mechanism described above to play their music immediately. Furthermore, selecting a playlist (or playlists) for play on a jukebox normally will play all songs in that particular playlist (or in those particular playlists). However, users may unselect certain songs to prevent them for being played. This enables users to further customize playlists dynamically when they are playing their music.

In addition or in the alternative, further playlists may be imported from external sources. For example, software and/or hardware devices often store user-defined and/or custom-generated (e.g., most frequently played, recently added, etc.) playlists. By way of example and without limitation, playlists may be extracted from iPods, portable MP3 players, and/or other hardware devices. This may be done at the jukebox using an appropriate hardware connector provided to the jukebox and/or at a device remote from the jukebox (e.g., on a home computer) where it is more likely that an appropriate hardware connector will already be located (e.g., a proprietary docking port, a USB connection, etc.). In either or both cases, the playlists may be uploaded to a central audiovisual distribution server after the playlist is imported to the local device. Similarly, by way of example and without limitation, playlists may be extracted from iTunes, Windows Media Player, and/or other software applications. In many cases, such devices and/or software applications store playlists in an unencrypted and/or unencoded manner such that the playlists may be read in a manner similar to a flat text file. In this and/or other ways, the imported playlists may be made available to one or more jukeboxes connected to the audiovisual distribution network. Of course, in certain other cases, it may be necessary to decrypt, unencode, and/or perform other processing on the playlists of other hardware devices and/or software applications, prior to processing to make the now-readable playlists suitable for use, for example, on a jukebox or in connection with a jukebox-related service.

This feature may be advantageous to users in that the need to create and subsequently recreate existing playlists may be reduced, at least insofar as a single playlist may be defined on a device and subsequently used on a jukebox at a later time without a significant amount of reentering, reselection, and/or regrouping of the same information. Such techniques also provide yet a further means of interacting with and customizing the jukebox to the user's preferences, e.g., by enabling the customization of playlists through devices and/or software applications with which the user may be more comfortable and/or have more experience, have different interfaces, etc.

Thus, systems and/or methods of distributing a playlist to one or more digital jukeboxes connected to an audiovisual distribution network is provided in certain example embodiments. A peripheral device having a peripheral playlist stored in a computer-readable storage medium thereon is connected to a digital jukebox via a connector. The peripheral playlist is retrieved for the digital jukebox. This may be accomplished by programmed logic circuitry (e.g., any suitable combination of hardware, software, firmware and/or the like) provided to the jukebox. The peripheral playlist is converted to a jukebox playlist. The jukebox playlist is published at least on the jukebox. Similarly, a software application running on a computer device (e.g., a PC, a laptop, PDA, or other similar portable computing device) may be read by a computer and published to a server on the audiovisual distribution network. The peripheral device may be, for example, at least one of a portable music player, a computer, and/or a mobile phone.

The peripheral playlist may be at least temporarily stored to a computer-readable storage medium of the digital jukebox. It may be determined whether the jukebox playlist is to be designated a public jukebox playlist or a private jukebox playlist. Based on the determination, the jukebox playlist may be made publicly available or kept private to the particular registered user importing the playlist.

The jukebox playlist may be sent to a server of the audiovisual distribution network, and the jukebox playlist may be made available to jukeboxes connected to the audiovisual distribution network and/or remote devices connected to the audiovisual distribution network. The person importing the playlist may have to log into the jukebox or a portal to the jukebox before being allowed to import the playlist.

A jukebox device to accomplish the same and/or similar functionality may also be provided, wherein at least some of the functionality is enabled through the use of a processor provided to the jukebox.

In certain exemplary embodiments, it may be advantageous to prevent users from creating playlists directly at the jukeboxes using the jukebox interfaces themselves. For example, this may reduce the amount of crowding around a jukebox, monopolization of the jukebox by a single or a few users, etc. In addition or in the alternative, users may have a reduced ability to create playlists directly at a jukebox. For example, a user may be able to create a playlist from a predetermined set of songs. That predetermined set of songs may include only those songs played by the user on that particular night, at the jukebox(es) at that particular location, at any jukebox(es) connected to the audiovisual distribution network, etc. In this way, it may be possible to enable the user to benefit from the customization of playlists techniques described herein directly at the jukebox while also reducing the time required to do so. In addition, the users may be prompted to create playlists in which songs that have been played, and thus may be likely to be played again, are added.

Thus, in certain exemplary embodiments, systems and/or methods for playing instances of media on a digital downloading jukebox are provided. A user is required to log into the jukebox. A plurality of selectable instances of media are provided for play on the jukebox. User selection of an instance of media from the plurality of selectable instances of media is enabled via a user interface to the jukebox. For each user selection, the instance of media is added to a playlist stored in a computer-readable storage medium of the jukebox. The instances of media in the playlist are played in order. The plurality of selectable instances of media is selected from a master group of instances of media in dependence on a previous play of an instance of media by the user.

In certain exemplary embodiments, the plurality of selectable instances of media is formed from instances of media previously played by the user within a predetermined time period and/or from instances of media previously played by the user at a predetermined location. In certain exemplary embodiments, the plurality of selectable instances of media is formed from instances of media stored in a list of recently played instances of media associated with the user.

Once songs are added to a playlist, a playlist may be played in whole or in part. For example, if a user has enough credits, the entire playlist may be played. However, if the user does not have enough credits, the user may either enter additional payment to purchase a sufficient number of credits to play the entire playlist or may play only a portion of the song. In the latter case, the user may be prompted to select a subset of songs for play from the playlist. Alternatively, the songs from the playlist may be played in order until the credits are exhausted. Optionally, a prompt for the user to enter additional payment to play the whole playlist may be presented when appropriate, and it may removed from a display once sufficient payment has been inserted.

Also with respect to the amount users may be charged for plays, it will be appreciated that in certain exemplary embodiments, registered and/or verified users may be given "price breaks" on plays. For example, users normally may be charged a premium for selecting a song that is not currently available on the jukebox (e.g., requires a download, e.g., from the audiovisual distribution network or other source). In certain exemplary embodiments, certain preferred users may only be charged a reduced or the minimal amount of credits (e.g., only 1 credit), no matter what the source of the song. In certain other exemplary embodiments, preferred users may only be charged the minimal amount of credits if the song was recently played by the particular user. In still other exemplary embodiments, preferred users may only be charged a reduced or the minimal amount of credits if the song exists in a playlist associated with the user (e.g., a playlist the user created, a playlist created by another that the user played in whole or in part, etc.). Thus, it may be possible in certain exemplary embodiments to reward verified users by reducing the number of credits charged for certain instances of media associated with the playlists of those users.

As such, systems and/or methods of playing an instance of media on a digital downloading jukebox are provided in certain exemplary embodiments. A plurality of instances of media on the jukebox is provided. An interface is provided to a user of the jukebox to allow the user to search for a particular instance of media for play on the jukebox. It is determined whether the instance of media is available for immediate play on the jukebox free from additional processing by the jukebox (e.g., without the need for further downloading or retrieval of the instance of media beyond that which is standard for plays, without the need for non-standard searches, etc.). When the instance of media is available for immediate play, the user is charged a predetermined first number of credits and the instance of media is queued up for play. When the instance of media is not available for immediate play, it is determined whether the user is a verified user. When the user is a verified user, a second predetermined number of credits is charged if the instance of media exists in a playlist associated with the user, but otherwise a third predetermined number of credits is charged. The instance of media is queued up for play. The second predetermined number of credits is less than the third predetermined number of credits, and the third predetermined number of credits is greater than the first number of predetermined credits.

With respect to the charges, then, in certain exemplary embodiments, the price for a normal play may be the same as the price for a premium song requiring download when the user is a registered user. In certain exemplary embodiments, the playlist associated with the user is a playlist previously created by the user, a playlist including songs recently played by the user, and/or a playlist created by another user but recently played at least in part by the user.

The determination of whether the instance of media is available for immediate play on the jukebox free from additional processing by the jukebox may include determining whether the instance of media resides on a storage area separate from a dedicated storage area of the jukebox comprising immediately playable instances of media. The separate storage area may be a remote server, a partition of the dedicated storage area of the jukebox, a separate storage area within the jukebox, etc. The determination of whether the instance of media is available for immediate play on the jukebox free from additional processing by the jukebox may include, in addition or in the alternative, determining the user's search methodology provided by the interface. For example, a premium may be charged for a "super-search" as compared to a title or artist search. Of course, these examples are provided by way of example and without limitation, and other search methodologies described herein may be provided, and the pricing may be distinguished on the basis thereof, alone and/or in combination with the type of user and/or the existence of the instance of media in a playlist associated with the user.

Here, as elsewhere, any suitable combination of programmed logic circuitry (e.g., hardware, software, firmware, and/or any suitable combination thereof) may enable such functionality. Additionally, instructions for carrying out the same may be stored on any suitable computer-readable storage medium.

FIG. 21C shows illustrative options available for managing buddy lists in one exemplary embodiment. Users may keep track of buddies (e.g., friends, regulars at a bar, etc.). The system may use any instant messaging standard, such as, for example, AOL Instant Messenger, MSN Messenger, Yahoo! Messenger, ICQ, a custom jukebox-specific protocol, etc. to send and receive messages. Preferably, the system would alert the user of the buddies' statuses (e.g., online, inactive, busy, etc.). In step S2032, a user may create or edit an already existing buddy list. Users may search for buddies by, for example, inputting their names, e-mail addresses, etc. Additionally, users may invite friends to join by issuing invitations, preferably by e-mail or SMS (Short Message Service) text message to a mobile phone, in step S2038.

Users also may browse their buddies' music collections, playlists, PickLists, etc., as shown in step S2034. Users then could develop their own playlists and/or PickLists based on what they perceive as popular amongst their friends. Users also may copy music from their buddies or send music to their buddies, preferably for a fee, as shown in step S2036. In a step not shown, users also may designate particular songs to play when their friends log in to the jukebox, again, preferably for a fee. Other features pertaining to communication between buddies will be described below with reference to FIG. 21D.

Figure 21D:
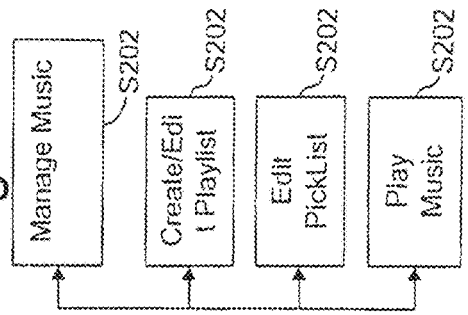
FIG. 21D shows non-limiting, illustrative options available for communicating with others in one exemplary embodiment.

FIG. 21D shows illustrative options available for communicating with others in one exemplary embodiment. Preferably, the system can send e-mails and SMS messages to mobile phones. It is to be appreciated that the system should be able to communicate using any variety of communications protocols, such as, for example, via e-mail and/or e-mail-like messages accessible only by the MyTouchTunes system. It also is to be appreciated that bar managers may also send messages (e.g., via e-mail, SMS, etc.) to alert others of events, specials, etc. In step S2042, users may check their inbox. Users may receive messages from, for example, their friends (or buddies), proprietors, and/or advertisers, etc. Buddies may suggest, for example, songs or places to gather. In some exemplary embodiment, buddies may receive instant messages on their mobile phones alerting them of a get-together, a particular user's location in a bar, etc. Furthermore, users may leave messages for others to appear on someone else's next log-in. Proprietors may send messages to their regulars or others they wish to target to alert them, for example, of drink specials, upcoming special events, etc. Advertisers may, based on demographic information provided by users, extend special offers. In step S2044, users may send messages to others' e-mail address, MyTouchTunes inbox, mobile phones, etc. Alternatively or in addition to step S2044, in step S2046, users may broadcast messages to buddies or groups of others, to, for example, alert a particular group of upcoming parties, etc. Thus, exemplary systems can learn about networks of friends through the messages that users send. In addition, the jukebox may directly provide an interface for the features described above, or it may provide for wireless access to the features, for those users that may bring a wireless device with them to the location (or within range) of the jukebox. Some or all of the features can also be provided to the users remotely by, for example, enabling users to access the jukebox services through the internet or other suitable communications network, using for example, the user's home computer. In certain exemplary embodiments, communications may be made to individual users, predefined groups of users (e.g., family, coworkers, teammates, friends, etc.). Also, custom messages may be composed, or more standard messages may be selected (e.g., "Meet us at X Bar," "What are you doing tonight?," etc.). Groups and/or canned messages may be implemented and used regardless of whether the message is sent via email, SMS, IM, etc.

Similarly, certain exemplary embodiments provide systems and/or methods for establishing and managing a registered user's connections. A registered user may seek to establish a connection with another user or prospective contact at a jukebox or remote from a jukebox. In either case, a user may be prompted to log in. After logging in, the user is prompted to enter information about the prospective connection. This may include, for example, an email address, a mobile phone number, a physical address, a jukebox-specific messaging service, and/or the like.

Once the information is entered, a confirmation message may be sent (e.g., via the audiovisual distribution network) to the prospective contact. The confirmation message may identify the registered user (e.g., by name, login name, with a picture or avatar, etc.) and/or provide contact information for the registered user (e.g., a phone number, email address, jukebox login name, etc.). The prospective contact may determine whether a connection between the two should be established, e.g., by verifying that the prospective contact really knows who the registered user is.

In a case where the prospective contact is not already a registered user of the jukebox services, the prospective contact may be requested, and in some cases required, to become a registered user of the jukebox services itself.

After receiving a confirmation message, the prospective contact may choose whether to accept the registered user as a connection. This may be done, for example, by sending a message including an acceptance code or logging into a particular website or jukebox. For example, an email message, text message, or the like may be sent from the prospective contact as a confirmation. The acceptance code may be a particular alphanumeric code uniquely identifying the registered user and the prospective contact, or it simply may be the email address or mobile phone number of the prospective contact (e.g., sending an SMS, email, telephone call, and/or other message with a blank message, a "YES" message, an alphanumeric acceptance code, etc.). Alternatively or in addition, the acceptance code may be embedded in a hyperlink accessible by the prospective contact and/or may be accessible via a computer-based interface (e.g., a website) or jukebox interface. In still other exemplary embodiments, the prospective contact may have to log into a website or jukebox without the use of a preformed hyperlink having an acceptance code embedded therein.

Once the acceptance code is sent from the prospective contact, it may be validated, e.g., by a server in the audiovisual distribution network. The validation process may include determining whether the registered user is valid, whether the prospective contact is valid, etc. If this is successful, a connection between the registered user and the prospective contact may be established.

Once a connection is established between two people, they may communicate with each other via the jukebox and/or jukebox-related services. For example, they may send messages as described above, share credits, etc.

Each user may determine how and/when communications may be received. For example, a user may use an interface provided on a jukebox or remote to the jukebox to limit messages to a single communications medium. For example, a user may wish to only receive messages on a particular email address (even though another user has provided an alternate email address), in which case messages may be forwarded to the specified email address. In another example, a user may with to never or only be contacted by SMS messages. Still further, a user may limit the times at which messages may be received, e.g., to prevent messages from being sent too late in the evening or too early in the day (for example, which might otherwise disturb the user). In such cases, the messages may be queued at a jukebox or at a server for later delivery. Users additionally may specify that they will not accept any incoming connections unless specified in an access control list. Thus, it will be appreciated that communications among connections may be managed and/or filtered, for example, to specify when, to where, and from whom they may be received, etc. A registered user can then use the connections list to communicate with the parties in the list using the jukebox or remote device that can access the jukebox network, such as by logging on to the network using a personal computer or the like.

FIG. 21E shows illustrative options available for accessing value-added content in one exemplary embodiment. Users could access external websites (preferably of partners) as shown in step S2052 for any number of reasons. For example, advertisers may place banner ads pertaining to the particular song or album selected to allow users to place orders for related merchandise. Advertisers may use profile information to target ads, e-mails, text, etc., potentially anywhere (e.g., online, on a jukebox, etc.). For example, jukebox use can be used as a "qualifier" for targeting certain products (either conspicuously or non-conspicuously) to individuals who spend more than a certain amount on jukeboxes yearly. Users also may access external websites to link to a particular band's website, to order sheet music or guitar or bass "tabs," to view lyrics, etc. Also, in step S2054, users may follow a link to download/purchase songs and/or albums from a third-party provider such as iTunes or Amazon.com. In some exemplary embodiments, this step may also be linked to from the "Manage Music" screen (step S2020), etc. Additionally, in step S2056, users may order custom CDs and have them shipped, preferably for a fee. Users could base these orders on their playlists, their Pick-Lists, their buddies' playlists, the HotHits list described above, etc.

It is to be appreciated that although the above-described exemplary MyTouchTunes system has been described in terms of a broad concept for making accounts available on any compatible system, other exemplary embodiments are contemplated where accounts may be made available to smaller subsets of jukeboxes, including, for example, a single jukebox terminal acting in isolation. Furthermore, a large group may act as if it were one system in isolation, or, alternatively, it could have complete knowledge of all user accounts/profiles, locations, etc.

Figure 22:
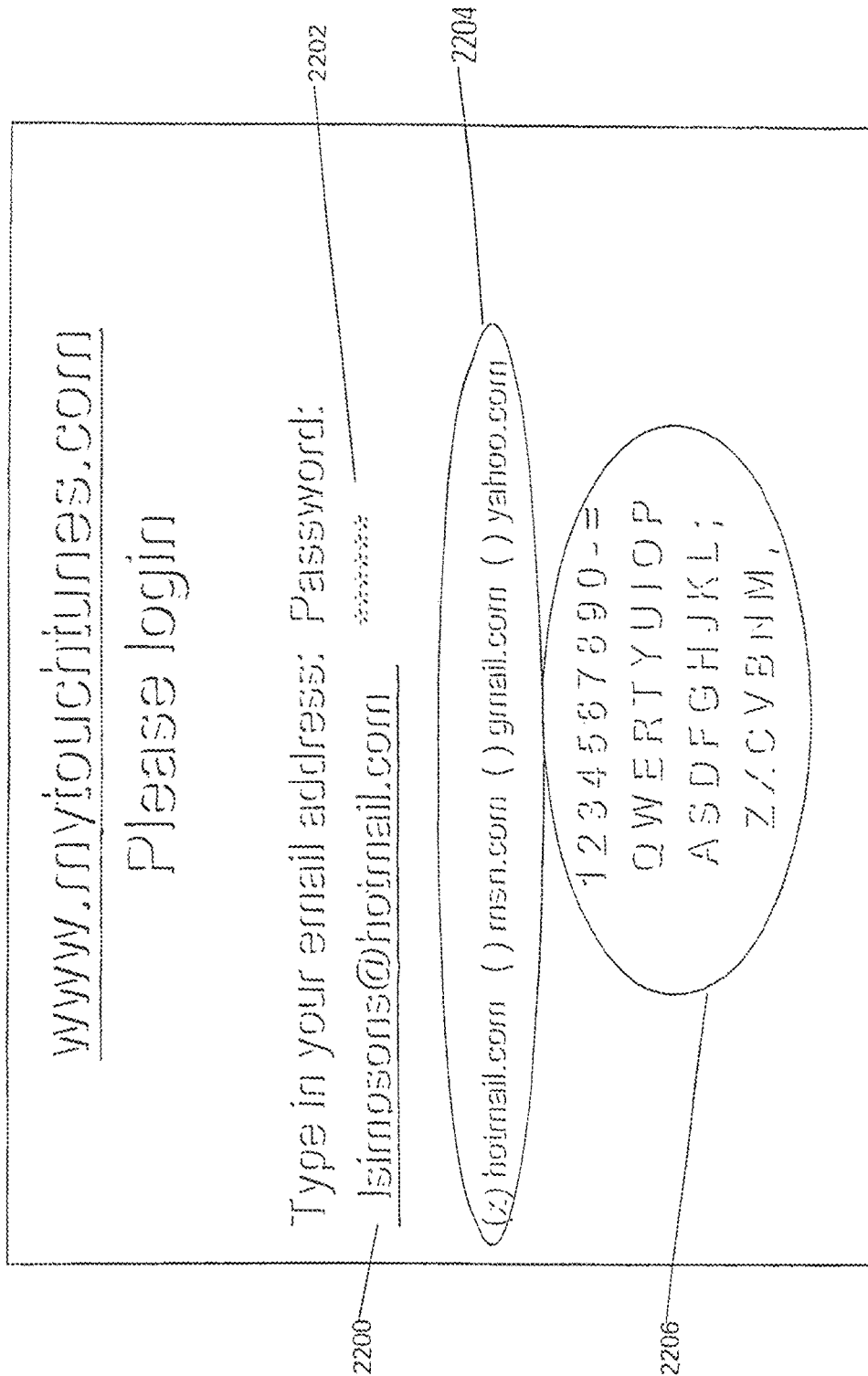
FIG. 22 is an exemplary screen shot of a login page in accordance with one exemplary embodiment.

FIG. 22 is an exemplary screen shot of a login page in accordance with one exemplary embodiment. A user may enter an e-mail address in username area 2200 and a password in password area 2202. As a shortcut, a user may select a common e-mail domain from domain list 2204. It is to be appreciated that although this embodiment requires an e-mail address and a password, other embodiments may require a username that need not be an e-mail address. Similarly, it is to be appreciated that a username and password may not be required, for example, on a home jukebox system, and that in yet further embodiments, only a username may be required. A user can use keyboard 2206 to enter the required information, though it is to be appreciated that other input devices, such as a keyboard attached to a home computer, may be used. It also is to be appreciated that the login screen shown in FIG. 22 may appear on an actual jukebox device, on a computer (e.g., through a web-interface, custom software, etc.), on a mobile device, etc.

Figure 23:
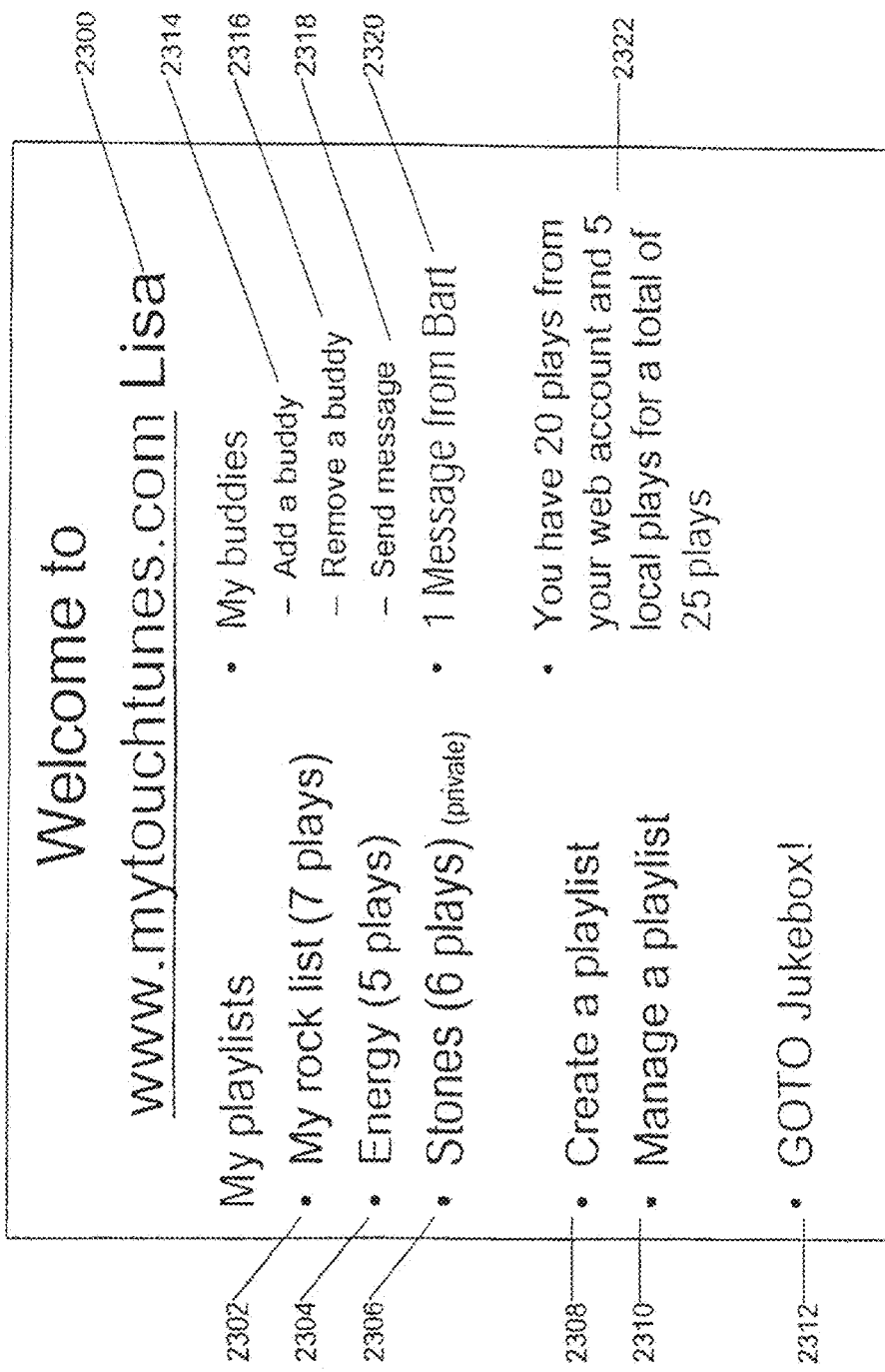
FIG. 23 is an exemplary screen shot showing the features available after a recognized user has logged in, in accordance with one exemplary embodiment.

Preferably, a successful log-on displays a main menu for users. FIG. 23 is an exemplary screen shot showing the features available after a recognized user has logged in, in accordance with one exemplary embodiment. A customized greeting (e.g., the user's name) is displayed in area 2300. Playlists 2302, 2304, and 2306 are displayed with descriptive names along with the number of credits required to play a full playlist. For example, to play playlist 2302 costs 7 plays. Preferably, playlists are presumed to be public, which allows other users to view them. Playlists may be designated private, however, as is, for example, playlist 2306. Users can create additional playlists by pressing playlist creator button 2308, and they can edit already existing playlists by pressing playlist manager button 2310. The playlist manager may allow users to, for example, change existing playlists by adding and/or removing songs, deleting playlists completely, etc.

Users can manage a buddy list by adding a buddy by pressing add buddy button 2314. Alternatively, they can remove a buddy by pressing remove buddy button 2316. Users also can communicate by sending messages to their buddies by pressing send message button 2318. This feature can, in certain embodiments, for example, send SMS messages to mobile devices, send e-mails, send messages to appear when the recipient user next logs-in, etc. In still other embodiments, users can, for example, use this feature to send songs, donate credits, etc. Indicator area 2320 shows that the current user has received one message, and it identifies the sender. In other embodiments, however, other information may be displayed, a more complete inbox (e.g., with folders, forwarding, etc.) may be provided, etc. Credit indicator area 2322 provides account status. In this embodiment, it indicates that the user has previously purchased 20 plays online, and has entered enough money in a local jukebox terminal for 5 additional plays, for a grand-total of 25 potential plays.

Another aspect of the instant invention relating to improvements in background music will now be described. The local server and Tune Central feature described herein, open up a whole new world for background music on a jukebox. Currently, when no paid for music is queued, jukeboxes may play background (ambiance) music with the help of an auxiliary system connected to the jukebox, such as DMX or satellite radio. Alternatively, if they play background music with their own music, they are limited to the songs available for play on the jukebox, typically about 2000 songs. These songs are also available for selection by jukebox patrons. Conventional digital jukeboxes are typically connected to a remote network through the internet for accessing extended music. These applications are therefore not well suited for providing background music services other than the music locally available as this would require constant download or streaming from the remote servers for the background music.

However, jukeboxes equipped with an external server or large music partition (such as Tune Central described herein) can select background music to play from that large pool of songs, even if the song is not available for play through the standard interface. This permits a vast musical variety for background music using jukeboxes. The background music selection can be made automatically by the jukebox randomly or with an advanced algorithm that selects music based on genres, themes, era or other criteria. Also, background music lists can be preprogrammed by a disk jockey or the like (background playlists) and sent from a central server to jukeboxes. Since music rights can differ for songs available in pay-per-play mode and background music, there is, in an embodiment of the invention, an indicator for each song or song aggregations (e.g., all songs from ABC record label) allowing the jukebox to distinguish between songs that can be played as background music (as opposed to normal jukebox play) based on the availability of the proper music rights, thereby enabling proper royalty accounting as well. In an embodiment of the invention, the jukebox offers advanced options for allowing an operator to configure how background music will be performed, based on genre, themes, indicators (flags), such as billboard hit, Christmas music, playlists (e.g., DJ John—summer 2005), etc. In another embodiment of the invention, the operator configures the jukebox to allow the bartender to further configure the background music mode through, for example, a remote control; much like the bartender would select a radio station in prior background music systems. This mode offers genres or theme based music or playlists for enhancing background music functionality. The operator can, for example, configure which genre, theme or playlists is available to the bartender. In addition, a remote control with programmable keys combined with suitable software can be provided to allow the bartender (or other person) to select (e.g., for a particular zone) a certain background music play list or TV audio input for special event like, for instance, a football game in a bar zone, thereby providing convenient and effective background music services and other services through the jukebox device.

Thus, similar to the background music services, "channels" of music may be provided. A proprietor of a location may select a channel to play. A list of channels may be defined by the location and/or defined by the content provider (e.g., the jukebox provider). In certain exemplary embodiments, channels may correspond to the themes or genres of music already provided to the jukebox (e.g., rap, rock, country, etc.). In addition or in the alternative, the proprietor of the location may group songs together to form custom channels for or at a particular location or group of locations, and/or shareable between many potentially unrelated or unassociated jukeboxes (e.g., as a sort of public channel). The thousands of songs provided to the jukebox may be played in a coherent grouping as background music, for example, through this channel feature. For example, a predetermined amount of time after no money has been inserted into the jukebox and/or after all songs in the queue have been played, a channel of music (e.g., selected by a proprietor, manager, etc.) may play. The channel may be activated in this illustrative case substantially free from direct user input, for example, so that the switching from normal jukebox operation to background mode is substantially transparent to the normal patrons and/or authorized users (e.g., managers, proprietors, etc.) of the jukebox. Of course, it will be appreciated that authorized users of the jukebox may also cause the jukebox to change from normal operation mode to a channel mode and vice versa, control the switching of channels, choose between channels, etc.

Numerous advantages are provided by this feature. For example, no auxiliary source of media is required to play instances of media provided to the jukebox, thereby reducing the need for, for example, satellite radio, broadcast radio, CD players, and/or other equipment (e.g., in addition to or in place of the jukebox), some of which may require additional costs in terms of hardware and in terms of monthly subscription fees. Rather, a jukebox channel may provide hundreds or even thousands of instances of media playable directly from the jukebox. In this way, numerous different channels of background music can be provided on the jukebox using the music stored in the jukebox or available on the network. The available channels can then be selected by an authorized person using, for example, the remote control provided with the jukebox. The various channels could also be displayed on the jukebox on request, so that a channel can be selected from the list.

Furthermore, unlike traditional broadcast and enhanced satellite radio channels, a jukebox patron may exercise control over the content of a particular channel by more than simply tuning to a new channel. For example, an authorized user (e.g., a proprietor, manager, etc.) may use a jukebox remote control to skip songs, replay songs, remove songs from the channel, add songs to the channel, etc. Currently, this functionality is not possible in connection with broadcast or satellite radio channels. The jukebox channel optionally may learn from this control behavior and, similar to a ratings system, may adapt the channel to more frequently play popular songs, less frequently play skipped songs, etc.

Still further, jukebox channels are not subject to the same kinds of physical problems associated with traditional broadcast and satellite radios. For example, whereas a satellite radio may be inoperable during bad weather conditions, a jukebox channel may function substantially independent of the outside conditions. Similarly, a jukebox channel is not subject to the same kinds of geographical restrictions associated with the antennas of traditional broadcast channels, in that, for example, a jukebox channel may be played wherever there is a jukebox. Indeed, a jukebox channel does not even require the presence of a persistent or establishable internet connection, although it will be appreciated the same may be advantageously used in connection with certain exemplary embodiments where it is desirable to having streaming media, updatable channels, etc.

Thus, certain exemplary embodiments provide systems and/or methods of operating a digital downloading jukebox. A plurality of channels is defined, with each said channel having a plurality of instances of media associated therewith. A channel is selected from the plurality of channels on the part of an authorized user. One or more patron uses of the jukebox is responded to in a first mode, with at least some of said uses including adding instances of media to a queue for play on the jukebox and playing said queued instances of media. When the jukebox is not responding to a patron request and/or playing a queued instance of media, the instances of media in the channel are played in a second mode. The first mode is different from the second mode, and the second mode is not directly controllable by a patron of the jukebox. In certain exemplary embodiment, the second mode may be a background music mode (e.g., such that the music is played at a lower volume, etc.).

In certain exemplary embodiments, the instances of media may be associated with channels by an authorized user and, in addition or in the alternative, the instances of media may be associated with channels according to a theme and/or genre (e.g., rap, rock, country, etc.) associated with each said instance of media.

A frequency an instance of media in a channel is played may be changed in dependence on one or more control codes received from the authorized user. The control codes may correspond to at least one of: skipping an instance of media being played by the channel, replaying an instance of media being or having just been played by the channel, and removing an instance of media from the channel.

Here, as elsewhere, any suitable combination of programmed logic circuitry (e.g., hardware, software, firmware, and/or any suitable combination thereof) may enable such functionality. Additionally, instructions for carrying out the same may be stored on any suitable computer-readable storage medium.

Figure 24:
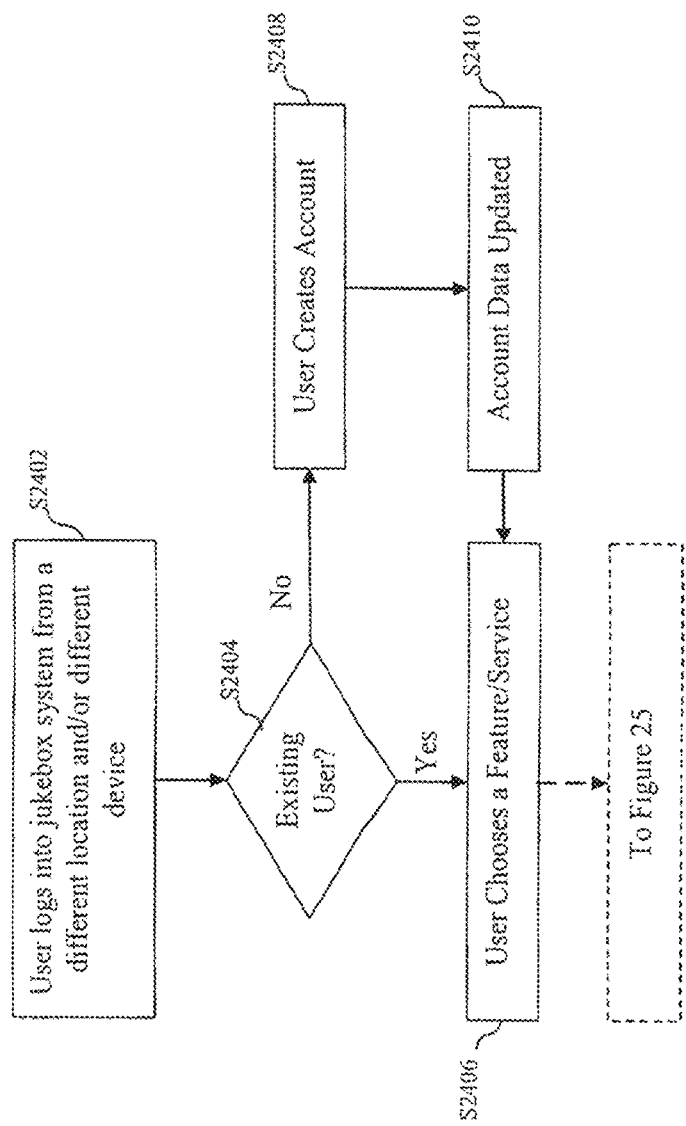
FIG. 24 is a flowchart showing an exemplary process for accessing a system remotely in one exemplary embodiment.

FIG. 24 is a flowchart showing an exemplary process for accessing a system remotely according one exemplary embodiment. In step S2402, a user logs into a jukebox system from a location and/or device different from a jukebox housed locally in a bar. In a preferred embodiment, the user will access the system through a web browser to gain access to an Internet portal. However, it will be appreciated that other mechanisms for accessing the system are possible, such as, for example, via a mobile device (e.g. a cell phone, PDA, etc.), a stand-alone application to be run on a remote computer, an appropriately configured jukebox, etc. Moreover, it will be appreciated that the features and/or services offered by the system may depend on the mechanism and/or device by which it is accessed. For example, some features may be available for an illustrative embodiment that uses a web browser on a personal computer that are not available over a cell phone, and vice versa. Keeping with this example, but still for non-limiting exemplary purposes only, although an illustrative embodiment that uses a web browser on a personal computer may have access to the full set of features and/or services (e.g. music downloads, participation in forums, chat rooms, etc.), an illustrative embodiment that uses a cell phone may only be able to download music and receive text messages. Of course, as various devices become more interconnected and more powerful, it will be appreciated that such distinctions may no longer hold.

Step S2404 determines whether the user is recognized by the system as an existing user. Users not recognized by the system preferably will be prompted to create an account, as in step S2408. Users may be required to supply, for example, their names, ages, e-mail addresses, etc. Preferably, users will be able to create profiles including, for example, a name and/or nickname, their age, their location, and an associated image. These profiles may be viewable by other users of the system. In some exemplary embodiments, users may be required to register and/or create profiles before participating in some features of the system, for example. Alternatively, in other exemplary embodiments, users may specify that they want their information, or portions thereof, to remain private. A non-limiting exemplary screen shot for editing account information is provided in FIG. 26C, and an accompanying description thereof is given below. After users create their account, preferably a central account database is updated in step S2410. In other exemplary embodiments, a central account database need not be maintained, and the account information may be stored elsewhere, such as, for example, on jukeboxes, on a user's own personal computer, etc.

Figure 25:
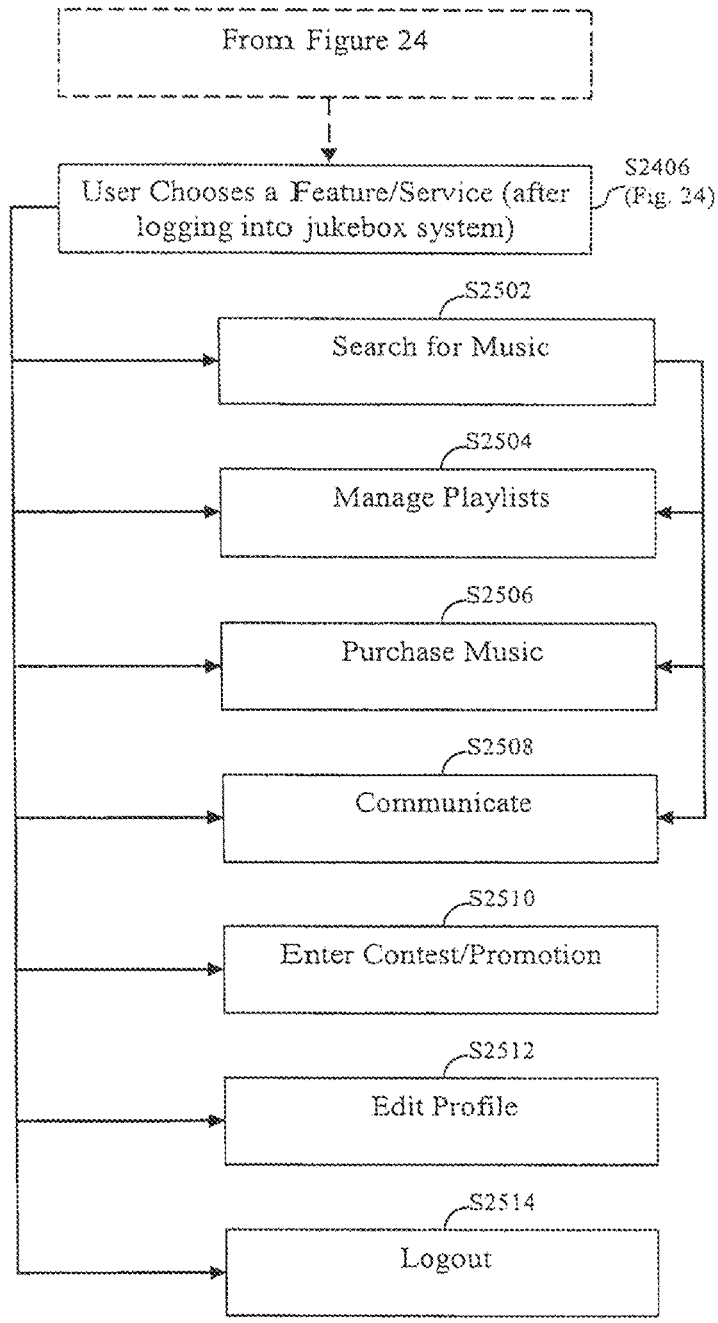
FIG. 25 is a flowchart showing an exemplary process for selecting one or more of a non-limiting list of services and/or features in a system according to one exemplary embodiment.
Figure 26A:
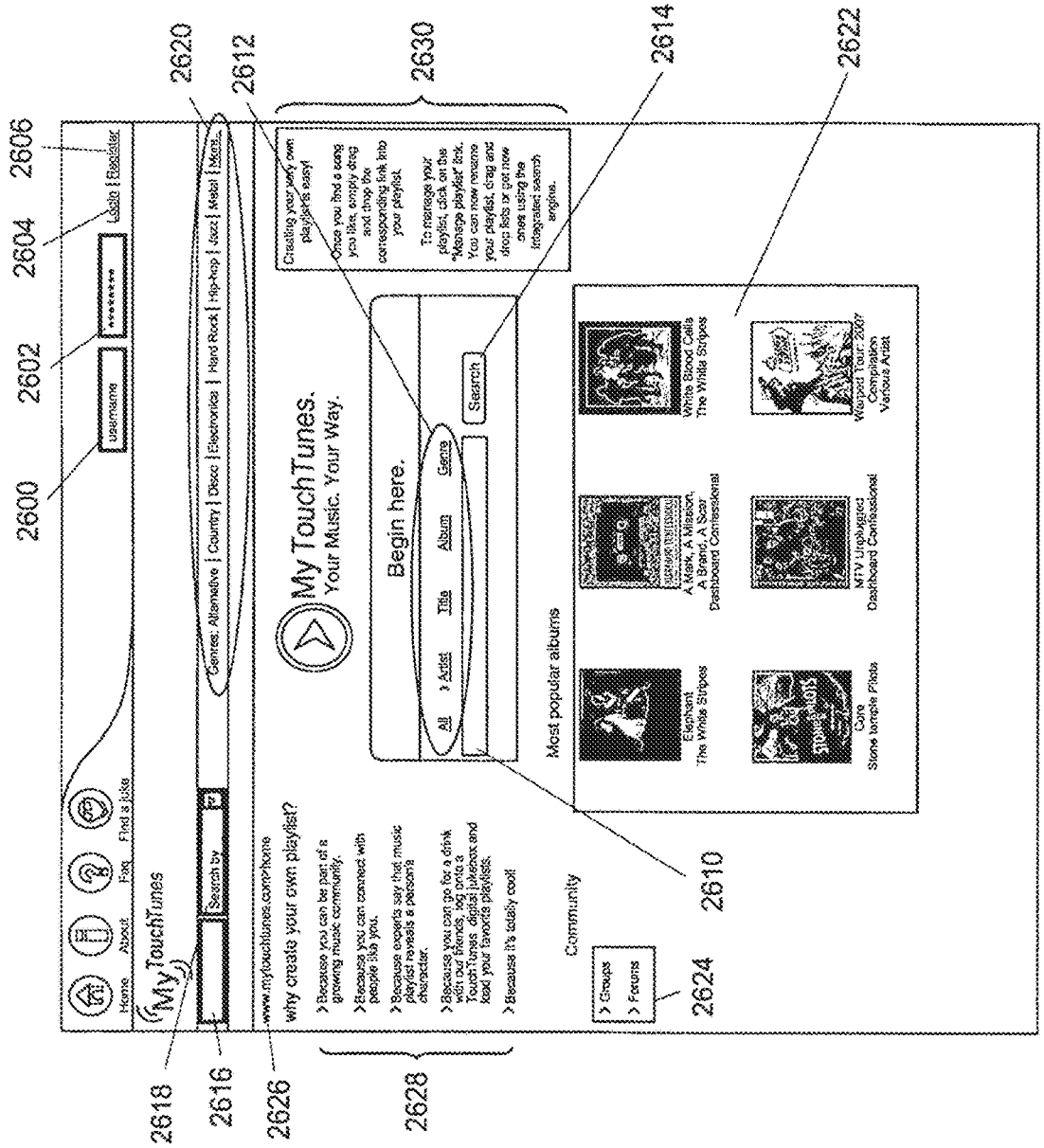
FIG. 26A is an exemplary screen shot showing the features available before a user logins into a system according to one exemplary embodiment.

If users are recognized in step S2404, they may chose a feature and/or service in step S2406, described in more detail in relation to FIGS. 25 and 26A. In some exemplary embodiments, users may have their access to the system limited by the service to which they subscribe. For example, in some example embodiments, users may have free and unlimited access to the online system from personal computers, but may have to pay premiums to access the services via PDAs. Thus, in a step not shown, even if an existing user is recognized, if they attempt to access the system in an unauthorized way, they will not be permitted to access the system. This feature may, in some exemplary embodiments, also may block unauthorized access by users, registered or unregistered, who attempt to inappropriately access the system and/or its underlying code, songs, etc.

FIG. 25 is a flowchart showing an exemplary process for selecting one or more of a non-limiting list of services and/or features in a system according to one exemplary embodiment. Other features and/or services in addition to, and in combination with, those described below are possible and contemplated herein. FIG. 25 begins with step S2406 as discussed above in connection with FIG. 24. It will be appreciated that in a preferred embodiment, the steps described below need not be selected in any specific order. For example, a user need not search for music before communicating with other users. It also will be appreciated that the steps described below may, in some exemplary embodiments, be performed alone or in combination. For example, a user may wish to search for music before communicating with other users.

In step S2502, a user may search for music. Preferably, a user may specify search fields, alone or in combination, such as, for example, artist, song, album, genre, etc. An exemplary screen shot showing the results of a search is provided in FIG. 26E and is discussed below. After searching for music, a user may then, for example, add the found songs to a playlist, purchase the songs, or recommend the songs to others. For example, a typical use might include a user remembering a catchy song at a bar but only remembering that it was a reggae song that had something to do with "Zion" from Damien Marley's latest album. Accordingly, a user might, in step S2502, search with the following parameters: artist, "Damien Marley"; song, "Zion" and genre, "reggae." After the search is performed, the user would be able to select "Road to Zion" from a results list. After finding the song, the user might add it to a playlist for convenience the next time the user visits a bar, and the user might recommend the songs to friends. A user might also purchase the single and/or download a digital copy. A particularly bold user might order the entire "Welcome to Jamrock" album.

In step S2504, a user may manage the user's playlists. An exemplary screen shot showing how a user might manage playlists is provided in FIG. 26D and is discussed below. Briefly, a user may, for example, create a new playlist, delete an existing playlist, and/or edit an existing playlist. In a preferred embodiment, a user might also share a playlist, for example, with friends or the public, and a user might also search for publicly available playlists. Preferably, a playlist will have a unique name (e.g. "Joe's All-Time Favorites," "Ghetto Grooves," "Maximum Chill-Out," etc.), and, preferably, a playlist will have a plurality of songs associated therewith. It will be appreciated that a playlist might contain only one song. Additionally, it will be appreciated that in some embodiments users, professional DJs, or others may create and sell playlists, and that users could pay for and download such playlists through the system.

A user may purchase music in step S2506. In one exemplary embodiment, a user may order a single song, a plurality of songs, an entire album, or multiple albums. In some exemplary embodiments, a user may have his order shipped, while in other exemplary embodiments licensed digital copies may be made available. In still other exemplary embodiments, it may be possible to purchase music and download it directly to a media playback device (e.g. an appropriately configured PDA, cell phone, or the like).

Preferably, a user could communicate with others via e-mail and/or text messages in step S2508. Step S2508 preferably also will allow users to participate in online forums and live chat rooms. Messages sent through this step may be delivered to conventional e-mail inboxes, cell phones, etc. Additionally, messages may be displayed on jukeboxes, for example, when recipient users initially log-in, when messages are sent and/or received, etc. It will be appreciated that online forums and chat rooms may use protocols, such as, for example, newsgroups, Network News Transfer Protocol (NNTP), Usenet, Internet Relay Chat (IRC), etc., or they may use custom protocols.

From time-to-time, proprietors or the managers of the system may sponsor contests, promotions, or giveaways. Users may participate in such activities through step S2510. For example, a proprietor might allow anyone who prints a coupon to avoid a cover charge. As another example, there might be a competition for the best playlist. It will be appreciated that these example promotions are for illustrative purposes only, and that other contests, promotions, giveaways, or the like may be possible.

In step S2512, a user may edit that user's profile. The discussions of step S2408 from FIG. 24 above and FIG. 26C below provide additional detail on the type of information preferably associated with a user profile. A user may logout of the system in step S2514. In some exemplary embodiments, a user may be logged out of the system automatically after a predefined period of inactivity.

FIGS. 26A through 26E, which provide sample screen shots, are for exemplary, illustrative purposes only. The specific fields, buttons, graphics, etc. and locations of the same are in no way intended to be limiting. On the contrary, FIGS. 26A through 26E present only one preferred embodiment of the instant invention. It will be appreciated that other arrangements and combinations are possible, and those arrangements and combinations are contemplated herein. It also will be appreciated that a user may navigate through the following screens in any number of ways, and the use of the term "press" indicates only one such implementation. For example, a user may navigate the screens with a mouse, keyboard, touch screen, stylus pen, etc. Preferably, the user interface will be very smooth and streamlined with a limited amount of advertising or other non-core material. Accordingly, when advertisements, surveys, and the like are accessible through the user interface, they preferably will be linked to jukebox functions and or perks tied to their links. For example, an advertiser may reward users clicking on one of its advertisements with credits, free plays, entries in competitions, etc. Similar rewards may be given to users participating in surveys.

FIG. 26A is an exemplary screen shot showing the features available before a user logins into a system according one exemplary embodiment. A user will log into the system by entering a username and password into username field 2600 and password field 2602, respectively, and then pressing login button 2604. Alternatively, an unregistered user may create an account by pressing register button 2606. Navigation buttons 2608 help the user navigate the system quickly. In this exemplary embodiment, navigation buttons 2608 include a home button, an about button, a FAQ button, and a Find a juke button. The home button returns the user to an introductory screen. The about button preferably displays information about the system, including, for example, help documentation, terms and conditions of use, etc. The FAQ button preferably provides information complementary to that given by the about button and is customized to provide information regarding the most frequently asked questions about the system and its associated services and features.

The Find a juke button preferably enables a user to search for a location with a jukebox. Users may, for example, search for locations near a certain address, in a particular city to which the user may be traveling, locations that offer special features (e.g. drink specials, guest DJs, etc.), locations likely to play music the user likes (e.g. a bar with line dancing might be appropriate for a country music fan, etc.), etc. Social networks also may be built based on postal codes, schools (e.g. high schools, colleges, universities, etc), etc. In a preferred embodiment, when a user finds a specific location, the user may have custom information, for example, directions, custom maps, hours of operation, parking information, etc. displayed. It will be appreciated that because jukeboxes located at many locations preferably are connected to the system and that users' playlists preferably are accessible by the system, users may receive recommendations likely to fit their tastes. For example, the system might suggest a specific bar to users of a certain age in the same town who are known to like a specific type of music. In certain example embodiments, the jukebox can recommend that users form certain connections. These suggested connections between patrons (and thus potential "buddies") preferably may be based on information known to the jukebox though not necessarily known to other users. Such information can include, for example, venues frequented, musical tastes, ages, etc. In certain example embodiments, therefore, users may be connected based on where they go, not necessarily where they are from.

Similarly, a jukebox locator service may be provided, and it may exist on a jukebox, via a webpage, through the MyTouchTunes web and/or jukebox interface(s), etc. The jukebox locator service may receive user input and search accordingly. For example, a user may specify an address or portion thereof (e.g., city, state, and/or zip code), may search by name or keyword, or may search for specially enabled jukeboxes. A map may be displayed, with each matching location being highlighted. Additional information may be displayed for a given location. Such additional information may include, for example, the name and address of the location and/or any other details about the location. For example, the songs most frequently played may be displayed, as may be certain promotional offerings, DJs being present, etc.

Additional search criteria may be entered initially or to refine a search. Such additional search criteria may include the user's age, musical tastes, preferred theme (e.g., Irish bar, country line dancing, etc.), etc. Alternatively, the jukebox locator service may conduct a basic search using only the criteria entered by the user and may then highlight recommended locations based on, for example, information already known about the user, such as, for example, the above-mentioned additional search criteria.

Figure 26B:
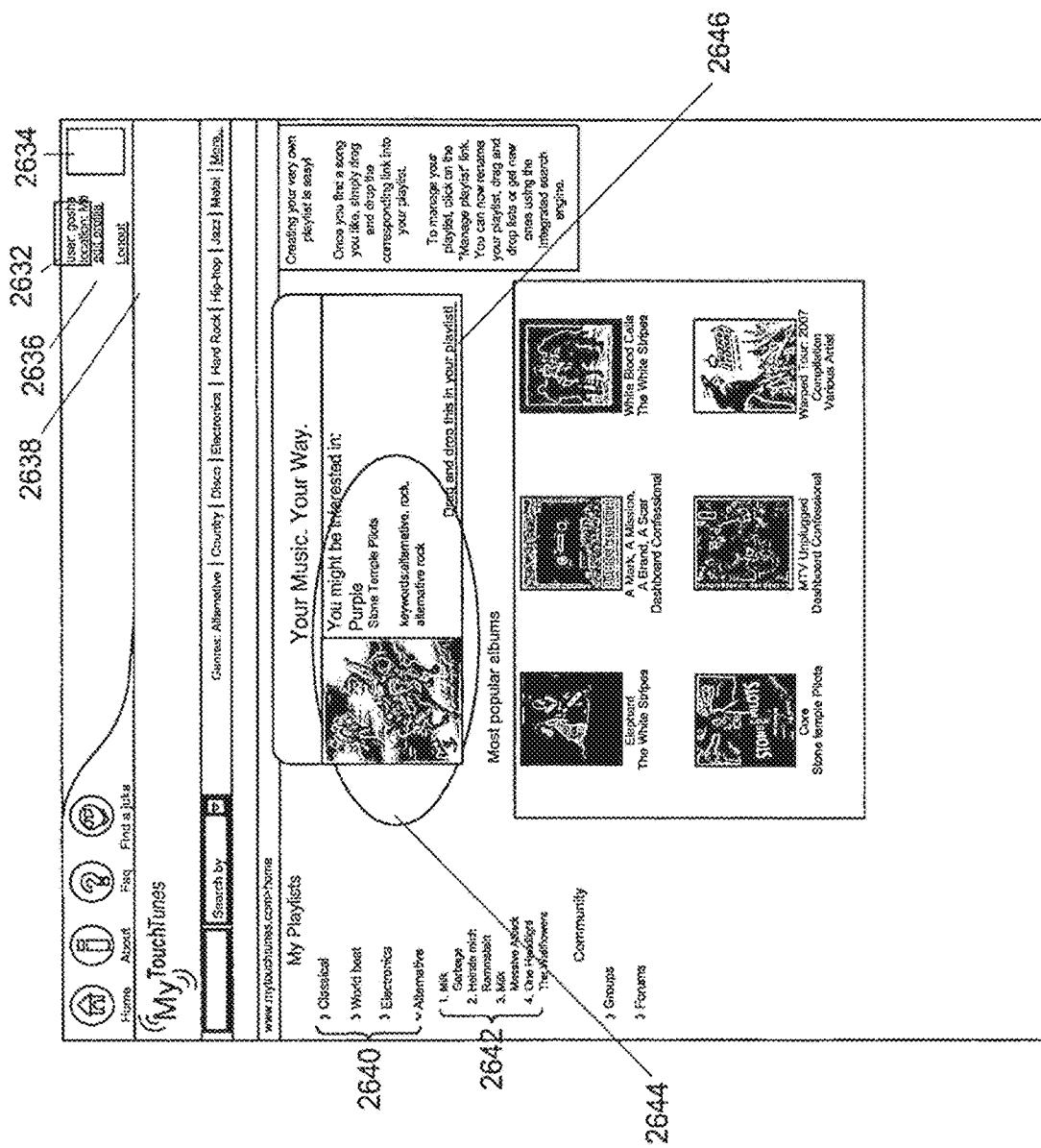
FIG. 26B is an exemplary screen shot showing the features available after a user logins into a system according to one exemplary embodiment.
Figure 26C:
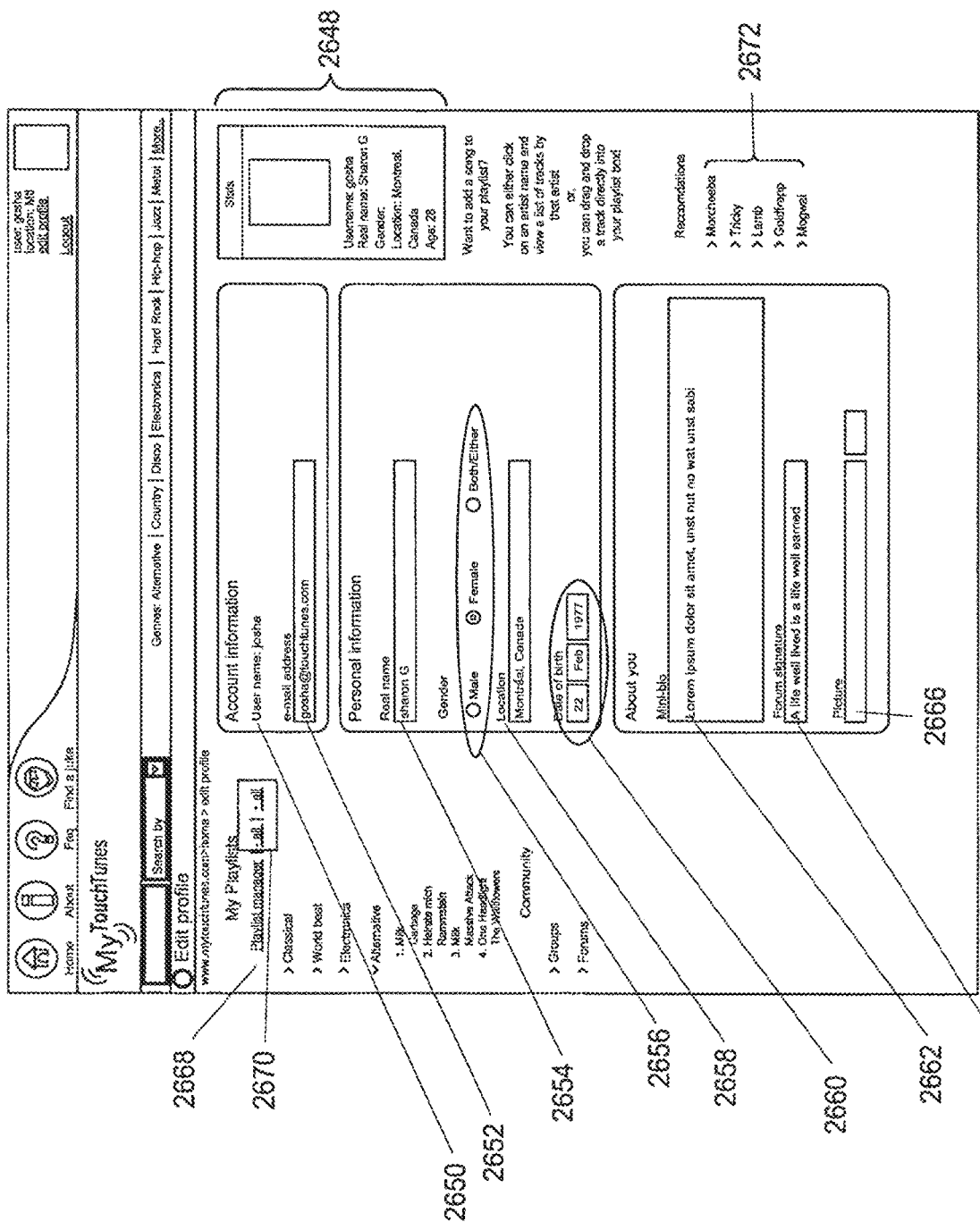
FIG. 26C is an exemplary screen shot showing how a user might update account information.
Figure 26D:
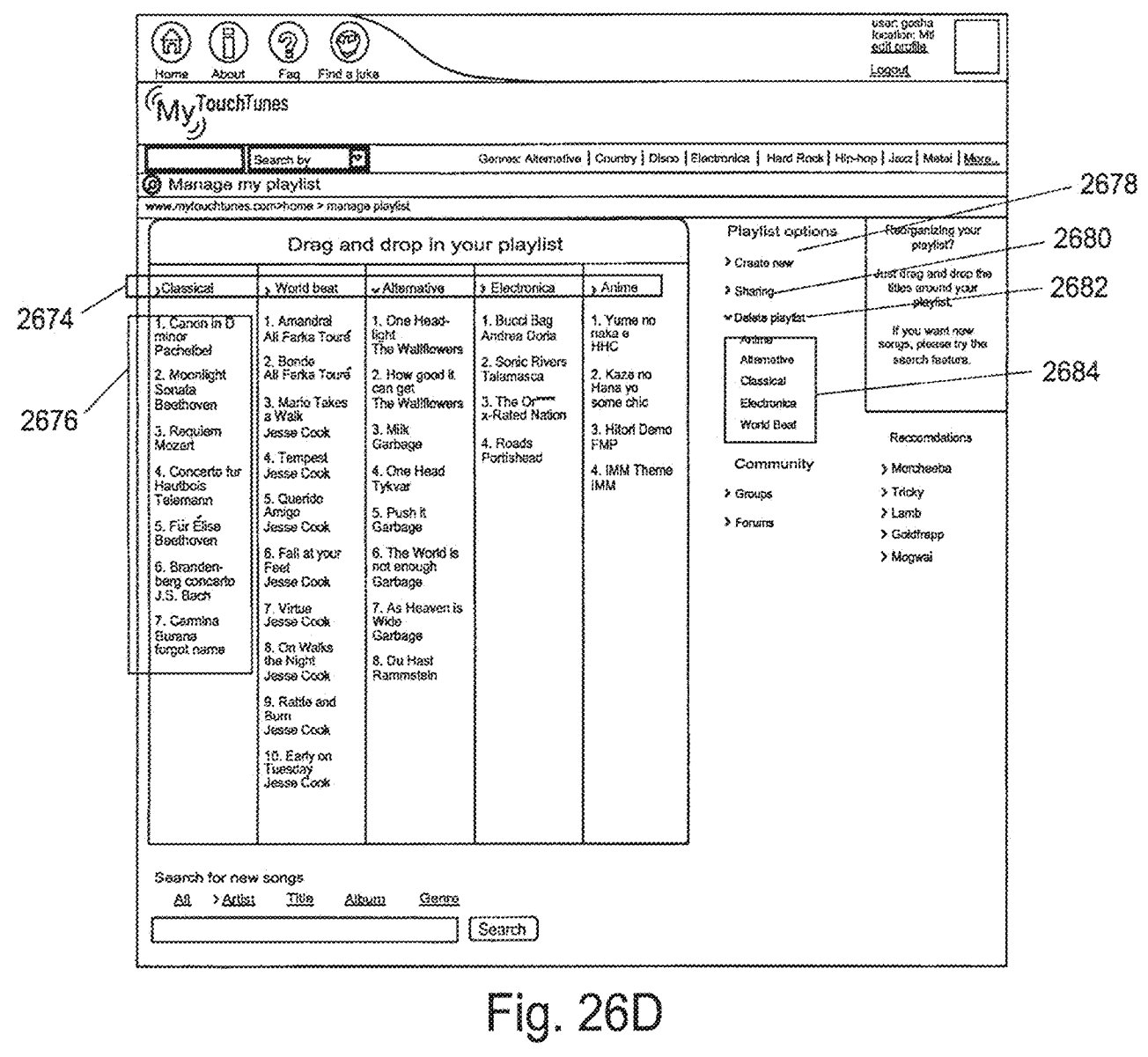
Figure 26E:
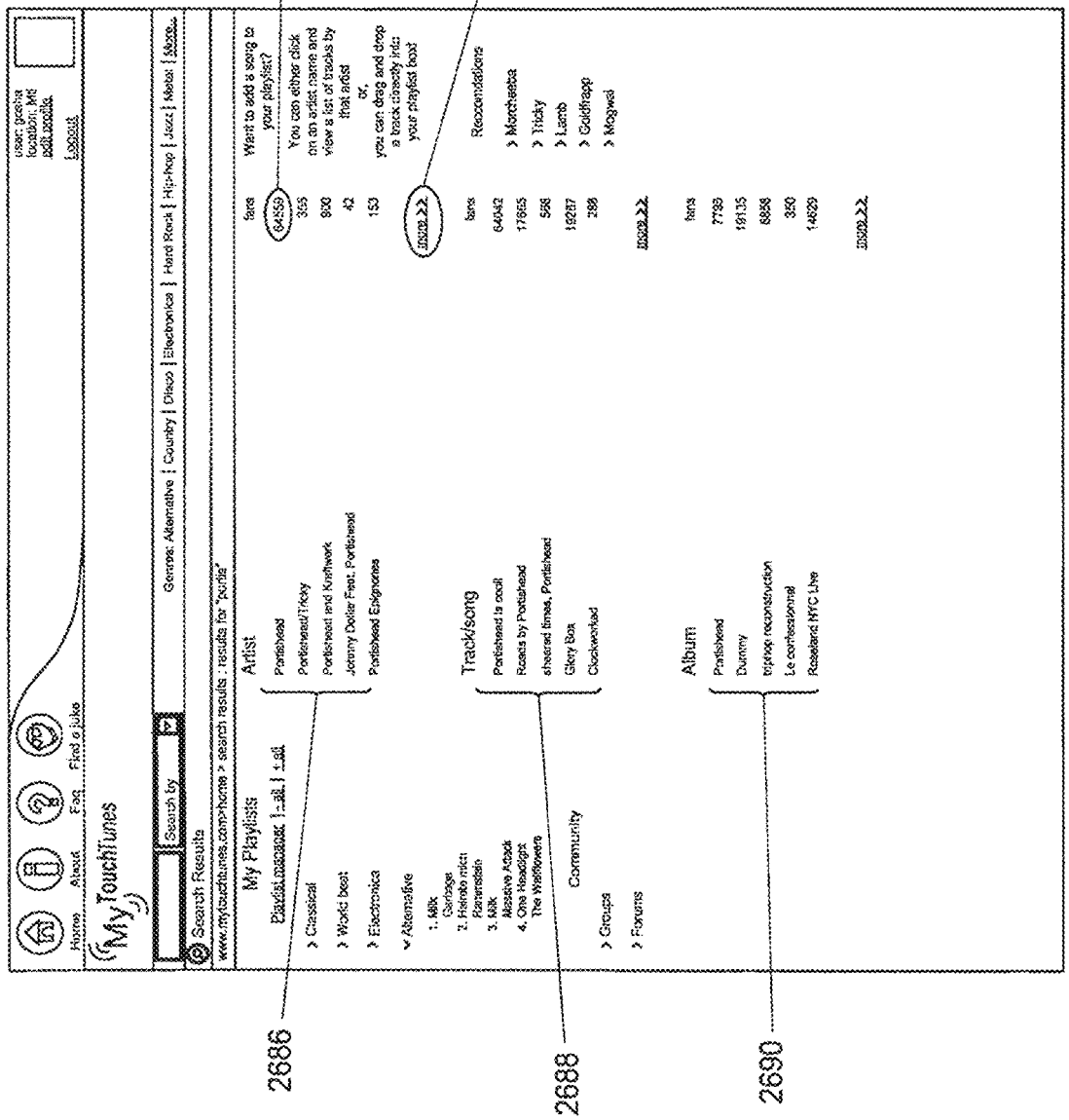
FIG. 26E is an exemplary screen shot showing the results of an illustrative search for music.
Figure 26F:
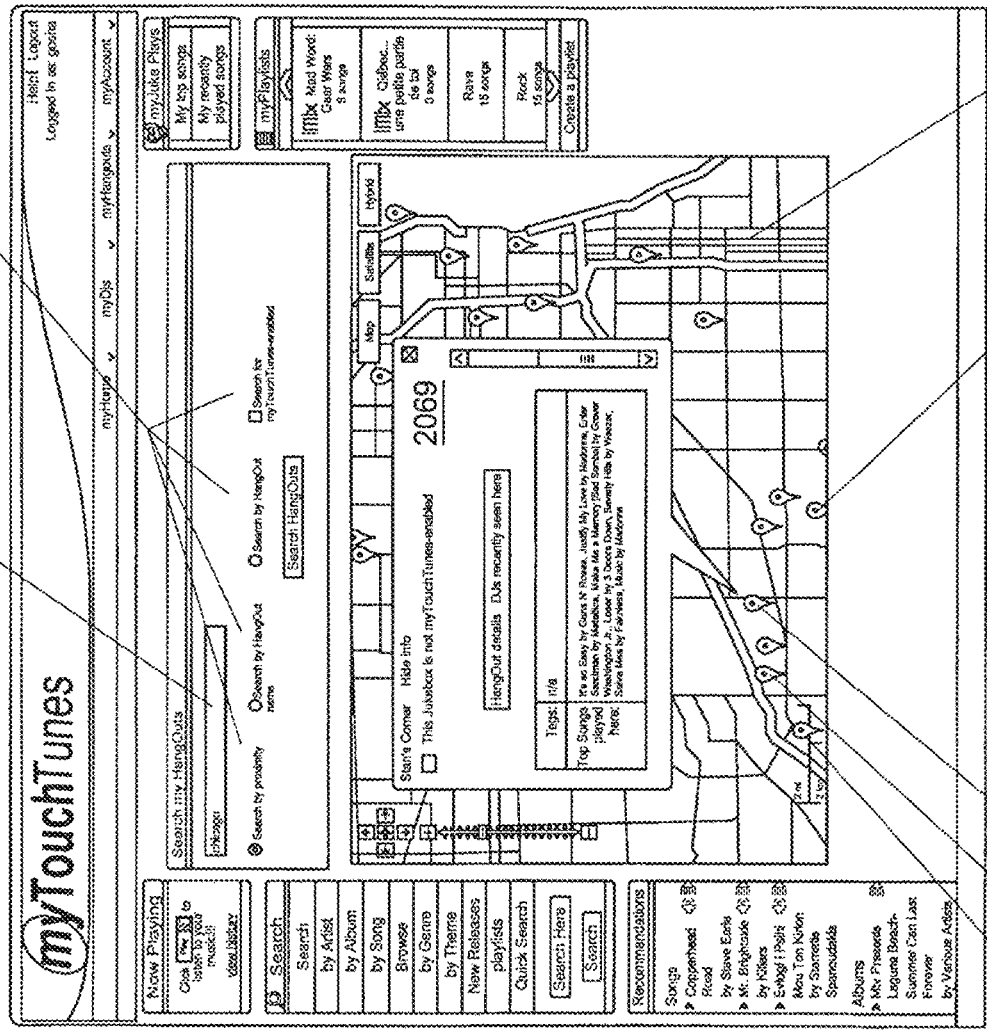
FIG. 26D is an exemplary screen shot showing how a user might manage playlists.

FIG. 26F is an exemplary screenshot showing the results of a search with a jukebox locator service. In FIG. 26F, search criteria may be entered in search block 2601. The search may be restricted using the exemplary search criteria 2603a-d. A map 2605 of the area may be displayed, with matching locations 2607 being flagged or otherwise distinguished. A user may select a flag. In this example, when flag 2607' is selected, information block 2609 including information pertaining to the selected location is displayed. As noted above, information block 2609 may present the above-noted or other information pertaining to the location.

Users may enter search terms in search field 2610. Additionally, users may further limit their searches by searching only in one of the categories listed in search parameters list 2612. It will be appreciated that the fields of search parameters 2612 are for illustrative purposes only—other fields may be present in addition to, or in place of, those listed, such as, for example, year, popularity, etc. A user may conduct the search by pressing search button 2614. Users may alternatively search by filling in search field 2616 and selecting a search parameter from the list of search parameters in search parameters dropdown list 2618. The results of a search may be displayed according to FIG. 26E, discussed below.

A non-limiting exemplary list of genres is given in genre list 2620. It will be appreciated that other genres may be present in genre list 2620, and it also will be appreciated that, in this exemplary embodiment, additional genres may be accessed by clicking the "More . . . " button in genre list 2620. A user pressing a specific genre may receive content tailored to that genre. For example, pressing the "Alternative" genre may, for example, present a list of the most popular alternative albums, a list of forums dedicated to the discussion of alternative music, etc.

Most popular albums list 2622 contains information related to the most popular albums and preferably displays the album cover, the artist name, and the name of the album. Most popular album list 2622 may be generated in any number of ways. For example, Most popular album list 2622 may be based on preferences of users of the system, commercial data regarding album sales, album sales within a particular geographic segment, etc. Preferably, most popular album list 2622 may be changed depending on the genre selected from genre list 2620.

Users may access community-specific content by selecting a specific communications method from communications methods 2624. In this exemplary embodiment, users may communicate in groups and/or forums. It will be appreciated that participation in groups and/or forums may require registration, and that groups and/or forums may be designated public or private. Preferably, groups will comprise users, for example, with similar interests, in near locations, etc. For example, there may be a group for so-called "Dead Heads" to allow them to plan meet-up points, transportation, etc. for upcoming tours of the Grateful Dead. Forums may function similarly, though they preferably will be more static, allowing threaded messages between users.

Breadcrumbs trail 2626 provides a convenient way for navigating through the system. Specifically, breadcrumbs trail 2626 traces the path a user takes in accessing a certain page. Pressing a specific part of breadcrumb from breadcrumbs trail 2626 preferably takes the user to a corresponding location.

Information area 2628 and information area 2630 may be customized to provide additional information to the users. In this exemplary embodiment, information area 2628 suggests reasons for using specific features (here, creating custom playlists), and information area 2630 provides useful tips (here, relating to how to create a custom playlist). It will be appreciated that information areas 2628 and 2630 may change depending on, for example, the user, the time of access, the number of times a user has accessed a given page, etc. Furthermore, it will be appreciated that information areas 2628 and 2630 may contain different information not related to use of the system, such as, for example, advertisements, promotions, etc.

FIG. 26B is an exemplary screen shot showing the features available after a user logins into a system according to one exemplary embodiment. Based on the user's profile information, user information 2632 and user icon 2634 may be displayed. In this exemplary embodiment, user information 2632 comprises a username and a location, and user icon 2634 is a solid square. It will be appreciated that additional and/or alternate information may be displayed, and it also will be appreciated that only information provided by users may be displayed. Users may edit their profile, including user information 2632 and user icon 2634 by pressing edit profile button 2636. Users may log out of the system by pressing logout button 2638. In some exemplary embodiments, users may be logged out automatically after a predefined period of inactivity has elapsed.

User playlists 2640 displays the playlists the user has created and/or imported. It will be appreciated that user playlists 2640 will be empty if a user has not created or imported any playlists. Preferably, the exemplary embodiment will display the unique name specified by the user for each of the playlists. Users may expand one or more specific playlists from user playlists 2640 to show the songs associated with the playlist. In the example shown in FIG. 26B, the "Alternative" playlist is expanded, and four songs 2642 are shown as being associated with the "Alternative" playlist. It will be appreciated that users may expand multiple playlists, and/or collapse lists after they are expanded.

Preferably, the system will display at least one recommendation 2644. The recommendation preferably will include an album cover, a song name, artist information, and keywords associated therewith. The recommendation preferably will be generated automatically, and may be based on a variety of data. The data for generating a recommendation may include, for example, user demographic data (e.g. age, gender, race, etc.), the number and types of songs in the user's playlists, songs the user has purchased through the system, popular songs, etc. Preferably, the system will allow the user to quickly add the recommended song to a playlist by pressing add button 2646.

FIG. 26C is an exemplary screen shot showing how a user might update account information. Stats box 2648 displays basic information that will be publicly available. In this exemplary embodiment, it includes a username, real name, gender, location, and age. However, it will be appreciated that other embodiments may require additional and/or alternate information. It also will be appreciated that users may elect to keep some information (e.g. real name, age, etc.) private.

The username selected in the initial account setup is displayed as username field 2670. Preferably, a user will not be able to change username field 2670 after initial setup, and, preferably, each username will be unique. The user may enter an e-mail address in e-mail address field 2652. In a preferred embodiment, the system will send important e-mails (e.g. terms and conditions information, notices of giveaways, bills, etc.) to this e-mail address. A real name may be specified in name field 2654. Although this exemplary embodiment shows name field 2654 as a single field, it will be appreciated that multiple fields may instead capture the same information (e.g. fields for first and last names; first, middle, and last names; etc.). A user may choose a gender from gender options 2656.

A location may be specified in location field 2658. Although this exemplary embodiment shows location field 2658 as a single field, it will be appreciated that multiple fields may instead capture the same or additional information (e.g. fields for city and state; city, state, and zip code; city, province, and country; etc.). A date of birth may be specified in date of birth field 2660. Although this exemplary embodiment shows date of birth field 2660 as three fields, it will be appreciated that a single field or multiple fields in a different order may instead capture the same or additional information (e.g. one field for month, date, and year; month and year only; month, date, and year; etc.).

A user may enter personal or other information in free-form biography field 2662. Additionally, a user may specify a signature line or tag line in forum signature field 2662. Preferably, the system would automatically append the contents of forum signature field 2662 to users' posts to groups and/or forums. A user may upload a picture or icon by entering a file location in picture field 2666. Preferably, this picture would be displayed on login and/or when a user posts a message to a group or forum.

In a preferred embodiment, required fields may be, for example, marked with an asterisk (*), highlighted, or otherwise designated. In other embodiments, a user may additionally store purchase information, such as, for example, credit card information, billing and shipping addresses, etc. This information could be used, for example, if users decide to order or download songs, albums, or other merchandise, to automatically debit an account so that users could "play now and pay later" while using jukeboxes in bars and/or clubs, etc.

Playlist manager button 2668 provides quick access to the playlist manager form, discussed in more detail below in connection with FIG. 26D. Collapse and expand buttons 2670 allow a user to quickly change the playlist information showing on the far left of the display in this exemplary embodiment. Recommendations 2672 preferably are generated in the manner described above, and clicking one or more recommendation preferably allows a user to associate them with their own playlists quickly and easily.

FIG. 26D is an exemplary screen shot showing how a user might manage playlists. In this exemplary embodiment, a user's custom playlists are displayed horizontally (as playlist labels 2674), and their respective contents are displayed underneath the appropriate headings (as playlist contents 2676). It will be appreciated, of course, that alternate arrangements are possible. Preferably, each playlist has a unique description associated therewith, and each entry in the playlist displays the number of the song in the playlist, the name of the song, and the artist. Users preferably may edit playlists by "dragging" and "dropping" songs into and/or out of a playlist. Users may use the search function to add a specific song. In some embodiments, removing all of the songs from a given playlist cause the user to be notified that the playlist is empty, and asks the user whether the playlist should be deleted.

A user may create a new playlist by pressing create new playlist button 2678. Preferably, the user will be prompted to enter a unique name for the new playlist. Then the user may edit the playlist in the above-described manner. Users also may share playlists by pressing sharing button 2680. Sharing button 2680 allows users to designate their playlists as public to allow other users to retrieve their contents, preferably allowing users to drag and drop selected playlists into categories, such as, for example, public, private, etc. Correspondingly, users may search for playlists created by other users, prepared by DJs, etc. and then copy and/or import the playlist. Users may delete playlists by pressing delete playlist button 2682 to display list of playlists 2684 and then selecting the playlist to delete from the list of playlists 2684.

FIG. 26E is an exemplary screen shot showing the results of an illustrative search for music. In this exemplary embodiment, a hypothetical user searched for "portis*", where the asterisk (*) indicates a wildcard. Preferably, search results will be grouped by artist (artist list 2686), track/song (track/song list 2688), and/or album (album list 2690). Preferably, each result within a grouping may have a rank 2692 associated therewith. This rank may be based on, for example, the number of users with the artist/track/album in a playlist, the current position on the Billboard (or other) charts, all-time sales, etc. Additionally, in a preferred embodiment, users may be able to sort the results within a category alphabetically or by rank to facilitate the location of a specific result. Because users' attention spans are finite and because of space limitations, the output of the search preferably will be limited to a few (preferably at least five and preferably no more than ten) results, while more button 2694 will allow the user to browse an expanded list.

Figure 27:
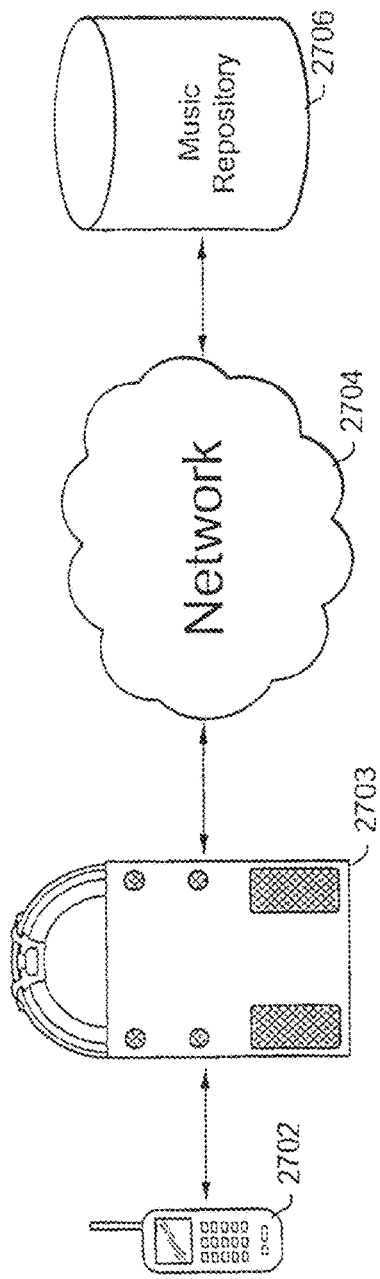
FIG. 27 shows an exemplary system for downloading music to a mobile device.

FIG. 27 shows an exemplary system for downloading music to a mobile device. A user indicates via mobile device 2702 that the user is interested in downloading a song or songs after logging into jukebox 2703. It will be appreciated that many types of mobile devices 2702 may communicate with jukebox 2703 over many different communications networks. For example, an appropriately configured cell phone may communicate over the data channel of a cell network, a PDA may communicate over standard TCP/IP, etc. Jukebox 2703 communicates over a network 2704 to interface with music repository 2706. Preferably, music repository 2706 will contain a broad range of potential downloads. For some requests, it may be necessary to confirm the download if, for example, there are multiple possible version of a song (e.g. Van Morrison and Jimmy Buffett both have versions of "Brown Eyed Girl," etc.), or for confirmation purposes. After music repository 2706 receives a request, it will select the appropriate song (or songs) and send it back through network 2704 to mobile device 2702.

Although not reflected in FIG. 27, alternate embodiments may send an appropriate song to another designated device. For example, a user at a bar might hear a song and want it to be sent to his home computer. Users in a car might want the song to be available the next time they visit a particular bar, and thus, for example, the song may be downloaded to a remote jukebox. In some exemplary embodiments, appropriate song 2708 may be sent through a different communications network, as appropriate.

Users may be billed according to billing information they inputted. For example, a stored credit card may be charged whenever a song is downloaded via the jukebox interface. As another example, a user may setup a special jukebox-specific account, linked to, for example, a Pay-Pal account. In a related aspect, users may use their cell phones (or other suitable portable devices) to purchase media, register with the jukebox, etc. by exchanging codes (e.g. via SMS messages) with the jukebox. For example, a user may first identify himself or herself with the jukebox (e.g. may login on the jukebox or remotely through a mobile device). Depending on whether the user's cell phone number (or e-mail address, etc., depending on the implementation), the user may have to enter the appropriate information. An SMS (or appropriately similar) authorization message and/or code may be sent to the user. The user may then enter that code on the jukebox to begin purchasing music, creating personalized content, accessing features available to recognized users, etc. This method of communication also may in some example embodiments enable users to pre-verify and/or pre-pay for music purchases remotely.

Figure 28:
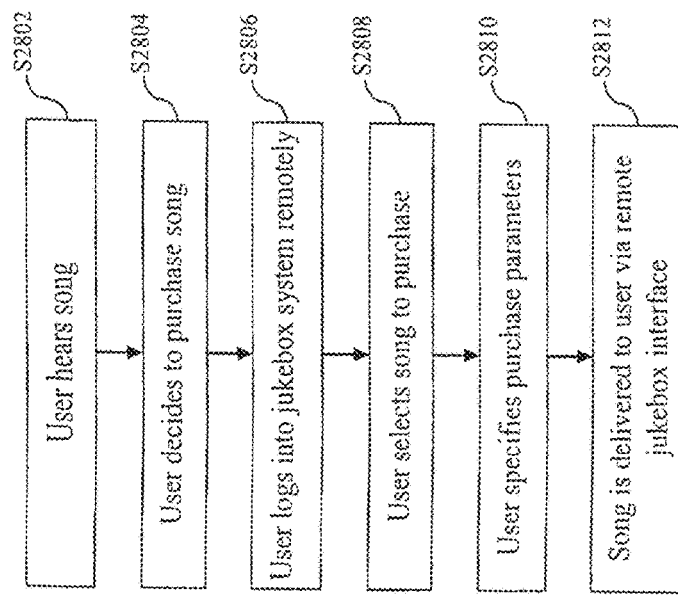
FIG. 28 is a flowchart showing an exemplary process for retrieving music.

FIG. 28 is a flowchart showing an exemplary process for retrieving music. A user might hear a song being played, for example, at a bar, in a club, on the radio, etc., as in step S2802. A user typically decides to purchase a song in step S2804 after hearing it. However, it will be appreciated that a user might choose to download a song without hearing it because, for example, the user's friends recommended it, the user downloads all of the songs by a particular artist, etc.

Using a mobile device, the user logs into the jukebox system in step S2806 and selects the song to purchase in step S2808. The use of a mobile device allows for quick and convenient "impulse" purchases. In some embodiments, the choice of what song to purchase might be automated, for example, by selecting the song currently playing at a given location, the song currently playing on a certain radio station, the song just played at a given location, etc. The user may specify purchase parameters in step S2810, such as, for example, how to pay for the song, the device to which it should be downloaded, etc. In step S2812, the song is delivered to the user via the jukebox interface. It will be appreciated that the song may be delivered to other devices, such as, for example, a particular jukebox, a portable media device, a laptop, a home computer, etc.

Figure 29:
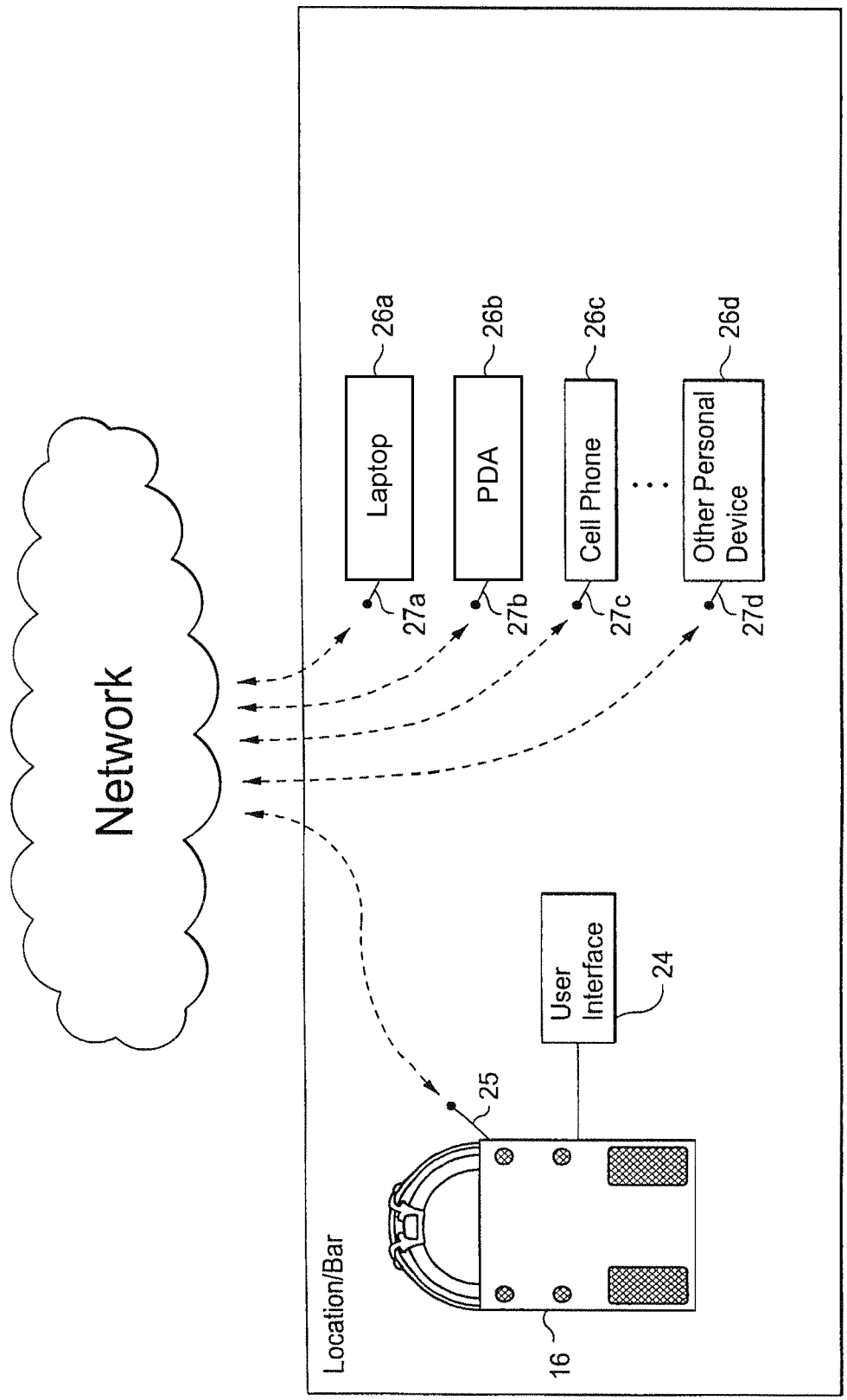
FIG. 29 is a block diagram of an improved downloading digital jukebox system with remote devices accessing a jukebox from within a particular location.

FIG. 29 is a block diagram of an improved downloading digital jukebox system with remote devices accessing a jukebox from within a particular location. A jukebox 16 is located within a particular location, bar, or the like. Users may access jukebox 16 through user interface 24 running thereon. However, users also may access jukebox 16 remotely. Thus, a plurality of mobile devices 26a-26d are shown located in the particular location. Mobile devices 26a-26d are, respectively, a laptop, a PDA, a cell phone, and other personal devices, though it will be appreciated that other properly configured devices may be used. Each mobile device 26a-26d is equipped with a wireless transmitter 27a-27d, respectively. Mobile devices 26a-26d preferably allow registered users to effectively logon to jukebox devices and access specific content, such as, for example, customized playlists, personalized screens, messages from other recognized users, etc. Preferably, a change made by one of the mobile devices 26a-26d (e.g. to user settings, playlist setup, etc.) will be reflected by all of the mobile devices 26a-26d. For example, if a user creates a new playlist, edits an existing playlist, changes a password, etc. on a jukebox via user interface 24, user interfaces 24a-24f will reflect that change.

Mobile devices 26a-26d may communicate through an external network to communicate with jukebox 16 having communicator 25. It will be appreciated that mobile devices 26a-26d may communicate over a LAN, wireless Internet, Bluetooth, or any other suitable communications network.

Preferably a central database of recognized user information is maintained and accessible by each of the jukebox devices 16, 16a-f and remote devices 26a-d. However, in some exemplary embodiments, local databases of recognized user information may be maintained on devices. Preferably, the devices will communicate with each other through a communications network, such as, for example, the Internet. However, it will be appreciated that other communications methods are possible, such as, for example, through wired communications over a LAN, wireless communications, etc.

FIGS. 29A-29E provide additional, non-limiting exemplary configurations that remotely access jukeboxes. It will be appreciated that other variations on and combinations of these exemplary configurations are possible and contemplated herein.

Figure 29A:
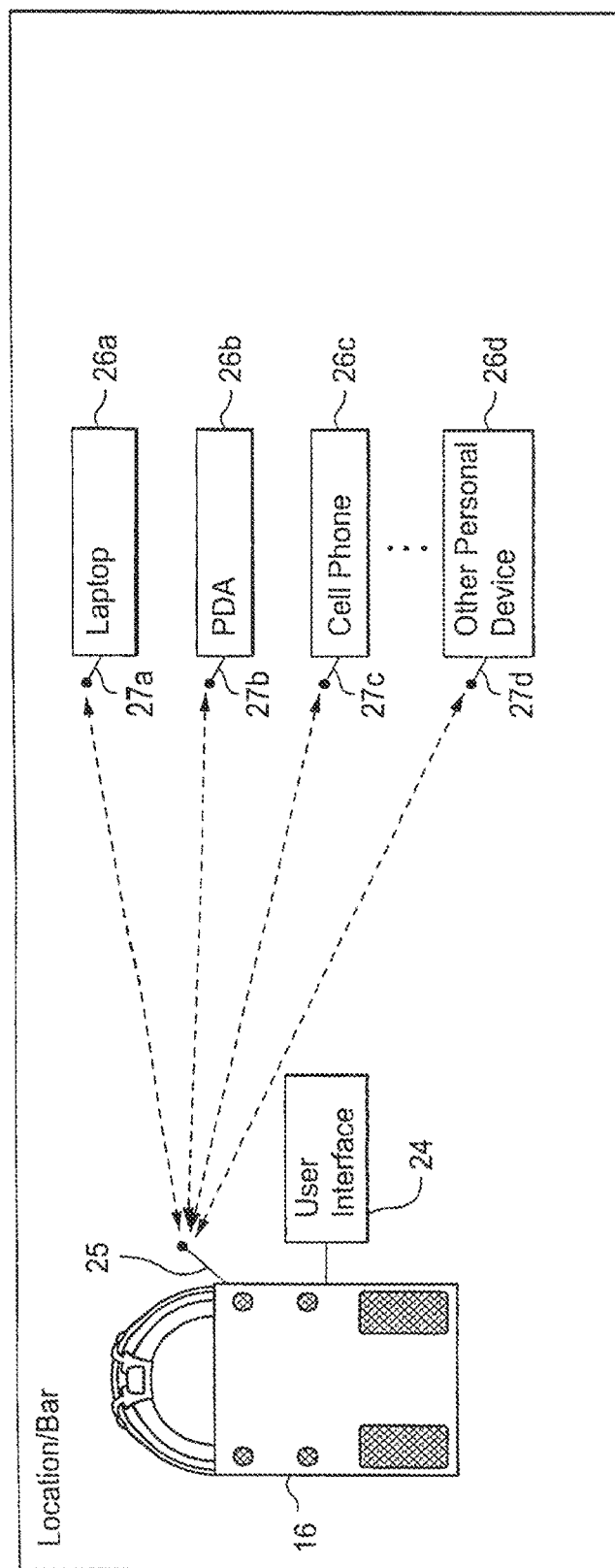
FIG. 29A is a block diagram of an improved downloading digital jukebox system with remote devices accessing a jukebox from within a particular location.

FIG. 29A is a block diagram of an improved downloading digital jukebox system with remote devices accessing a jukebox from within a particular location. In this exemplary embodiment, jukebox 16 and the plurality of remote devices are located within a particular location. Jukebox 16 includes a user interface 24 that allows jukebox users to, for example, make selections, create profiles, edit playlists, etc. Jukebox 16 also includes a wireless communications device 25. Remote devices 26a-26b communicate with jukebox 16 through their respective wireless communication devices 27a-c. In this example embodiment, remote devices 27a-c are, respectively, a laptop, a PDA, and a cell phone. It will be appreciated that other remote devices may communicate with jukebox 16. It also will be appreciated that remote devices according to this system may operably communicate with jukebox 16 from outside the particular location, with the range being determined by the hardware on jukebox 16 and remote devices 27a-c and the protocols over which they communicate. Thus, for example, wireless communications over 802.11g connections may allow for users to access jukebox 16 from within a location, tables setup outside the location, and other areas immediately surrounding the area.

Remote devices 26a-c allow users to login to jukebox 16 remotely, without having to access jukebox 16 and user interface 24 directly. Thus, a user can, for example, play songs, edit playlists, and perform other jukebox-related activities without using user interface 24 directly. It will be appreciated that remote devices 27a-c may have their own user interfaces, which may be the same as or different from user interface 24. User profile information may be stored locally on jukebox 16, on a remote server (not pictured), or on a remote device 27. Preferably, a change made by a remote device (e.g. to user profile information, playlist contents, purchased media, etc.) would be mirrored on jukebox 16, any other associated remote devices, and/or on other jukeboxes, etc.

Figure 29B:
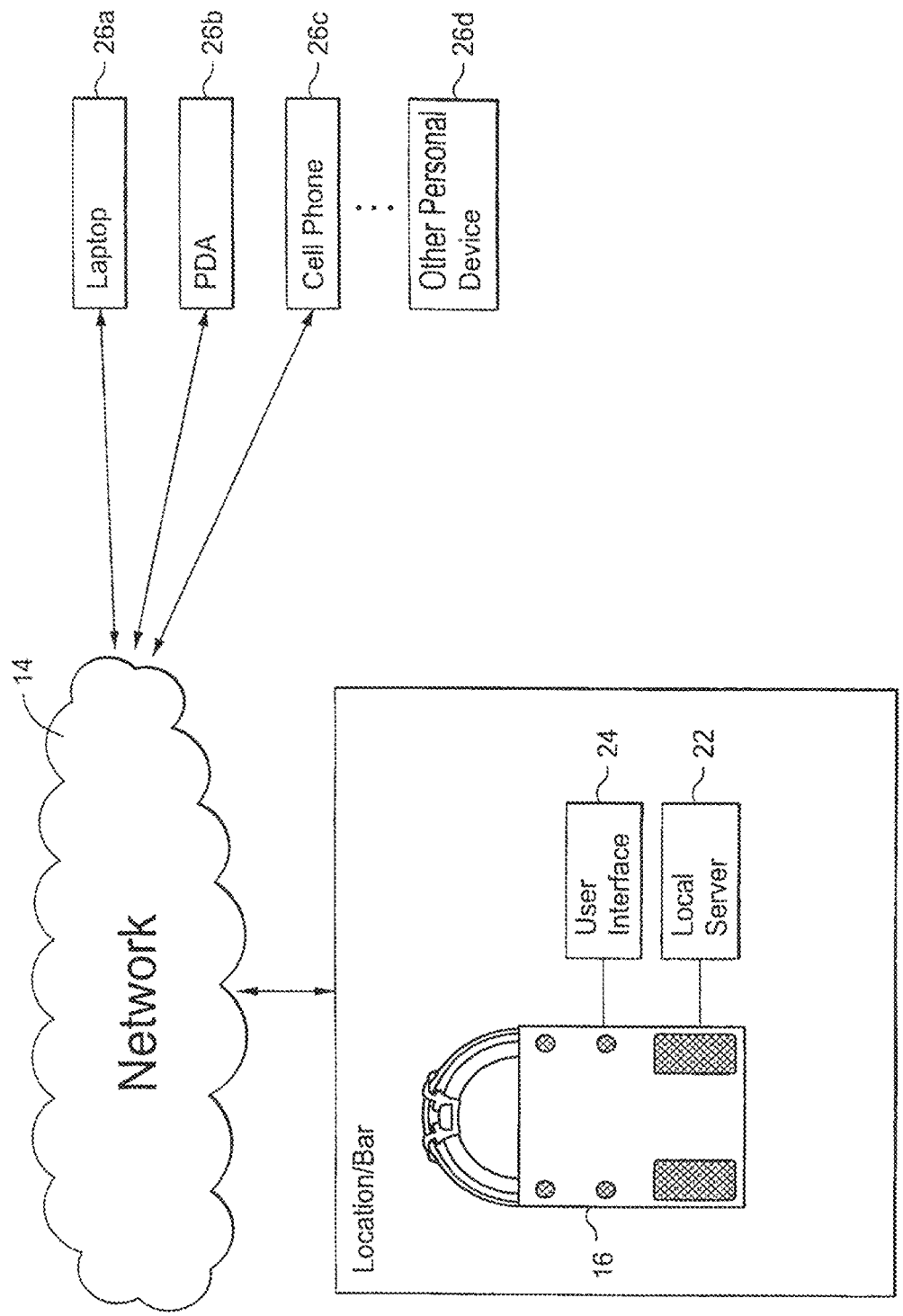
FIG. 29B is a block diagram of an improved downloading digital jukebox system with remote devices outside of a particular location accessing the digital jukebox system.

FIG. 29B is a block diagram of an improved downloading digital jukebox system with remote devices outside of a particular location accessing the digital jukebox system. In this exemplary embodiment, jukebox 16 with local server 22 and user interface 24 is connected to a network 14. Unlike remote devices 26a-26c which connect directly with jukebox 16 in FIG. 29A, these remote devices 26a-26c also are connected to network 14. Thus, users may login to jukebox 16 over a potentially broad area. For example, remote devices 26a-26c may connect with jukebox 16 over LAN, WAN, Internet connection, or the like. User profile information may be stored on local server 22. Again, preferably, a change made by a remote device (e.g. to user profile information, playlist contents, purchased media, etc.) would be mirrored on jukebox 16, any other associated remote devices, and/or on other jukeboxes, etc.

Figure 29C:
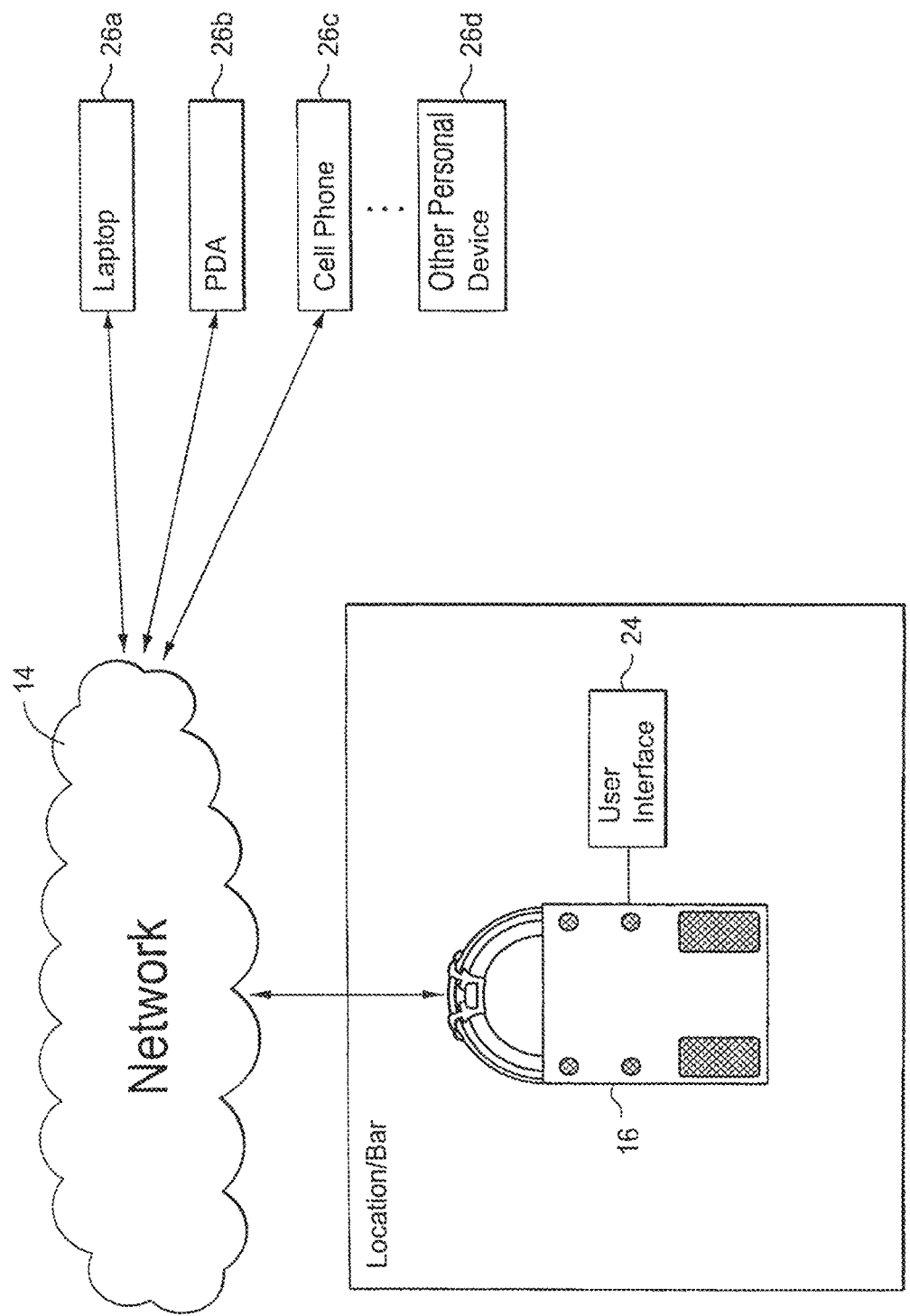
FIG. 29C is another block diagram of an improved downloading digital jukebox system with remote devices outside of a particular location accessing the digital jukebox system.

FIG. 29C is another block diagram of an improved downloading digital jukebox system with remote devices outside of a particular location accessing the digital jukebox system. FIG. 29C is like FIG. 29B, in that a plurality of remote devices 26a-26c are connected to jukebox 16 over network 14. However, FIG. 29C includes a database 29 connected to network 14. Database 29 may store, for example, user profile information, users' playlist definitions, etc. This configuration may be advantageous in some exemplary implementations because a plurality of jukeboxes connected to network 14 may all access the central database 29 without contacting individual jukeboxes or individual remote devices, which may not always be available.

Figure 29D:
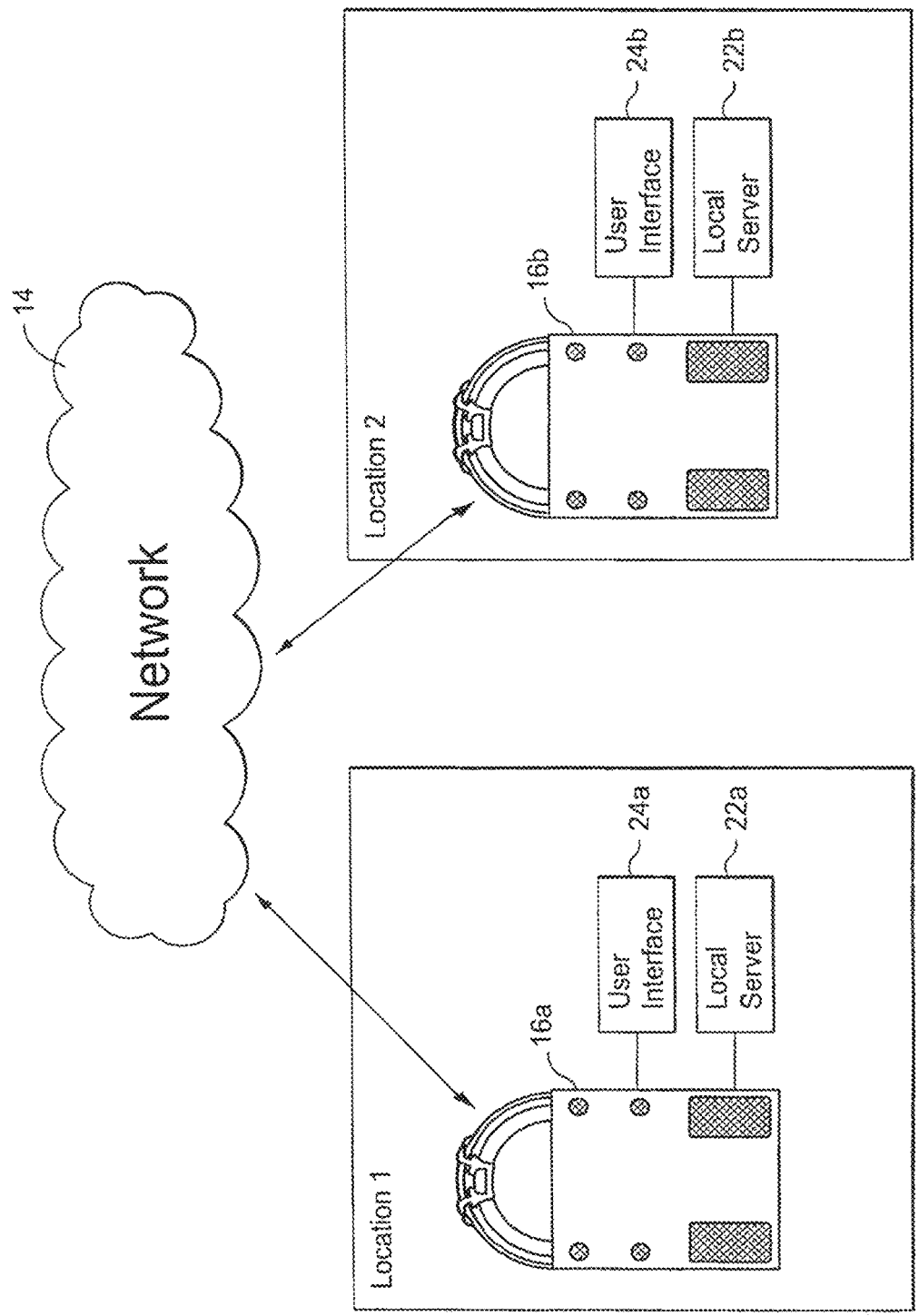
FIG. 29D is a block diagram of an improved downloading digital jukebox system with another downloading digital jukebox system outside of a particular location accessing the first digital jukebox system.

FIG. 29D is a block diagram of an improved downloading digital jukebox system with another downloading digital jukebox system outside of a particular location accessing the first digital jukebox system. In this exemplary embodiment, a jukebox 16a with a local server 22a and a user interface 24a are located within a first location, and a jukebox 16b with a local server 22b and a user interface 24b are located within a second location. It will be appreciated that the locations may be different rooms within a single bar, two separate establishments, etc. Both jukebox 16a and jukebox 16b are connected via network 14. User profile information may be stored at one or both of local server 22a and 22b. In some exemplary embodiments, if user profile information is stored on only one local server, a user logging-in to one jukebox preferably would be able to access information stored on the other local server. In other exemplary embodiments, if user profile information is stored on both local servers, preferably any changes made on one jukebox would be mirrored on the other. In still other exemplary embodiments, user profile information may be retrieved from a first jukebox and stored to a second jukebox only when a user accessed the second jukebox. These configuration are advantageous because they do not distribute user information to areas where users do not access their information. For example, a user who travels from Washington to Los Angeles on business would be able to access that user's particular information created in Washington by logging-in to a jukebox in Los Angeles; however, because that hypothetical user has not logged-in to a jukebox in Montreal, jukeboxes there would not necessarily have the user's information stored locally.

FIG. 29E is another block diagram of an improved downloading digital jukebox system with another downloading digital jukebox system outside of a particular location accessing the first digital jukebox system. FIG. 29E is like FIG. 29D, in that a jukebox 16a is connected to a jukebox 16b over network 14. However, FIG. 29E includes a database 29 connected to network 14. Database 29 may store, for example, user profile information, users' playlist definitions, etc. This configuration may be advantageous in some exemplary implementations because a plurality of jukeboxes connected to network 14 may all access the central database 29 without contacting individual jukeboxes or individual remote devices, which may not always be available. It will be appreciated that a plurality of jukeboxes may be attached through network 14.

Figure 30:
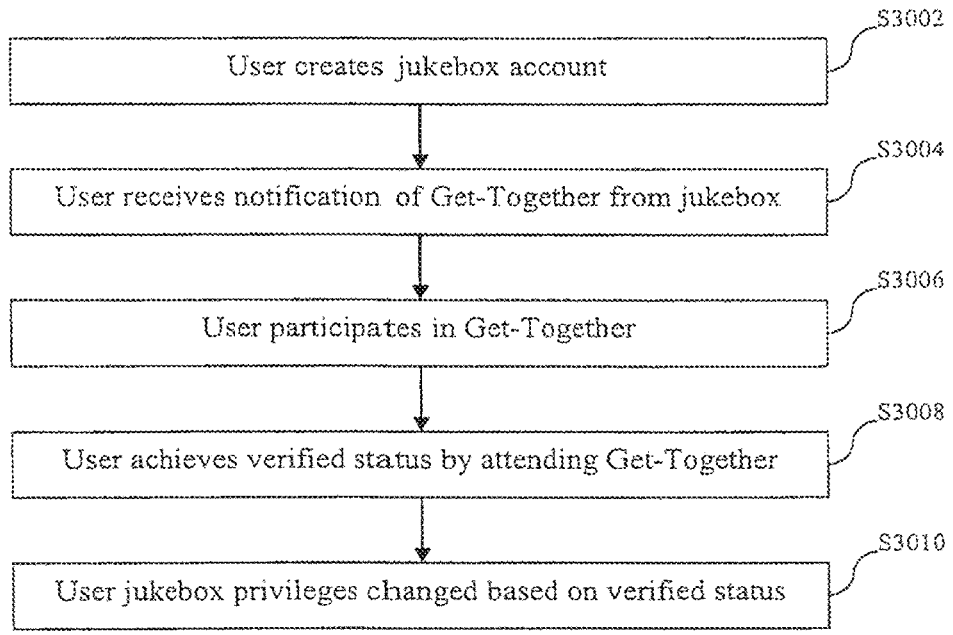
FIG. 30 is an exemplary flowchart showing one way in which users may change their status by becoming "verified users"

FIG. 30 is an exemplary flowchart showing one way in which users may change their status by becoming "verified users." In step S3002, a potential user creates a jukebox account to become a registered user. As described above, the potential user may create the account on a jukebox at a location, or by remotely accessing a jukebox by, for example, using a personal computer, laptop, mobile device, etc. It will be appreciated that potential users who unexpectedly or spontaneously walk in on a get-together for verified users may wish to become verified users immediately and create their account with little or no prior planning. Registered users receive notifications of get-togethers, special events, and the like in step S3004. Such notifications may be sent via e-mail, SMS text message, through a message displayed when a registered user logs onto a jukebox locally, etc. In certain preferred embodiments, registered users will be informed of get-togethers only if they meet predefined qualifications. For example, all registered users living in the Boroughs of New York may receive a notice of a get-together in Manhattan, but a registered user in Des Moines may not. As another example, users who specified they like Metal Music may not receive notices of Go-Go get-togethers.

After a registered user receives a notification regarding a get-together, the registered user may participate in that event, as in step S3006. This step might involve attending a bar, event, social event, or the like. In step S3008, the registered user becomes a verified user. This step might require the user to log onto a jukebox during the get-together. Alternatively, registered users might receive vouchers, codes, or the like to later enter into a jukebox (locally or remotely) to change their status to verified. In certain other embodiments, registered users may drop their business cards, sign lists, or otherwise indicate their presence to have their status changed for them. Thus, In step S3010, a user may have privileges granted, access rights changed, etc. based on verified status. For example, a verified user may be gain access to certain groups/discussion forums for verified users only. Verified users also may, in certain exemplary embodiments, make un-moderated postings. In certain other exemplary embodiments, verified users may be able to access special promotions not available to other users.

One such special promotion may include the ability to send messages (e.g., SMS messages, email messages, picture messages, etc.) to registered users' mobile phones. In certain exemplary embodiments, the coupons for one or more free credits may be sent to registered users. The coupon itself may come in many forms. For example, a simple message may be provided to show to an authorized person at a location (e.g., a bar manager, proprietor, etc.). The coupon may also include a special validation code, for example, to help reduce the chances of free credits being given away erroneously. The validation code could be shown to an authorized person or could be entered directly into a jukebox. The code could be validated against a database of codes located on the jukebox or remote from the jukebox. The database could be updated (e.g., the validity of the coupon may be revoked so as to prevent further use(s) of the same coupon, etc.) after a coupon is read. Alternatively or in addition, the code may be created according to a self-checkable format such that a database does not need to be consulted (e.g., the code itself may be encoded with the number of credits and/or additional information according to a predefined format which may or may not be readily determinable by a casual observer).

The validation code may also include a location code that indicates that the coupon is only good for a particular location or group of locations. As an example, a coupon may be provided for plays on all jukeboxes at all locations owned by a single person. Similarly, the validation code may also include a time expiry code, such as, for example, a number of days or an absolute date and/or time in which the recipient of the coupon must redeem the coupon. For example, the code may be good for use within 1 week, only on certain days, etc.

Separate from or in addition to a simple message and/or validation code, the coupon may be provided in the form of a barcode scannable by the manager and/or at the jukebox using appropriate hardware. The coupons may be delivered, for example, as text messages, through the regular mail, through email, etc. In certain exemplary cases, whether the coupon includes a barcode or in another format, it may be necessary to print out a coupon for redemption at a location, whereas in certain other exemplary cases it may be possible to merely bring the mobile device that has received the coupon.

Thus, certain exemplary embodiments provide systems and/or methods of delivering a coupon to a user of a digital downloading jukebox. A validation code is created. Associating with the validation code is a number of free credits for the user. Note that no specific number necessarily need be included in the validation code—for example, the existence of the coupon itself may be good for a predetermined number of credits (e.g., 1 credit, 5 credits, 10 credits, etc.). The validation code is included with the coupon. The validation code is transmitted to the user.

Included in the validation code may be at least one location where the user can redeem the coupon and/or a restriction on the time when the user can redeem the coupon. The validation code may include an encoded alphanumeric sequence and/or a barcode. The coupon feature could also be used for coupons that provide discounts on food, drink and/or other products/services offered by a jukebox establishment.

In certain exemplary embodiments, the validation code may be obtained from the coupon. It may then be determined whether the validation code is valid. When the validation code is valid, a number of credits is/are provided to the user in accordance with the number of free credits associated with the validation code. The validation code may be obtained by the jukebox via a barcode scanner, and/or a user may have to input the validation code into the jukebox via a user interface provided to the jukebox. Alternatively or in addition, an authorized user of a jukebox (e.g., a manager, proprietor, etc.) may provide the free credits to the patron.

Here, as elsewhere, any suitable combination of programmed logic circuitry (e.g., hardware, software, firmware, and/or any suitable combination thereof) may enable such functionality. Additionally, instructions for carrying out the same may be stored on any suitable computer-readable storage medium.

Figure 31:
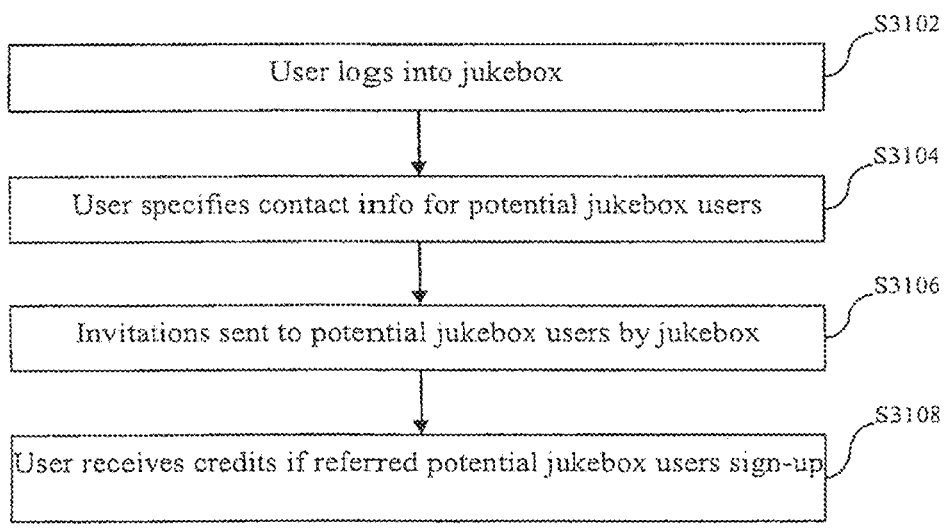
FIG. 31 is an exemplary flowchart showing how registered users may receive credits for referring potential users.

FIG. 31 is an exemplary flowchart showing how registered users may receive credits for referring potential users. In step S3102, a user logs onto a jukebox (either locally or remotely). In step S3104, users specify some contact information for potential future users. It will be appreciated that step S3104 may be accessed when users create new accounts, when registered users access a form, etc. It also will be appreciated that contact information may be used, as appropriate, to send, for example, an e-mail, a text message, conventional mail, etc. In step S3106, invitations are sent to potential future users by the jukebox using the provided contact information. Lastly, in step S3108, referring users may receive credits. In certain example embodiments, credits may be awarded based on the number of users referred. In certain example embodiments, credits may be awarded based on a formula (e.g. 1 credit for every five users referred and/or registered), which might include bonuses (e.g. a bonus may be given when 10, 25, and/or 50 referred users become registered users).

Figure 32:
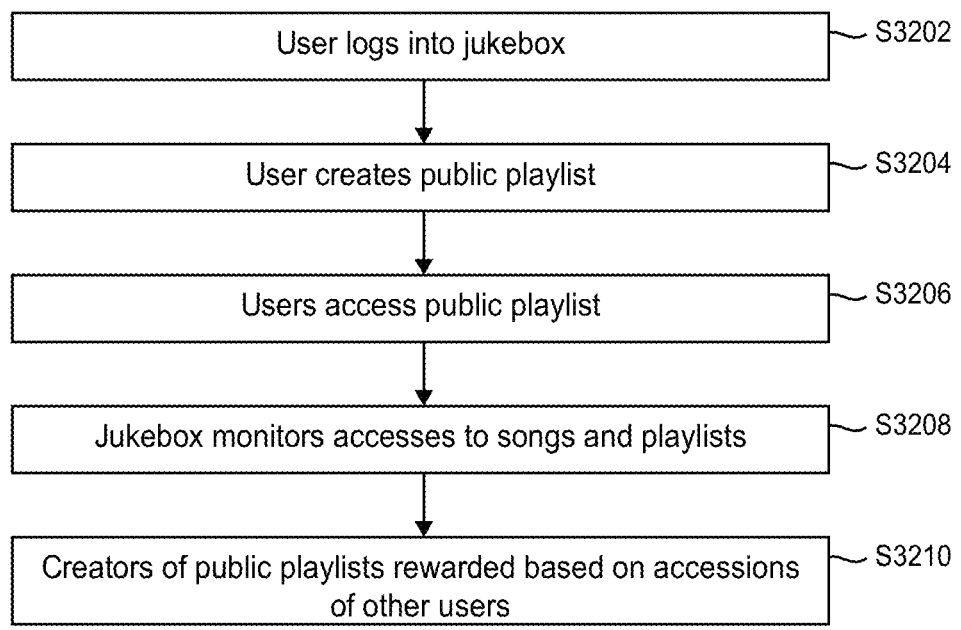
FIG. 32 is an exemplary flowchart showing how registered uses may receive credits for creating public playlists.

FIG. 32 is an exemplary flowchart showing how registered uses may receive credits for creating public playlists. In step S3202, a user logs onto a jukebox, either locally or remotely. In step S3204, a user creates a public playlist. As described above, a user will associate certain instances of media with a playlist, preferably giving the entire playlist a descriptive name. It will be appreciated that users may create playlists using any of the methods described above, including, for example, drag-and-drop features, search features, etc. In certain exemplary embodiments, it may be necessary to designate playlists as public.

In step 3206, jukebox users may access public playlists and songs as part of their normal jukebox activities. The jukebox monitors user activity, especially with respect to the songs and playlists accessed. In certain exemplary embodiments, the jukebox will maintain counts, percentages, and the like related to the songs and playlists accessed. The jukebox will reward users based on the accessions of other users in step S3210. For example, users may be rewarded if their playlist(s) is/are accessed the most of any playlist, is/are accessed above a certain threshold number of times, is/are selected more than other playlists in a predefined category, etc. In certain exemplary embodiments, users may be rewarded based on the contents of their playlists. For example, users may be rewarded based on whether their playlists contain a predefined number and/or proportion of the most popular songs, as determined by the jukebox. It will be appreciated that users may be rewarded in any number of ways. For example, one obvious way users may be rewarded is by giving them credits for additional plays on the jukebox. Users also may be rewarded by being entered in certain promotions, giveaways, or the like. More generally, a recognized user may earn reward points for conducting arbitrary jukebox-related activities (e.g., on an actual jukebox, via a web interface, etc.). For example, a recognized user may earn points every time the user logs on, sends a message, shares a playlist, etc. Reward points may be redeemed, for example, to purchase plays on a jukebox. Alternatively, points may be redeemed for special merchandise to promote the further use of the jukebox by the recognized user.

Optionally, a user may choose an avatar to represent the user on a jukebox and/or in any other jukebox-mediated environment. A user's avatar may be depicted graphically, for example, as a picture, as a moving animation, as a character, or in any other way suitable for identifying the user. The avatar may or may not bear a physical likeness to the registered user.

Figure 33:
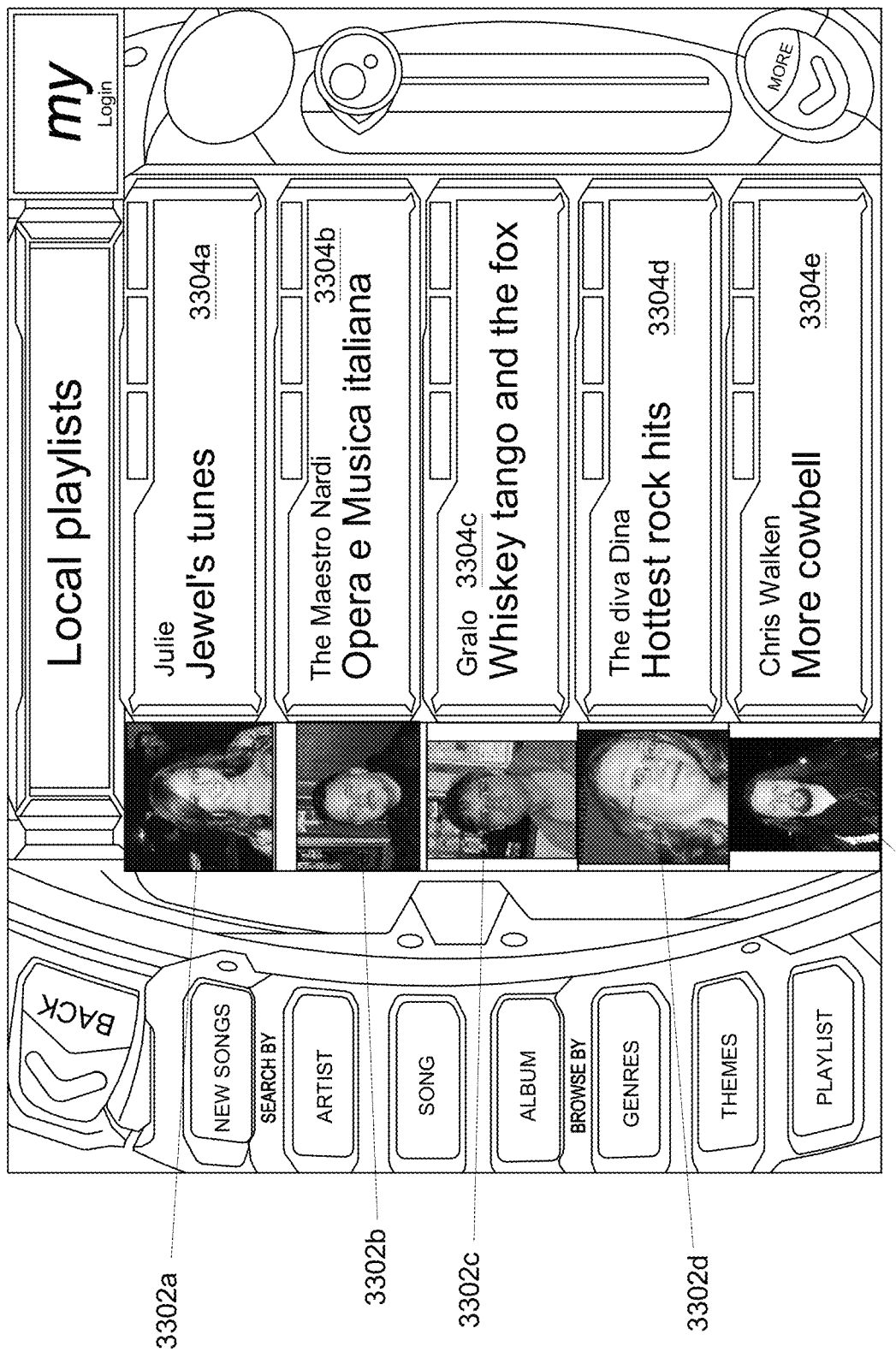
FIG. 33 is an exemplary screenshot of a "Local Playlists" screen in which registered users are represented by avatars.

In one example, when a person operating a jukebox selects the local playlists option from a jukebox, the playlists for each registered user on the jukebox may be made available. This example is depicted in FIG. 33, which is an exemplary screenshot of a "Local Playlists" screen in which registered users are represented by avatars. Next to the registered users' names, nicknames, or other identifying marks 3302a-e may be the particular user's avatar 3304a-e. This may provide further customization and personalization to a jukebox by, for example, showing the regulars of a bar whom many patrons may know or recognize, encourage casual jukebox patrons to become more active in creating custom playlists, etc. After the user selects a group of local playlists associated with a registered user and represented by an avatar, that user's playlists may be displayed. The user operating the jukebox may then select an individual playlist associated with the user represented by the avatar. Once selected, the contents of the playlist (e.g., one or more songs) may be displayed, along with the user's avatar, the name of the playlist, and the number of plays required for play.

Figure 34:
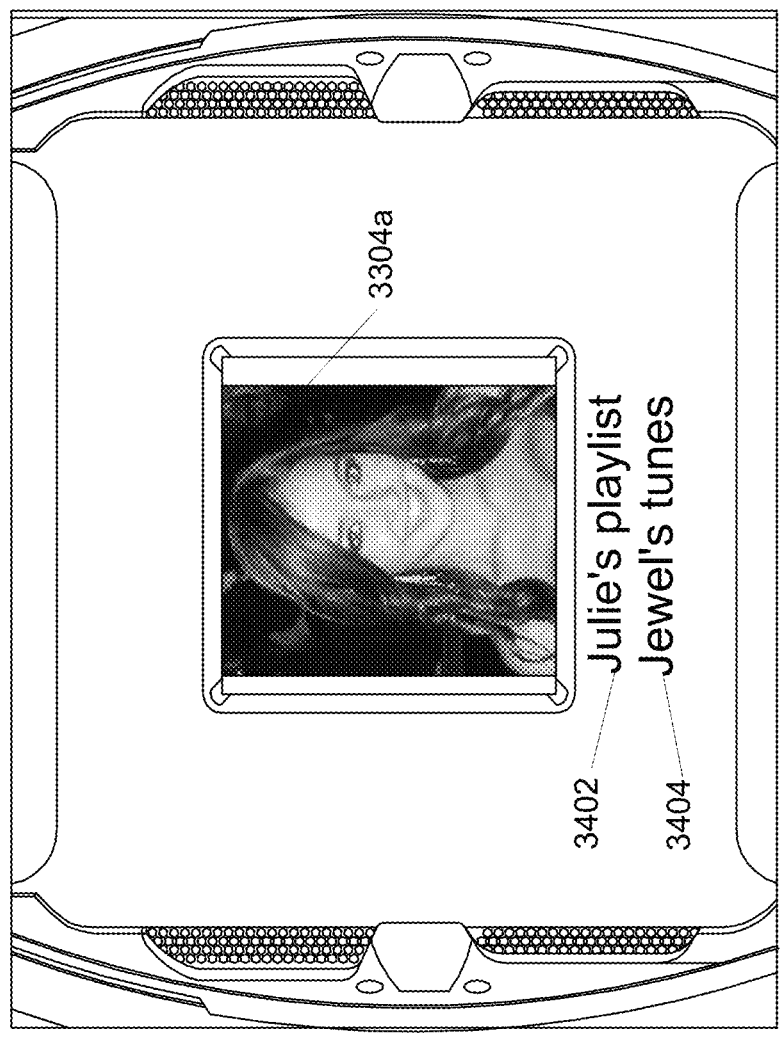
FIG. 34 is an exemplary screenshot of a "now playing" screen.

If the playlist, or a portion thereof, is selected for play by the user, a now playing screen may be displayed, as shown in FIG. 34, which is an exemplary screenshot of a "now playing" screen. This screen may display the avatar 3304a, the name of the registered user 3402, the name of the playlist 3404, etc. Additionally, acting on behalf of the registered user, a lead-in audio or video may be played to introduce the songs, transition between songs, and/or conclude the playlist. For example, the avatar itself may be animated. When the avatar is a picture, a slide show may cause the image appear to be animated, or various images may be superimposed over the mouth to make it appear as if the avatar is speaking or singing. The same or similar functionality may be made available if the avatar is an animated character. For example, an avatar may sing and/or dance along with the music (e.g., the avatar may head-bang to heavy metal music, line dance with other real or simulated avatars to country music, etc., as programmed by the registered user or as automatically generated by the jukebox), using, for example, custom animations, inverse kinematics techniques, etc. The and/or other features may be enabled by any suitable avatar action programmed logic circuitry (e.g., a processor on or accessible by a jukebox or remote jukebox interface comprising any suitable combination of hardware, software, or the like). In general, the avatar action programmed logic circuitry may cause the avatar to react to the instance of media, before, during, and/or after it is played.

These and/or similar features may be provided by allowing the registered user to upload content (e.g., video and/or audio content) to the jukebox and/or jukebox distribution network. For example, pictures, audio files, movies, and the like may be captured by and/or stored to a single jukebox and associated with a registered user on that jukebox, or may be stored to a central location so as to be available to multiple jukeboxes.

It will be appreciated that these and/or similar features may be provided in a networked jukebox environment so that registered users may have access to their avatars from anywhere. This may be useful when traveling, for example, back to a hometown, university, and/or other place that the user may visit later, for example. In this way, the avatar may be familiar to other patrons who once knew the registered user. It also may be helpful to registered users on the go, who wish to be creative (e.g., to make new friends) or to introduce themselves (e.g., through introductory audio and/or video clips), while also having access to the user's own library of music, etc.

Avatars and media presented by avatars may be forced to comply with local filters applied to the jukebox. For example, playlists may be filtered if a location does not permit rap, pre-recorded messages may be edited for explicit language, inappropriate pictures may be altered, etc.

As described above with reference to the MyTouchTunes services, suitably configured jukeboxes may facilitate users' connections with various virtual communities, including, for example, communities of interest (e.g., organized around a specific subject), communities of fantasies (e.g., around gaming, creative environments, or the like), and/or communities of relationships (e.g., online meeting spaces). Accordingly, the jukeboxes may provide—either directly or through an online portal—one or more of electronic mailing lists; online chat rooms; bulletin boards, message boards, discussion groups, Internet forums, or the like; blogs; instant messaging services; podcasts; text messaging services; file sharing (e.g., P2P file sharing); multi-user dungeons (MUDs); etc. By connecting with and establishing new jukebox-centered virtual communities, it may be possible to attract new patrons and develop further interest of existing patrons. Indeed, it may be possible to realize increased returns in and through the virtual community by gathering information about members (and targeting advertising and transaction offerings appropriately), drawing vendors to the community to attract members and promote spending, drawing members to the community and generating member-based content, and/or promoting user-to-user interactions to build user loyalty to the community.

The above-described avatars may be used connection with a jukebox-mediated virtual community. For example, avatars may be associated with all actions a user takes within the community (e.g., writing a blog, posting on a bulletin board, sending a message, etc.). As a further, avatars may become more interesting as users begin to create and share their own media. A user may upload music (e.g., pursuant to a standard license agreement), with the avatar being virtually "attached" to or associated with the media. The jukebox-mediated network could track the distribution of the music to websites, P2P file sharing engines, and/or jukeboxes. Royalties may be tracked and returned to the user through its avatar. Additionally, based on the type of user, different fees/royalty structures may be provided. For example, for independent artists, a large fee and small royalty may not be appropriate, whereas an artist associated with a major record label may be more able to bear such direct and indirect costs. To facilitate control, music may be checked for copyright compliance, and this authorization process may be performed automatically (e.g., a comparison to banks of known music, checking for the presence of a digital watermark, etc.) or manually (e.g., by an authorized user, patron, operator, employee of the central distribution network, etc.). When content is posted and/or agreements are ratified, an avatar may be an acceptable form of digital signature attached to a copyright and/or license agreement. An avatar also may be displayed as album art, during the actual playing of a tagged song, etc.

In addition to the above-described toolkit usable by operators, operators, authorized users, and/or proprietors also may make use of a configuration dashboard to administer, manage, update, and/or otherwise control jukeboxes. Indeed, operators managing one or more jukeboxes may save time and/or money by remotely accessing diagnostic and/or management features provided to the jukebox. In certain exemplary embodiments, an operator may be able to access a management and/or diagnostics module of the dashboard using, for example, a computer, handheld device, or other suitable device to receive notifications and/or to inquire into the status of a jukebox through a proprietary (e.g., web-based) interface. Communications may be bidirectional, thus allowing operators to directly instruct and/or query jukeboxes of interest regarding management features and/or alerts and/or notifications. The features described below may be used alone or in various combinations to allow operators, authorized users, and/or proprietors to focus on particular jukeboxes in need of attention, thus saving time and money, while also increasing the up-time, reliability, and overall appeal of jukeboxes.

With respect to such features, each jukebox may gather and/or monitor information in which an operator would be interested, potentially proactively sending this information to the operator. A notification mechanism may send messages (e.g., via email, SMS, or other suitable format) to the operator automatically when predetermined thresholds are exceeded. These predetermined thresholds may be set by the operator, may be preconfigured, etc.

Diagnostics and/or alerts may include, for example, the bill rejection rate (e.g., in terms of percentage and/or number), number of bills in the stack, number of reboots, temperature (e.g., hard drive, CPU, system, enclosure, etc.), and the like. Additionally, such alerts/notifications may be set to be sent at a predetermined time. For example, notifications may be sent when the CPU temperature exceeds a threshold for a specified amount of time, when the number of reboots exceeds a threshold within a specified amount of time, etc.

It will be appreciated that such diagnostic techniques may be made available to operators located remote from a jukebox, as well as directly at a jukebox. Furthermore, in certain exemplary embodiments, the diagnostic module of a first jukebox may be used to remotely check the diagnostic module of a second jukebox, the second jukebox being located remote from the first jukebox.

Figure 35:
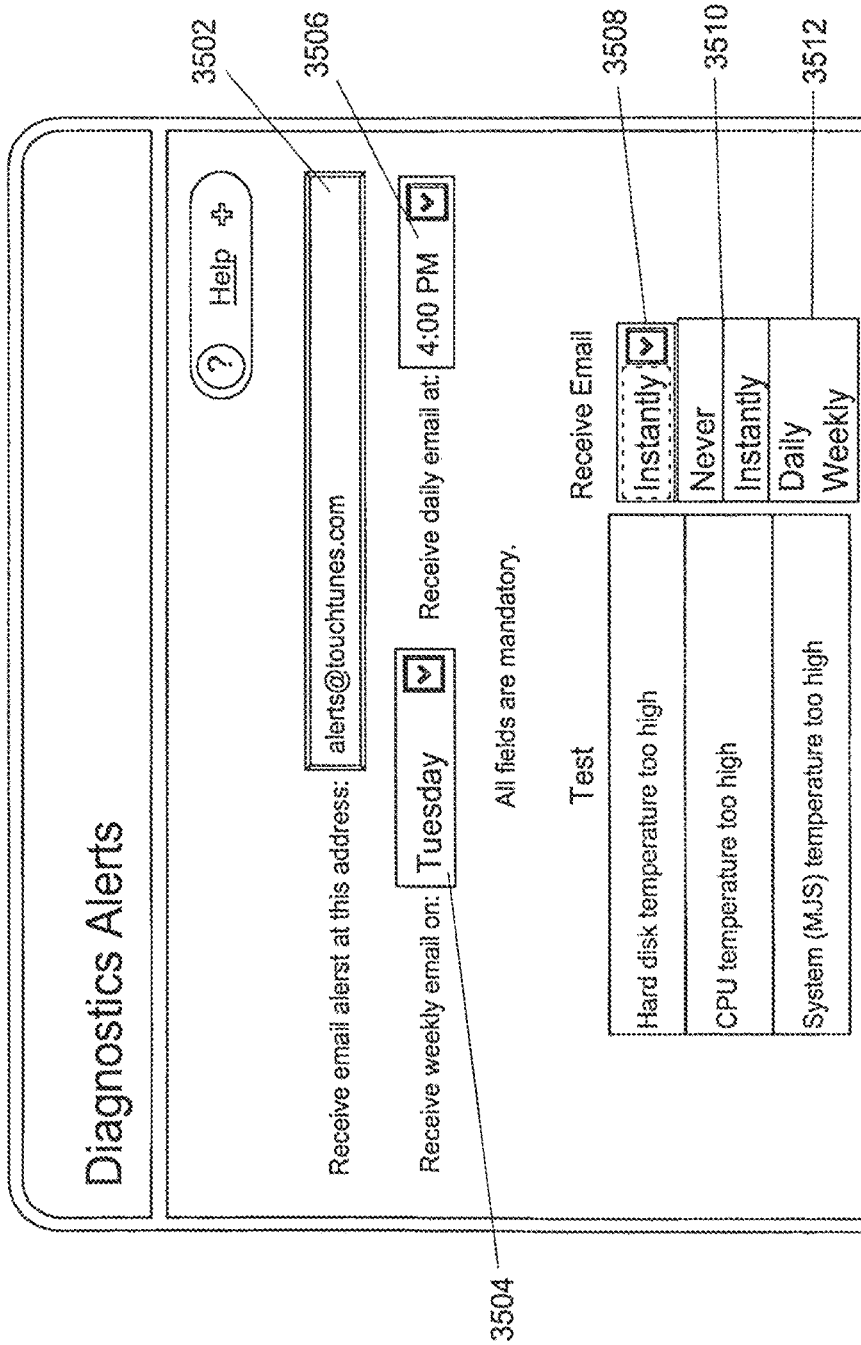
FIG. 35 is an exemplary screenshot for setting alert preferences.
Figure 36:
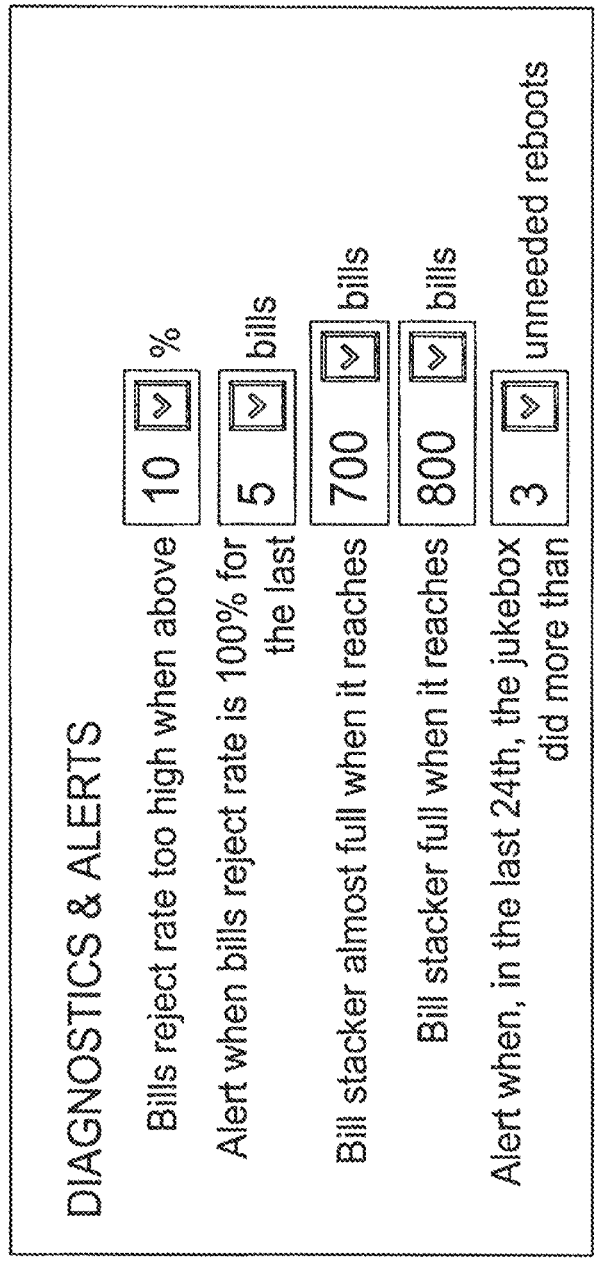
FIG. 36 is an exemplary screenshot for setting alert thresholds.
Figure 37:
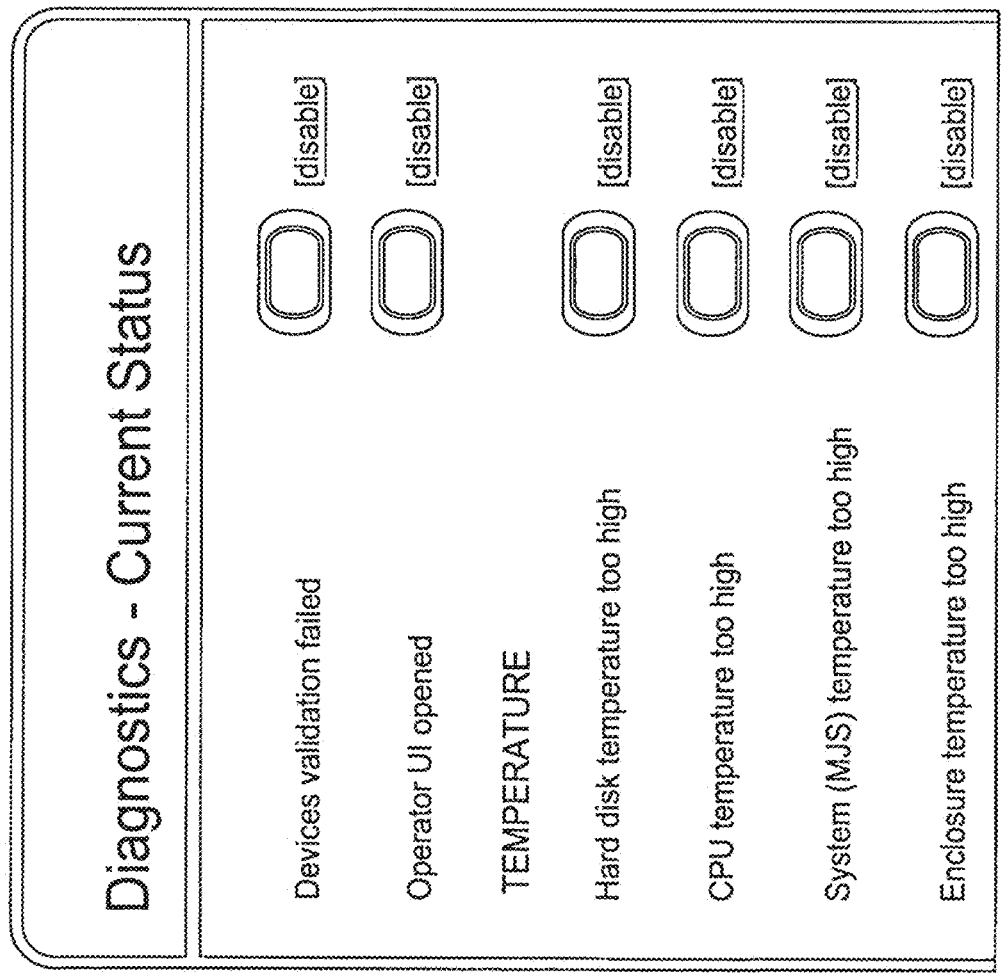
FIG. 37 is an exemplary screenshot showing the status of various tests.

FIGS. 35-37 are illustrative screenshots demonstrating how diagnostic alerts may be configured. In particular, FIG. 35 is an exemplary screenshot for setting alert preferences. In FIG. 35, an email address to which alerts may be sent is specified in block 3502. Weekly reports may be specified by selecting a day from the dropdown box 3504, and daily reports similarly may be sent at a time specified by dropdown box 3506. The bottom portion of the exemplary screenshot lists the various tests and the frequency at which emails should be sent. For example, a selection from dropdown box 3508 may specify whether hard disk temperature alerts should be sent never, instantly, daily, or weekly. Other alerts may be sent at the same or different intervals by, for example, setting dropdown boxes 3510, 3512 (which are partially blocked by the expanded dropdown box 3508). Of course, it will be appreciated that other intervals may be specified, other tests may be monitored, and that other addresses or notification means may be used (e.g., SMS messages, instant messages, etc.).

FIG. 36 is an exemplary screenshot for setting alert thresholds. The left-hand side of FIG. 36 notes the particular statistic to be monitored (e.g., bill reject rate, bill stacker fill rate, number of reboots, etc.), while the right-hand side allows the threshold to be specified. The threshold may be set in terms of an absolute number and/or in terms of a percent, as necessary. It will be appreciated that other tests may be monitored, and that any suitable threshold may be specified. Additionally, indicating no threshold may be used to avoid causing alerts to be generated for a particular test, as well.

FIG. 37 is an exemplary screenshot showing the status of various tests. In FIG. 37, the left-hand side of the screen lists the particular test, while the right-hand side of the screen indicates its status. The tests optionally may be categorized for convenience (e.g., temperature, fee collection, software operation, etc.). As shown in FIG. 37, status may be indicated by a color (e.g., green may signify no problem or operation within an acceptable range, yellow may signal some cause for concern, and red may signal the occurrence or imminence of a problem). Of course, other indicators may be used instead of a color-coded scheme (e.g., a number or percentage system, etc.).

An enhanced scheduling module also may be provided to the jukebox. This module may allow operators and/or other authorized jukebox users to schedule single and/or recurring events. For example, a bar owner may schedule morphs, music filters, and/or background music. The event recurrences may be weekly, monthly, yearly, etc. For example, background music may be played during bunch, music filters may be applied during the afternoon and early evening, and an unrestricted playlist may be made available at night. As another example, the jukebox may morph nightly to accommodate an 80s music night, hip-hop night, country line dancing night, disco night, etc. Such advance setup ultimately may save time and improve convenience. The events scheduler may include monthly and/or daily views, with the daily view being broken down, for example, by hours. After a new event is added, the appropriate views may be updated.

Figure 38:
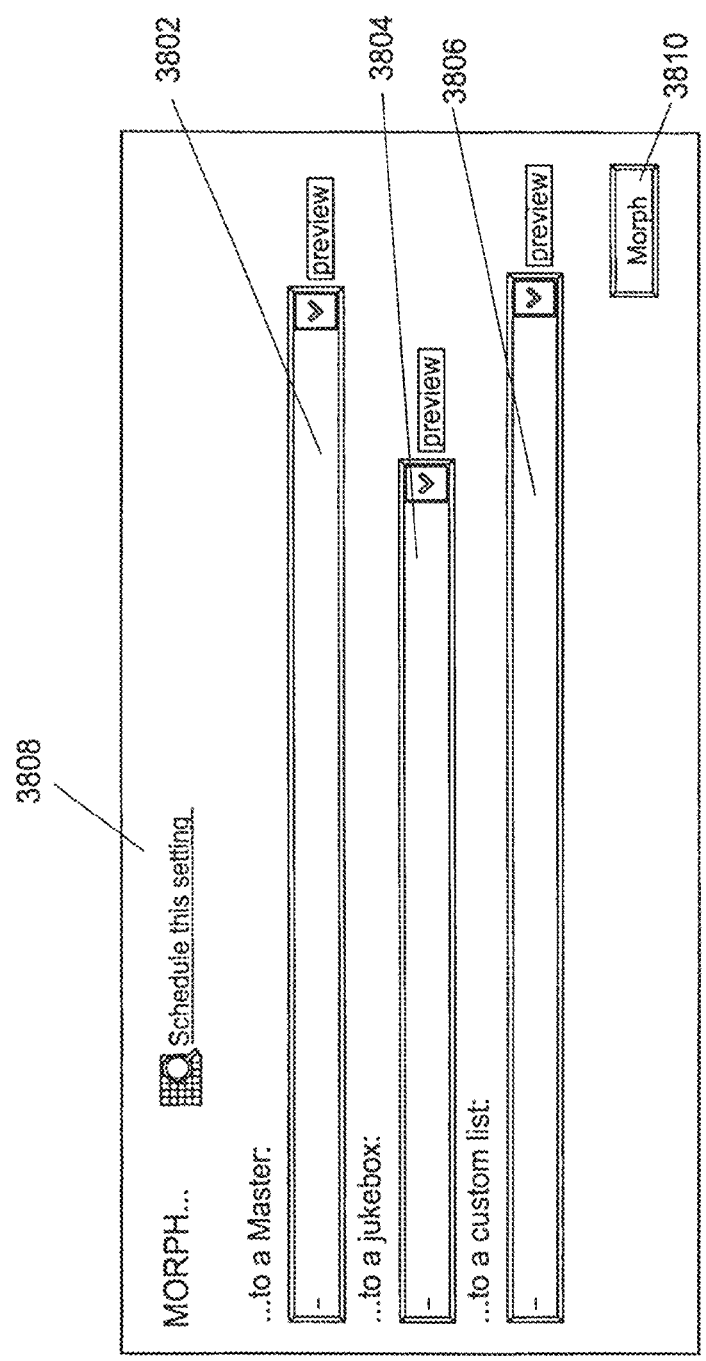
FIG. 38 is an exemplary screenshot of the morphing capabilities being linked to the enhanced scheduling module; and, FIG. 39 is an exemplary screenshot of a scheduling calendar.

FIG. 38 is an exemplary screenshot of the morphing capabilities being linked to the enhanced scheduling module. With respect to morphing capabilities, a jukebox may be morphed to a predefined master jukebox (e.g., via input area 3802), to a specific jukebox (e.g., a jukebox previously defined by, for example, a proprietor or operator, etc., via input area 3804), or to a new custom list of music (e.g., via input area 3806). In particular, a snapshot may be taken for each morph of the jukebox, with associated data (e.g., date, time, playlist) being stored therewith. This may facilitate the morph process and also may allow proprietors to "undo" morphs (e.g., when they are less popular, not as successful, etc.). A user may then schedule the morph like any other event by selecting the "schedule this setting" button 3808.

Figure 39:
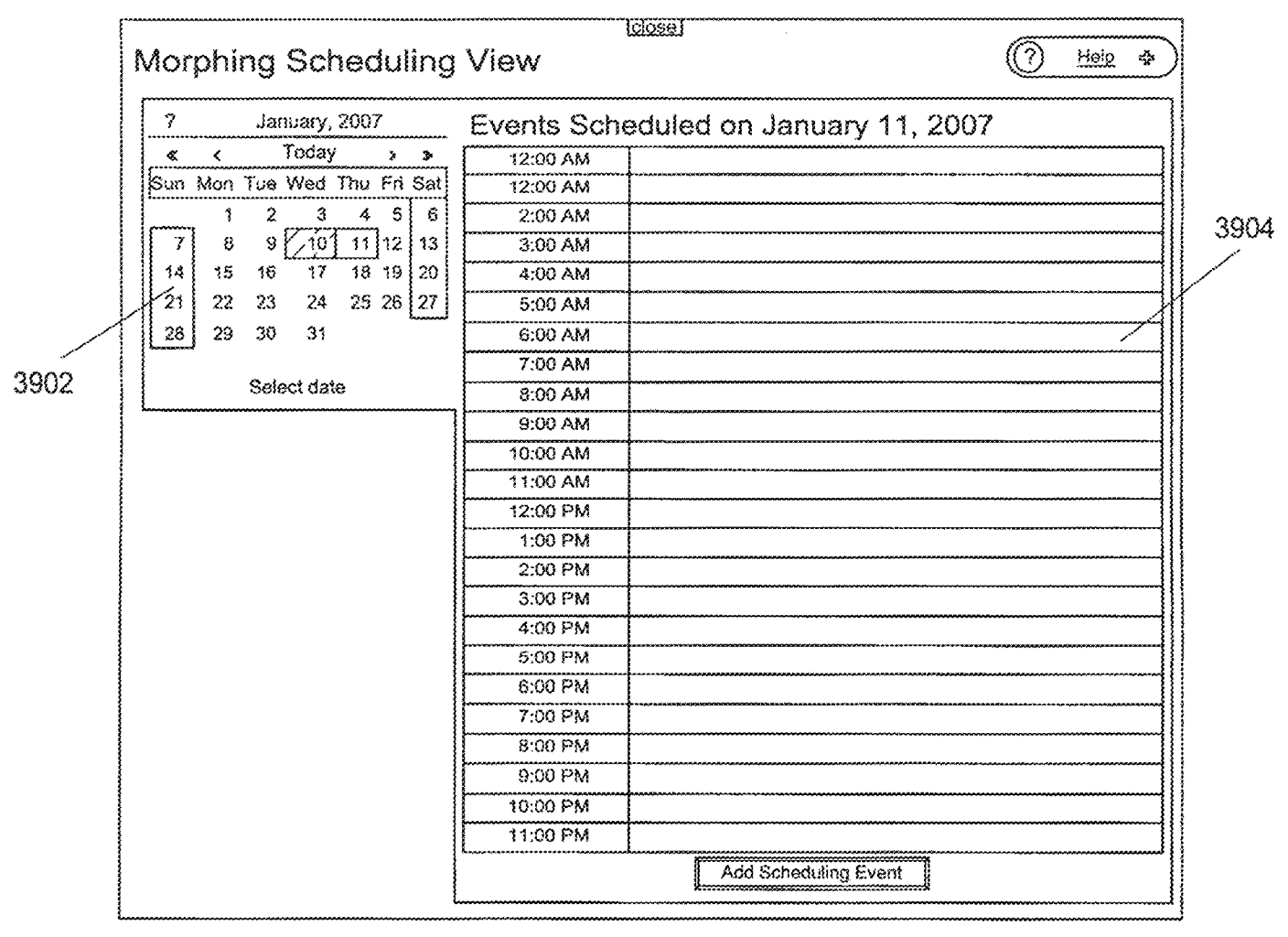

The "schedule this setting" button 3808 may bring up the calendar scheduling component, just as in any other event scheduling. FIG. 39 is an exemplary screenshot of a scheduling calendar. The scheduling calendar may have a month-by-month view 3902 as well as a daily view 3904. The daily view 3904 may be broken down by the half-hour, hour, etc., and may show any other events schedule for a particular day.

Operators also may setup sub-user accounts, with such sub-users having restricted location access.

Other functions may include enhanced location setup features.

The present disclosure has used certain terms that should not be interpreted as limiting the invention to a particular embodiment, hardware components and configurations, software configurations, etc. For example, many features and examples have been described in relation to their existence within a bar, pub, or other environment. However, it will be appreciated that the features present in the exemplary embodiments of the present invention are adaptable for use in any location where a jukebox (or multiple jukeboxes) may be located. Similarly, while certain features and functions are described with reference to usage by "users," "owners," "operators," "patrons," etc., it will be appreciated that these terms are generic and may, in most cases, be used interchangeably depending on the embodiment chosen and the feature employed. For example, while it may be advantageous to limit the initial song selection to owners and/or operators, in certain exemplary embodiments, patrons may play a role in the initial song selection.

Still further, particular hardware combinations and configurations are disclosed which represent only one way which the embodiments may be constructed. Central servers may, in some exemplary embodiments, be comprised of one or more servers acting together or separately to coherently provide the full range of services necessary to enable a functioning jukebox. For example, a cluster of servers may comprise a virtual central server, with one server providing media, another tracking membership, still another processing licensing, etc.

Similarly, the local servers described herein may be incorporated into the jukeboxes. For example, the local servers may appear to function independently, even though they exist as part (e.g. partition) of an integrated mass storage device within the jukebox. Indeed, as hard disks become larger and less expensive, they may preferably serve the functions of local servers. One presently preferred embodiment comprises a 120 GB hard drive containing 25,000 songs as the factory drive. However, flash media or any storage media now known or later developed (or combinations thereof) may be used as the factory drive, expanded media storage or local server, depending on the desires of a system designer for a particular jukebox application. In other words, the invention is not limited to any particular storage technology or configuration, but instead can be implemented using any suitable storage technology.

Also, although the term "song" has been used sometimes in the above-description, this term is not intended to be limiting to the scope of the invention, and any instance or instances of media (e.g., song, video, song/video combination, data, information etc.) can be used in any embodiment herein and still fall within the intended scope of the invention.

Lastly, it will be appreciated that the screen shots and software arrangements presented herein are only one preferred method for organizing and displaying the features disclosed herein. Other configurations are possible and are therefore contemplated herein.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A digital downloading jukebox, comprising:
a processor configured to control the digital downloading jukebox to at least:
log in a first user to the digital downloading jukebox or to an audiovisual distribution network to which the digital downloading jukebox is connected;
establish a connection to a peripheral device, wherein the peripheral device is a mobile electronic device associated with the first user;
retrieve, for the digital downloading jukebox, a peripheral playlist associated with the connected peripheral device if the first user is logged in, and preventing said retrieving if the first user is not logged in, wherein the peripheral playlist is in a first format interpretable by the peripheral device;
convert the peripheral playlist to a jukebox playlist, the jukebox playlist being in a second format which is different from the first format and is interpretable by the digital downloading jukebox, and wherein the jukebox playlist is different in scope than, and does not supplant, a master catalog of media available for playback via the digital downloading jukebox;
determine whether the jukebox playlist is designated as public or private;
based on whether the jukebox playlist is designated as public or private, configure the jukebox playlist as public and accessible to all users or as private and accessible only to the first user;
publish the converted jukebox playlist at least to the digital downloading jukebox so that the jukebox playlist is available for playback on and via the digital downloading jukebox;
during the playback of the converted jukebox playlist, automatically reorder at least some of the songs in the converted jukebox playlist based on comparing characteristics of the at least some songs; and
enable distribution of the converted jukebox playlist to one or more different digital jukeboxes connected to an audiovisual distribution network to which the digital downloading jukebox also is connected.

2. The jukebox of claim 1, wherein the peripheral device is at least one of:
a portable music player, a computer, and a mobile phone.

3. The jukebox of claim 1, further comprising a computer-readable storage medium associated with the digital downloading jukebox configured to at least temporarily store the peripheral playlist.

4. The jukebox of claim 1, wherein the processor is further configured to control the digital downloading jukebox to determine whether the jukebox playlist is to be designated a public jukebox playlist or a private jukebox playlist.

5. The jukebox of claim 1, wherein the processor is further configured to control the digital downloading jukebox to send the jukebox playlist to a server of the audiovisual distribution network.

6. The jukebox of claim 1, wherein the peripheral device is connected to the digital downloading jukebox via a USB connection.

7. The jukebox of claim 1, wherein the peripheral device is connected to the digital downloading jukebox via a proprietary docking station.

8. The jukebox of claim 1, wherein the processor is further configured to control the digital downloading jukebox to require a user to log into the digital downloading jukebox before importing the peripheral playlist from the peripheral device.

9. The jukebox of claim 1, wherein the converting the peripheral playlist comprises converting a software application playlist associated with a software application used on a computer device.

10. The jukebox of claim 1, wherein the processor is further configured to:
   determine a number of credits available to the first user;
   when the number of credits is sufficient to play all of the instances of media in the converted peripheral playlist, playing all instances of media in the playlist; and
   when the number of credits is insufficient to play all of the instances of media in the converted peripheral playlist, playing only a portion of the instances of media in the playlist.

11. The jukebox of claim 10, wherein the processor is further configured to, when the number of credits is insufficient to play all of the instances of media in the converted peripheral playlist, allowing the first user to select the portion of the instances of media in the playlist for play.

12. The jukebox of claim 10, wherein the processor is further configured to, when the number of credits is insufficient to play all of the instances of media in the converted peripheral playlist, playing the instances of media in the playlist in order until the credits are exhausted.

13. The jukebox of claim 10, wherein the processor is further configured to:
   determine whether an instance of media in the converted playlist is available for immediate play on the digital downloading jukebox free from additional processing by the jukebox;
   when the instance of media is available for immediate play, charge the user a predetermined first number of credits and queue up the instance of media for play; and
   when the instance of media is not available for immediate play,
   determine whether the first user is a verified user,
      when the user is a verified user, charge a second predetermined number of credits if the instance of media exists in a playlist associated with the first user, but otherwise charging a third predetermined number of credits, and
      queuing up the instance of media for play,
   wherein the second predetermined number of credits is less than the third predetermined number of credits, and
   wherein the third predetermined number of credits is greater than the first number of predetermined credits.

14. The jukebox of claim 13, wherein the determination of whether the instance of media is available for immediate play on the digital downloading jukebox free from additional processing by the jukebox includes determining whether the instance of media resides on a storage area separate from a dedicated storage area of the jukebox comprising immediately playable instances of media.

15. The jukebox of claim 14, wherein the separate storage area is a remote server in the audiovisual distribution network.

* * * * *